(12) United States Patent
Norring et al.

(10) Patent No.: US 8,219,919 B2
(45) Date of Patent: Jul. 10, 2012

(54) METHOD FOR AUTOMATING CONSTRUCTION OF THE FLOW OF DATA DRIVEN APPLICATIONS IN AN ENTITY MODEL

(75) Inventors: Michael Norring, Sammamish, WA (US); Kishore Chaliparambil, Snoqualmie, WA (US); Kalpana Narayanaswamy, Redmond, WA (US); Jonathan Gordon, Woodinville, WA (US); Jean-Jacques Dubray, Sammamish, WA (US); Bryan Grunow, Issaquah, WA (US); Michael Callahan, Kirkland, WA (US); Bill Orebaugh, Auburn, WA (US)

(73) Assignee: Attachmate Group, Seattle, WA (US)

( * ) Notice: Subject to any disclaimer, the term of this patent is extended or adjusted under 35 U.S.C. 154(b) by 1381 days.

(21) Appl. No.: 11/771,941

(22) Filed: Jun. 29, 2007
(Under 37 CFR 1.47)

(65) Prior Publication Data
US 2008/0092068 A1 Apr. 17, 2008

Related U.S. Application Data

(63) Continuation of application No. 11/703,601, filed on Feb. 6, 2007, now abandoned.

(60) Provisional application No. 60/765,537, filed on Feb. 6, 2006.

(51) Int. Cl.
*G06F 3/00* (2006.01)
*G06F 17/30* (2006.01)

(52) U.S. Cl. ........ 715/741; 715/743; 715/762; 707/792; 707/E17.048

(58) Field of Classification Search .................. 715/741, 715/743, 762; 707/E17, E17.045, E17.048, 707/9, 792
See application file for complete search history.

(56) References Cited

U.S. PATENT DOCUMENTS

| | | | | |
|---|---|---|---|---|
| 5,761,669 A * | 6/1998 | Montague et al. | ............ | 707/758 |
| 6,704,743 B1 * | 3/2004 | Martin | ............ | 707/786 |
| 7,260,849 B1 * | 8/2007 | Frazier et al. | ............ | 726/28 |
| 7,318,066 B2 * | 1/2008 | Kaufman et al. | ............ | 1/1 |
| 7,444,355 B1 * | 10/2008 | Clark et al. | ............ | 1/1 |
| 7,849,100 B2 * | 12/2010 | Brown et al. | ............ | 707/783 |
| 7,949,652 B2 * | 5/2011 | Dettinger et al. | ............ | 707/713 |
| 8,046,379 B1 * | 10/2011 | Yu et al. | ............ | 707/783 |
| 8,122,009 B2 * | 2/2012 | Dettinger et al. | ............ | 707/717 |
| 2004/0012630 A1 * | 1/2004 | Carels et al. | ............ | 345/760 |
| 2004/0046787 A1 | 3/2004 | Henry et al. | | |
| 2004/0073565 A1 * | 4/2004 | Kaufman et al. | ............ | 707/101 |
| 2004/0153992 A1 * | 8/2004 | Molina-Moreno et al. | ... | 717/105 |
| 2005/0006469 A1 * | 1/2005 | Nonneman et al. | ............ | 235/384 |
| 2005/0071749 A1 * | 3/2005 | Goerke et al. | ............ | 715/501.1 |

(Continued)

OTHER PUBLICATIONS

"BusinessObjects Web Intelligence," Business Objects Products, 4 pages, 2005.

(Continued)

*Primary Examiner* — Tadeese Hailu
(74) *Attorney, Agent, or Firm* — Schwegman, Lundber & Woessner, P.A.

(57) ABSTRACT

An associated between a data type and a user interface (UI) element such as a Page and/or Panel, and a data type allows dynamic determination of application flow including menu and menu items. This may allow a dynamic determination of all target UI elements to which an end user may navigate from a source UI element, that are capable of displaying the same record of information represented in the source UI element or a related record of information.

18 Claims, 26 Drawing Sheets

U.S. PATENT DOCUMENTS

| | | | | |
|---|---|---|---|---|
| 2006/0190391 A1* | 8/2006 | Cullen et al. | | 705/37 |
| 2006/0195476 A1* | 8/2006 | Nori et al. | | 707/104.1 |
| 2008/0065675 A1* | 3/2008 | Bozich et al. | | 707/102 |
| 2008/0120332 A1* | 5/2008 | Hunter et al. | | 707/103 R |
| 2008/0172366 A1* | 7/2008 | Hannel et al. | | 707/3 |
| 2008/0249981 A1 | 10/2008 | Norring et al. | | |
| 2008/0250071 A1 | 10/2008 | Norring et al. | | |
| 2008/0275910 A1* | 11/2008 | Molina-Moreno et al. | | 707/103 R |

OTHER PUBLICATIONS

"Connecting-the-Dots, across system boundaries," Digital Harbor, Inc. Perspective Whitepaper, 6 pages, Oct. 27, 2004.

Guo et al., "A web application using RDF/RDFS for metadata navigation," Research & Development, Thomson Legal & Regulatory, Eagan, Minnesota, 8 pages.

"Illuminating Previously Unseen Relationships," Siderean Software, Inc., 2 pages, 2006.

"Relational Navigation, Unified Discovery, Access & Participation," Siderean Software, Inc., 17 pages, Jan. 2007.

"The Business Case for Composite Applications," Digital Harbor, Inc. Product Overview, 12 pages, Oct. 27, 2004.

Thompson, "Interactive Viewing with BusinessObjects Web Intelligence XI," Business Objects Whitepaper, 24 pages, Aug. 2005.

"Why Composite Applications are the Next Big Thing," Digital Harbor, Inc. Perspective Whitepaper, 2 pages, Oct. 27, 2004.

"Why Composite Applications Need a More Refined Definition," Digital Harbor, Inc. Perspective Whitepaper, 2 pages, Oct. 27, 2004.

"Why Context Matters in Collaboration," Digital Harbor, Inc. Perspective Whitepaper, 7 pages, Oct. 27, 2004.

* cited by examiner

METHOD FOR AUTOMATING CONSTRUCTION OF THE FLOW OF DATA DRIVEN APPLICATIONS IN AN ENTITY MODEL

CROSS-REFERENCE TO RELATED APPLICATIONS

This application is a continuation of U.S. patent application Ser. No. 11/703,601, filed Feb. 6, 2007, which claims the benefit under 35 U.S.C. §119(e) of U.S. Provisional Patent Application No. 60/765,537, filed Feb. 6, 2006.

BACKGROUND OF THE INVENTION

1. Field of the Invention

The disclosure generally relates to computer-implemented enterprise solution applications.

2. Description of the Related Art

Controlling data and access to that data is one of the core components of any enterprise solution application. This is typically broken down into controlling the following for any end user: 1) what types of data can the end user see (e.g., tables); 2) how much of the data does the end user see (e.g., records); 3) what parts of the data does the end user see (e.g., columns); 4) in what context does the end user see the data (e.g., joins); and 5) what actions can the end user perform against the data (e.g., add, update or modify, and delete, etc).

Standard practices and approaches to control access rights exist in the computing arts. Unfortunately, these practices tend to focus on creating a relatively rigid structure for only solving the issue of access rights. What is often unappreciated is how closely access rights are tied to the process and usability of the application.

Many vendors of enterprise solution applications are finding that rigid access rights structures are hard to implement in dynamic organizations where business requirements and processes differ from business to business, or differ from time-to-time for any given business. What often happens is that the end users or customers of the enterprise solution vendors need to use parts of the structure for other business purposes, but often are disappointed to find that they cannot. Furthermore, as the enterprise solution applications are extended to support more functionality (e.g., internal vs. externally focused), the assumptions made in the design often break down. Enterprise solution vendors are finding that the access rights structure is often so fundamental to the application that the applications cannot easily be re-written to support a new paradigm. Underling this problem is the fact that the implementation of access rights has always been deemed a technology problem. What has often been ignored is the overlap and interaction between access rights with the business process. A new approach to providing enterprise solutions is desirable in order to provide end user flexibility, and to address these problems.

SUMMARY

In one aspect, a method of dynamically determining application flows at run time comprises determining at least one data type to which a first user has access rights that are based at least in part on inherited access rights; identifying each of a number of data presentation user interface elements capable of representing the determined at least one data type; and dynamically building a navigation user interface element that provides a user selectable representation of each of the identified number of data presentation user interface elements capable of representing the determined at least one data type to which a user may navigate.

The method may include receiving a user selection of one of the representations, the user selection indicative of one of the number of user interface elements capable of representing the determined at least one data type; dynamically building a data presentation user interface element corresponding to the user selected representation; and presenting the dynamically built data presentation user interface element to the user. In addition, the determining at least one data type to which a first user has access rights may include accessing a stored set of access rights assigned to a first entity object that represents the user, the access rights defining a right of the entity object to access data by data type. Furthermore, the determining at least one data type to which a first user has access rights may include determining if the first entity object has at least one direct inheritance relationship with at least one other entity object; for each of the direct inheritance relationships that the first entity object is determined to have with at least one other entity object, accessing a stored set of access rights assigned to the other entity object, the access rights defining a right of the other entity object to access data by data type; and adding the data types from the stored set of access rights assigned to the other entity object, if any, to the determined data types for the first entity object. Also, the determining at least one data type to which a first user has access rights may include determining if the first entity object has at least one indirect inheritance relationship with at least one further entity object through the at least one other entity object; and for each of the indirect inheritance relationships that the first entity object is determined to have with at least one further entity object, accessing a stored set of access rights assigned to the further entity object, the access rights defining a right of the other entity object to access data by data type; and adding the data types from the stored set of access rights assigned to the further entity object, if any, to the determined data types for the first entity object.

In another aspect, a method of implementing an access rights regime in a computing environment comprises determining a set of access rights of at least a first entity object to access at least one of a functionality or a piece of data; determining if the first entity object has a relationship with at least one other entity object; for each relationship that the first entity object is determined to have with at least one other entity object, determining based on the relationship whether the first entity object inherits a set of access rights of the other entity object to access at least one of the functionality or the data; and for each of the at least one of the functionality or the piece of data, providing the first entity object with access to the functionality or the piece of data if the first entity object has the right to access the functionality or the piece of data or if the first entity object has inherited the right to access the functionality or the piece of data.

The first entity object may represent an internal user and the at least one other entity object may represent one of a group, a role, or a project. In addition, the first entity object may represent one of an external customer or an external partner, and the at least one other entity object represents one of a group, a role, or a project. Furthermore, the right to access the piece of data may be determined by a data type in which the piece of data is classed. Also, the set of access rights may define the right to access to a single functionality or a single piece of data.

In a further aspect, a method of populating user interface elements based on a context comprises storing at least a first context value of a first data type in at least a first context store based at least in part on at least one user input received via a first user interface element; determining at least one data type represented by at least a first portion of a second user interface element; determining based at least in part on the first context store, at least one context value based at least in part on the determined at least one data type; and dynamically populating at least the first portion of the second user interface element based at least in part on the determined at least one context value.

In addition, dynamically populating at least the first portion of the second user interface element based at least in part on the determined at least one context value may include populating the first portion of the second user interface element with the determined at least one context value. Furthermore, dynamically populating at least the first portion of the second user interface element based at least in part on the determined at least one context value may include forming a query based on the determined context value; receiving a response to the query; and populating the first portion of the second user interface element with the received response to the query. Also, the received response to the query may be a second context value. In addition, the context may be selected from at least one of a user context, a group context and an application context.

In another aspect, a method of personalizing user interfaces in a model driven computing environment comprises determining at least a first context value that references an entity object representing a user; for each of a number of user interface elements, determining based at least in part on the first context value whether to load a base set of metadata defining the respective user interface element or a variation set of metadata defining the respective user interface element; and for each of the number of user interface elements, loading at a runtime the determined one of the base set of metadata defining the respective user interface element or the variation set of metadata defining the respective user interface element.

Determining at least a first context value may include determining an entity object representing one of a user, a group, or a project. In addition, determining at least a first context value may include determining a first entity object and a second entity object, each of the first and the second entity objects representing a respective one of a user, a group, or a project. The method may further include retrieving at least one of the base set of metadata or the variation set of metadata from a first repository before loading the determined one of the base set of metadata defining the respective user interface element or the variation set of metadata defining the respective user interface element. Also, loading at run time the variation set of metadata defining the respective user interface element may include substituting the variation set of metadata defining the respective user interface element for the base set of metadata defining the respective user interface element.

In addressing the problems noted above, an Entity Model approach to providing enterprise solutions described herein makes the access rights structure a business, not a technology solution. The Entity Model approach is flexible, supports future extended functionality, different business requirements/processes, and allows re-use.

The Entity Model approach may address a variety of problems. For example, the Entity Model approach may address the problem of access control to Objects; that is determining what Objects an end user is entitled to see, for example Pages and/or Panels. Also for example, the Entity Model approach may address the problem of access control to data; that is determining what filters and controls are available on the Panel and Business Object that an end user is entitled to see, in order to control which parts of the data the end user is allowed to see. As another example, the Entity Model approach may address the problem of access control to manipulating data; that is determining what actions a user is allowed to perform on the data, for example Add, Modify, Delete, etc. As still another example, the Entity Model approach may address the problem of development control; that is determining what customization an end user is allowed to perform, and to which objects. As yet another example, the Entity Model approach may address the problem of testing control; that is determining whether an end user is allowed to create a test environment, and which collection of objects are to be tested. In still another example, the Entity Model approach may address the problem of deployment control; that is determining whether an end user is allowed to deploy metadata changes to the Entity Model production, and what collection of objects are to be deployed. In yet still another example, the Entity Model approach may address the problem of administration control; that is determining whether an end user has administrative access rights to the Entity Model. As a further example, the Entity Model approach may address the problem of routing of data; that is determining how and/or to whom is data ownership and assignment routed, for example, Service Request assigned to. As still a further example, the Entity Model approach may address the problem of authentication; that is controlling the authentication of the user. As yet still a further example, the Entity Model approach may address the problem of hierarchies; that is accommodating business hierarchies for data visibility, rollups, escalations, routing etc (e.g., User Hierarchy, Organization Group Hierarchies). As an even further example, the Entity Model approach may address the problem of mobility of assignment; that is facilitating the mobility of users moving between organizations and leaving the company without having to do a lot of administration. As an additional example, the Entity Model approach may address the problem of team support; that is accommodating the use of teams within an organization, for example for routing, assignments etc. As yet another additional example, the Entity Model approach may address the problem of re-useable and expandable structure; that is providing an access rights structure that can be used to solve other non-user business requirements (e.g., Projects, External Contacts Login, Partner and Vendor Logins).

In one aspect, a method of dynamically determining application flows at run time comprises determining at least one data type to which a first user has access rights; identifying each of a number of data presentation user interface elements capable of representing the determined at least one data type; and dynamically building a navigation user interface element that provides a user selectable representation of each of the identified number of data presentation user interface elements capable of representing the determined at least one data type to which a user may navigate. The method may include receiving a user selection of one of the representations, the user selection indicative of one of the number of user interface elements capable of representing the determined at least one data type; dynamically building a data presentation user interface element corresponding to the user selected representation; and presenting the dynamically built data presentation user interface element to the user. In addition, the determining at least one data type to which a first user has access rights may include accessing a stored set of access rights assigned to a first entity object that represents the user, the access rights defining a right of the entity object to access data by data type. Furthermore, the determining at least one data type to which a first user has access rights may include determining if the first entity object has at least one direct inheritance relationship with at least one other entity object; for each of the direct inheritance relationships that the first entity object is determined to have with at least one other entity object, accessing a stored set of access rights assigned to the other entity object, the access rights defining a right of the other entity object to access data by data type; and adding the data types from the stored set of access rights assigned to the other entity object, if any, to the determined data types for the first entity object. Also, the determining at least one data type to which a first user has access rights may include determining if the first entity object has at least one indirect inheritance relationship with at least one further entity object through the at least one other entity object; and for each of the indirect inheritance relationships that the first entity object is determined to have with at least one further entity object, accessing a stored set of access rights assigned to the further entity object, the access rights defining a right of the other entity object to access data by data type; and adding the data types from the stored set of access rights assigned to the further entity object, if any, to the determined data types for the first entity object. In addition, the determining at least one data type to which a first user has access rights may include for each of a number of pieces of data displayed in a data presentation user interface element currently presented to the user, identifying a respective data type in which the respective piece of data is classed. Furthermore, the determining at least one data type to which a first user has access rights may include for each determined data type, determining if a relationship exists between the determined data type and any additional data types; and adding the additional data types, if any, to the determined data types before identifying each of the number of data presentation user interface elements capable of representing the determined at least one data type.

In another aspect, a computer-readable medium stores instructions for causing a computer to dynamically determine application flows at run time by determining at least one data type to which a first user has access rights; identifying each of a number of data presentation user interface elements capable of representing the determined at least one data type; and dynamically building a navigation user interface element that provides a user selectable representation of each of the identified number of data presentation user interface elements capable of representing the determined at least one data type to which a user may navigate. In addition, the instructions may cause the computer to dynamically determine application flows at run time further by receiving a user selection of one of the representations, the user selection indicative of one of the number of user interface elements capable of representing the determined at least one data type; dynamically building a data presentation user interface element corresponding to the user selected representation; and presenting the dynamically built data presentation user interface element to the user. Furthermore, the determining at least one data type to which a first user has access rights may include accessing a stored set of access rights assigned to a first entity object that represents the user, the access rights defining a right of the entity object to access data by data type. The determining at least one data type to which a first user has access rights may include determining if the first entity object has at least one direct inheritance relationship with at least one other entity object; for each of the direct inheritance relationships that the first entity object is determined to have with at least one other entity object, accessing a stored set of access rights assigned to the other entity object, the access rights defining a right of the other entity object to access data by data type; and adding the data types from the stored set of access rights assigned to the other entity object, if any, to the determined data types for the first entity object. The determining at least one data type to which a first user has access rights may include determining if the first entity object has at least one indirect inheritance relationship with at least one further entity object through the at least one other entity object; and for each of the indirect inheritance relationships that the first entity object is determined to have with at least one further entity object, accessing a stored set of access rights assigned to the further entity object, the access rights defining a right of the other entity object to access data by data type; and adding the data types from the stored set of access rights assigned to the further entity object, if any, to the determined data types for the first entity object. In addition, the determining at least one data type to which a first user has access rights may include for each of a number of pieces of data displayed in a data presentation user interface element currently presented to the user, identifying a respective data type in which the respective piece of data is classed. Also, the determining at least one data type to which a first user has access rights may include for each determined data type, determining if a relationship exists between the determined data type and any additional data types; and adding the additional data types, if any, to the determined data types before identifying each of the number of data presentation user interface elements capable of representing the determined at least one data type.

In yet another aspect, a method of dynamically determining application flows at run time comprises determining each of a number of data types to which a first entity object has at least one of assigned access rights or inherited access rights; and dynamically building a navigation menu user interface element during run time that provides a selection list of each of a number of data presentation user interface elements capable of representing data of the determined data types to which the first entity object has at least one of assigned access rights or inherited access rights. The method may include presenting the dynamically built navigation menu user interface element in response to a user input. The method may include, in response to a user selection of one of the data presentation user interface elements capable of representing the determined at least one data type, dynamically building the selected one of the data presentation user interface elements. The method may include presenting the dynamically built selected one of the number of data presentation user interface elements. In addition, the determining each of a number of data types to which a first entity object has at least one of assigned access rights or inherited access rights may include determining whether the first entity object inherits access rights directly from a second entity object. Furthermore, the determining each of a number of data types to which a first entity object has at least one of assigned access rights or inherited access rights may include determining whether the first entity object inherits access rights indirectly from a third entity object from who the second entity object directly inherits access rights. Also, the assigned access rights and the inherited access rights may provide the entity object with at least the right to view data of the respective data type. In addition, the assigned access rights and the inherited access rights may provide the entity object with at the right to modify data of the respective data type. Also, the dynamically building a navigation menu user interface element during run time that provides a selection list of each of a number of data presentation user interface elements capable of representing data of the determined data types to which the first entity object has at least one of assigned access rights or inherited access rights may include determining a size of a pull-down menu based on the number of data presentation user interface elements capable of representing data of the determined data types to which the first entity object has at least one of assigned access rights or inherited access rights, and populating the pull-down menu with identifiers that uniquely identify each of the number of data presentation user interface elements capable of representing data of the determined data types to which the first entity object has at least one of assigned access rights or inherited access rights. Furthermore, the dynamically building a navigation menu user interface element during run time that provides a selection list of each of a number of data presentation user interface elements capable of representing data of the determined data types to which the first entity object has at least one of assigned access rights or inherited access rights may include building a page comprising at least one panel.

In another aspect, a computer-readable medium stores instructions for causing a computer to dynamically determine application flows at run time by determining each of a number of data types to which a first entity object has at least one of assigned access rights or inherited access rights; and dynamically building a navigation menu user interface element during run time that provides a selection list of each of a number of data presentation user interface elements capable of representing data of the determined data types to which the first entity object has at least one of assigned access rights or inherited access rights. In addition, the instructions may cause the computer to dynamically determine applications flows at run time by presenting the dynamically built navigation menu user interface element in response to a user input. Furthermore, the instructions may cause the computer to dynamically determine applications flows at run time by, in response to a user selection of one of the data presentation user interface elements capable of representing the determined at least one data type, dynamically building the selected one of the data presentation user interface elements. Also, the instructions may cause the computer to dynamically determine applications flows at run time by presenting the dynamically built selected one of the number of data presentation user interface elements. In addition, the determining each of a number of data types to which a first entity object has at least one of assigned access rights or inherited access rights may include determining whether the first entity object inherits access rights directly from a second entity object. Furthermore, the determining each of a number of data types to which a first entity object has at least one of assigned access rights or inherited access rights may include determining whether the first entity object inherits access rights indirectly from a third entity object from who the second entity object directly inherits access rights. Also, the dynamically building a navigation menu user interface element during run time that provides a selection list of each of a number of data presentation user interface elements capable of representing data of the determined data types to which the first entity object has at least one of assigned access rights or inherited access rights may include determining a size of a pull-down menu based on the number of data presentation user interface elements capable of representing data of the determined data types to which the first entity object has at least one of assigned access rights or inherited access rights, and populating the pull-down menu with identifiers that uniquely identify each of the number of data presentation user interface elements capable of representing data of the determined data types to which the first entity object has at least one of assigned access rights or inherited access rights. In addition, the dynamically building a navigation menu user interface element during run time that provides a selection list of each of a number of data presentation user interface elements capable of representing data of the determined data types to which the first entity object has at least one of assigned access rights or inherited access rights may include building a page comprising at least one panel.

In a further aspect, a method of implementing an access rights regime in a computing environment comprises determining a set of access rights of at least a first entity object to access at least one of a functionality or a piece of data; determining if the first entity object has a relationship with at least one other entity object; for each relationship that the first entity object is determined to have with at least one other entity object, determining based on the relationship whether the first entity object inherits a set of access rights of the other entity object to access at least one of the functionality or the data; and for each of the at least one of the functionality or the piece of data, providing the first entity object with access to the functionality or the piece of data if the first entity object has the right to access the functionality or the piece of data or if the first entity object has inherited the right to access the functionality or the piece of data. The first entity object may represent an internal user and the at least one other entity object may represent one of a group, a role, or a project. In addition, the first entity object may represent one of an external customer or an external partner, and the at least one other entity object represents one of a group, a role, or a project. Furthermore, the right to access the piece of data may be determined by a data type in which the piece of data is classed. Also, the set of access rights may define the right to access to a single functionality or a single piece of data. In addition, the determining based on the relationship whether the first entity object inherits a set of access rights of the other entity object to access at least one of the functionality or the data may be performed during a run time. Furthermore, the method may include dynamically defining a relationship between the first entity object and the at least one other entity object during a run time. Also, the determining a set of access rights of at least a first entity object to access at least one of a functionality or a piece of data may include accessing a corresponding access rights object. In addition, the determining if the first entity object has a relationship with at least one other entity object may include accessing a corresponding relationship rights object. Furthermore, providing the first entity object with access to the functionality or the piece of data if the first entity object has the right to access the functionality or the piece of data or if the first entity object has inherited the right to access the functionality or the piece of data may include presenting a user interface element including the functionality or the piece of data.

In another aspect, a computer-readable medium stores instructions for causing a computer to implement an access rights regime in a computing environment, by determining a set of access rights of at least a first entity object to access at least one of a functionality or a piece of data; determining if the first entity object has a relationship with at least one other entity object; for each relationship that the first entity object is determined to have with at least one other entity object, determining based on the relationship whether the first entity object inherits a set of access rights of the other entity object to access at least one of the functionality or the data; and for each of the at least one of the functionality or the piece of data, providing the first entity object with access to the functionality or the piece of data if the first entity object has the right to access the functionality or the piece of data or if the first entity object has inherited the right to access the functionality or the piece of data. In addition, the first entity object may represent an internal user and the at least one other entity object represents one of a group, a role, or a project. Furthermore, the first entity object may represent one of an external customer or an external partner, and the at least one other entity object represents one of a group, a role, or a project. Also, the right to access the piece of data may be determined by a data type in which the piece of data is classed. In addition, the set of access rights may define the right to access to a single functionality or a single piece of data. In addition, the determining based on the relationship whether the first entity object inherits a set of access rights of the other entity object to access at least one of the functionality or the data may be performed during a run time. Furthermore, the instructions may cause the computer to implement the access rights regime further by dynamically defining a relationship between the first entity object and the at least one other entity object during a run time. Also, the determining a set of access rights of at least a first entity object to access at least one of a functionality or a piece of data may include accessing a corresponding access rights object. In addition, determining if the first entity object has a relationship with at least one other entity object may include accessing a corresponding relationship rights object. Furthermore, providing the first entity object with access to the functionality or the piece of data if the first entity object has the right to access the functionality or the piece of data or if the first entity object has inherited the right to access the functionality or the piece of data may include presenting a user interface element including the functionality or the piece of data.

In a further aspect, a method of populating user interface elements based on a context comprises storing at least a first context value of a first data type in at least a first context store based at least in part on at least one user input received via a first user interface element; determining at least one data type represented by at least a first portion of a second user interface element; determining based at least in part on the first context store, at least one context value based at least in part on the determined at least one data type; and dynamically populating at least the first portion of the second user interface element based at least in part on the determined at least one context value. In addition, dynamically populating at least the first portion of the second user interface element based at least in part on the determined at least one context value may include populating the first portion of the second user interface element with the determined at least one context value. Furthermore, dynamically populating at least the first portion of the second user interface element based at least in part on the determined at least one context value may include forming a query based on the determined context value; receiving a response to the query; and populating the first portion of the second user interface element with the received response to the query. Also, the received response to the query may be a second context value. In addition, the context may be selected from at least one of a user context, a group context and an application context. In addition, dynamically populating at least the first portion of the second user interface element based at least in part on the determined at least one context value may include dynamically populating a field of at least one of a window, a panel, a dialog or a menu. The method may further include dynamically building the second user interface element in response to a user selected navigation indication. The method may further include updating at least the first context value of the first data type in at least the first context store based at least in part on at least another user input received via the first user interface element.

In another aspect, a computer-readable medium stores instructions for causing a computer to populate user interface elements based on a context, by storing at least a first context value of a first data type in at least a first context store based at least in part on at least one user input received via a first user interface element; determining at least one data type represented by at least a first portion of a second user interface element; determining based at least in part on the first context store, at least one context value based at least in part on the determined at least one data type; and dynamically populating at least the first portion of the second user interface element based at least in part on the determined at least one context value. In addition, dynamically populating at least the first portion of the second user interface element based at least in part on the determined at least one context value may include populating the first portion of the second user interface element with the determined at least one context value. Furthermore, dynamically populating at least the first portion of the second user interface element based at least in part on the determined at least one context value may include forming a query based on the determined context value; receiving a response to the query; and populating the first portion of the second user interface element with the received response to the query. Also, the received response to the query may be a second context value. In addition, the context may be selected from at least one of a user context, a group context and an application context. In addition, dynamically populating at least the first portion of the second user interface element based at least in part on the determined at least one context value may include dynamically populating a field of at least one of a window, a panel, a dialog or a menu. The computer-readable medium may further include dynamically building the second user interface element in response to a user selected navigation indication. The computer-readable medium may also include updating at least the first context value of the first data type in at least the first context store based at least in part on at least another user input received via the first user interface element.

In yet another aspect, a method of populating user interface elements based on a context comprises in navigating from a first user interface element to a second user interface element, determining at least one context value for at least one data type represented by the second user interface element based at least in part on at least one context value of at least one data type represented by the first user interface element; and populating at least a first portion of the second user interface element of the at least one data type based at least in part on the at least one context value for at least one data type represented by the second user interface element determined based at least in part on the at least one context value of the at least one data type represented by the first user interface element. In addition, the determining at least one context value for at least one data type represented by the second user interface element based at least in part on at least one context value of at least one data type represented by the first user interface element may include retrieving the at least one context value from a first context store that stores pairs of data types and arrays of context values. Furthermore, the determining at least one context value for at least one data type represented by the second user interface element based at least in part on at least one context value of at least one data type represented by the first user interface element may include retrieving the at least one context value from a first context store that stores pairs of data types and arrays of context values; forming a query based on the retrieved at least one context value; and receiving a response to the query. Also, the populating at least a first portion of the second user interface element of the at least one data type based at least in part on the at least one context value for at least one data type represented by the second user interface element determined based at least in part on the at least one context value of the at least one data type represented by the first user interface element may include populating the first portion of the second user interface element with a context value received in response to the query. The method may further include, in response to each of a number of user selections of context values via the first user interface element, storing the context value by data type in a context store. In addition, the second user interface element may be a page comprised of at least one primary panel and the populating at least a first portion of the second user interface element of the at least one data type may include populating a portion of the at least one primary panel.

In another aspect, a computer-readable medium stores instructions for causing a computer to populate user interface elements based on a context, by, in navigating from a first user interface element to a second user interface element, determining at least one context value for at least one data type represented by the second user interface element based at least in part on at least one context value of at least one data type represented by the first user interface element; and populating at least a first portion of the second user interface element of the at least one data type based at least in part on the at least one context value for at least one data type represented by the second user interface element determined based at least in part on the at least one context value of the at least one data type represented by the first user interface element. The determining at least one context value for at least one data type represented by the second user interface element based at least in part on at least one context value of at least one data type represented by the first user interface element may include retrieving the at least one context value from a first context store that stores pairs of data types and arrays of context values. In addition, the determining at least one context value for at least one data type represented by the second user interface element based at least in part on at least one context value of at least one data type represented by the first user interface element may include retrieving the at least one context value from a first context store that stores pairs of data types and arrays of context values; forming a query based on the retrieved at least one context value; and receiving a response to the query. Furthermore, populating at least a first portion of the second user interface element of the at least one data type based at least in part on the at least one context value for at least one data type represented by the second user interface element determined based at least in part on the at least one context value of the at least one data type represented by the first user interface element may include populating the first portion of the second user interface element with a context value received in response to the query. The computer-readable medium may further comprise, in response to each of a number of user selections of context values via the first user interface element, storing the context value by data type in a context store. Furthermore, the second user interface element may be a page comprised of at least one primary panel and the populating at least a first portion of the second user interface element of the at least one data type may include populating a portion of the at least one primary panel.

In a further aspect, a method of personalizing user interfaces in a model driven computing environment comprises determining at least a first context value; for each of a number of user interface elements, determining based at least in part on the first context value whether to load a base set of metadata defining the respective user interface element or a variation set of metadata defining the respective user interface element; and for each of the number of user interface elements, loading at a runtime the determined one of the base set of metadata defining the respective user interface element or the variation set of metadata defining the respective user interface element. Determining at least a first context value may include determining an entity object representing one of a user, a group, or a project. In addition, determining at least a first context value may include determining a first entity object and a second entity object, each of the first and the second entity objects representing a respective one of a user, a group, or a project. The method may further include retrieving at least one of the base set of metadata or the variation set of metadata from a first repository before loading the determined one of the base set of metadata defining the respective user interface element or the variation set of metadata defining the respective user interface element. Also, loading at run time the variation set of metadata defining the respective user interface element may include substituting the variation set of metadata defining the respective user interface element for the base set of metadata defining the respective user interface element. In addition, loading at run time the variation set of metadata defining the respective user interface element may include applying a set of variations to the base set of metadata to produce the variation set of metadata. Furthermore, the determining based at least in part on the first context value whether to load a base set of metadata defining the respective user interface element or a variation set of metadata defining the respective user interface element may include determining to load the first variation set of metadata defining a first user interface element based on the first context value and determining to load a second variation set of metadata further defining the first user interface element based on a second context value. Also, the first context value may identify a group entity object and the second context value may identify a user entity object that is a member of the group entity object.

In another aspect, a computer-readable medium stores instructions for causing a computer to personalize user interfaces in a model driven computing environment, by determining at least a first context value; for each of a number of user interface elements, determining based at least in part on the first context value whether to load a base set of metadata defining the respective user interface element or a variation set of metadata defining the respective user interface element; and for each of the number of user interface elements, loading at a runtime the determined one of the base set of metadata defining the respective user interface element or the variation set of metadata defining the respective user interface element. Determining at least a first context value may include determining an entity object representing one of a user, a group, or a project. In addition, determining at least a first context value may include determining a first entity object and a second entity object, each of the first and the second entity objects representing a respective one of a user, a group, or a project. The computer-readable medium may further include instructions for retrieving at least one of the base set of metadata or the variation set of metadata from a first repository before loading the determined one of the base set of metadata defining the respective user interface element or the variation set of metadata defining the respective user interface element. In addition, loading at run time the variation set of metadata defining the respective user interface element may include substituting the variation set of metadata defining the respective user interface element for the base set of metadata defining the respective user interface element. Furthermore, loading at run time the variation set of metadata defining the respective user interface element may include applying a set of variations to the base set of metadata to produce the variation set of metadata. Also, the determining based at least in part on the first context value whether to load a base set of metadata defining the respective user interface element or a variation set of metadata defining the respective user interface element may include determining to load the first variation set of metadata defining a first user interface element based on the first context value and determining to load a second variation set of metadata further defining the first user interface element based on a second context value. In addition, the first context value may identify a group entity object and the second context value may identify a user entity object that is a member of the group entity object.

In yet another aspect, a method of personalizing user interfaces in a computing environment comprises receiving a number of inputs indicative of at least one variation to a first base user interface element, the first base user interface element defined by a first base set of metadata; and storing at least a first variation set of metadata that defines a first variation user interface element that includes the at least one variation, the first variation set of metadata associated with a first entity object. The method may further comprise determining at least a first context value; determining whether to load the first base set of metadata defining the first base user interface element or the first variation set of metadata defining the first variation user interface element based at least on part on the determined context value; at a runtime, loading the determined one of the first base set of metadata defining the first base user interface element or the variation set of metadata defining the first variation user interface element. The method may also comprise receiving a number of inputs indicative of at least another variation to the first base user interface element; and storing at least a second variation set of metadata that defines a second variation user interface element that includes the at least another variation, the second variation set of metadata associated with a second entity object, different from the first entity object. The method may further comprise determining at least a first context value; determining whether to load the first base set of metadata defining the first base user interface element, the first variation set of metadata defining the first variation user interface element or the second variation set of metadata defining the second variation user interface element based at least on part on the determined context value; and at a runtime, loading the determined one of the first base set of metadata defining the first base user interface element, the first variation set of metadata defining the first variation user interface element, or the second variation set of metadata defining the second variation user interface element. The method may also comprise determining at least a first context value; determining whether to load the first base set of metadata defining the first base user interface element, the first variation set of metadata defining the first variation user interface element and the second variation set of metadata defining the second variation user interface element based at least on part on the determined context value; and at a runtime, loading the first and the second variation sets of metadata defining the first and the second variation user interface elements. In addition, the first variation set of metadata may be associated with a group entity object. Furthermore, the second variation set of metadata may be associated with a user entity object, the user entity object being a member of the group entity object.

In another aspect, a computer-readable medium stores instructions for causing a computer to personalize user interfaces, by receiving a number of inputs indicative of at least one variation to a first base user interface element, the first base user interface element defined by a first base set of metadata; and storing at least a first variation set of metadata that defines a first variation user interface element that includes the at least one variation, the first variation set of metadata associated with a first entity object. The instructions may further cause the computer to personalize user interfaces by determining at least a first context value; determining whether to load the first base set of metadata defining the first base user interface element or the first variation set of metadata defining the first variation user interface element based at least on part on the determined context value; at a runtime, loading the determined one of the first base set of metadata defining the first base user interface element or the variation set of metadata defining the first variation user interface element. The instructions may further cause the computer to personalize user interfaces by receiving a number of inputs indicative of at least another variation to the first base user interface element; and storing at least a second variation set of metadata that defines a second variation user interface element that includes the at least another variation, the second variation set of metadata associated with a second entity object, different from the first entity object. The instructions may further cause the computer to personalize user interfaces further by determining at least a first context value; determining whether to load the first base set of metadata defining the first base user interface element, the first variation set of metadata defining the first variation user interface element or the second variation set of metadata defining the second variation user interface element based at least on part on the determined context value; and at a runtime, loading the determined one of the first base set of metadata defining the first base user interface element, the first variation set of metadata defining the first variation user interface element, or the second variation set of metadata defining the second variation user interface element. The instructions may further cause the computer to personalize user interfaces further by determining at least a first context value; determining whether to load the first base set of metadata defining the first base user interface element, the first variation set of metadata defining the first variation user interface element and the second variation set of metadata defining the second variation user interface element based at least on part on the determined context value; and at a runtime, loading the first and the second variation sets of metadata defining the first and the second variation user interface elements. In addition, the first variation set of metadata may be associated with a group entity object. Furthermore, the second variation set of metadata may be associated with a user entity object, the user entity object being a member of the group entity object.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
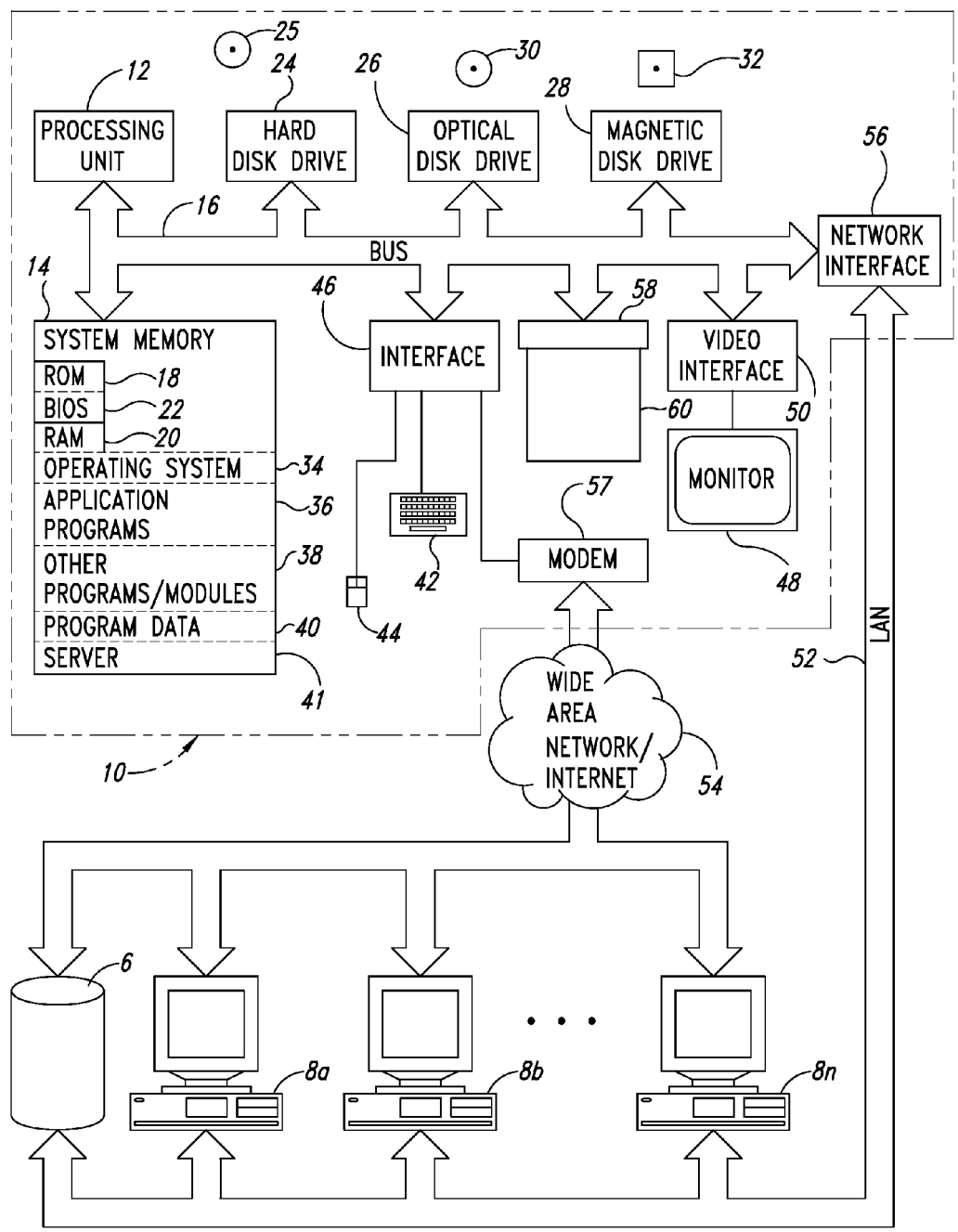
FIG. 1A is a functional block diagram of a networked computing system suitable for operating Entity Model environment according to at least one illustrated embodiment.

In the following description, certain specific details are set forth in order to provide a thorough understanding of various embodiments of the invention. However, one skilled in the art will understand that various embodiments may be practiced without these details. In other instances, well-known structures associated with computing systems and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "an embodiment" or "various embodiments" means that a particular feature, structure or characteristic described in connection with the embodiment is included in at least one embodiment. Thus, the appearance of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

A method for automating the construction of the flow of data-driven applications is described. The method relies on the fact that when data is organized in interrelated data types, an application user, provided he or she has the appropriate access rights, looking at a record of a given data type should be able to navigate freely to any user interface that is capable of representing the same data type (usually with a different level of details) or related data types. When the data types and their respective relationship is known at run-time, and when the association between a user interface and the data type it represents is also known at run-time, it is possible to dynamically computer application flows (e.g., menus and menu items) that would allow a given user to navigate from one record of information represented in one user interface (source) to either the same record of information represented in a different user interface (target), or a related record of information (via data type relationships) in a different user interface.

Environment

The following discussion provides a brief, general description of a suitable computing environment in which the embodiments described herein may be implemented. Although not required, various embodiments will be described in the general context of computer-executable instructions, such as program application modules, objects, or macros being executed by a personal computer. Those skilled in the relevant art will appreciate that various embodiments can be practiced with other computing system configurations, including handheld devices, multiprocessor systems, microprocessor-based or programmable consumer electronics, networked personal computers (PCs), minicomputers, mainframe computers, and the like. Various embodiments can be practiced in distributed computing environments where tasks or modules are performed by remote processing devices, which are linked through a communications network. In a distributed computing environment, program modules may be located in both local and remote memory storage devices.

FIG. 1A shows a repository 6 and a number of end user computing systems 8a-8n networked with a host computing system 10. The host computing system 10 may, for example, be operated by an enterprise solution application vendor, or an end user organization. The end user computing systems 8a-8n may, for example, be operated by one or more end users, such as employees, partners, or customers of the end user organization. The end user computing systems 8a-8n may take the form of any of the variety of types discussed above, which may run a networking client, for example a Web browser. The host computing system 10 may take the form of any of the variety of types discussed above, which may run a networking client, for example a server. While the discussion immediately below is directed to the host computing system 10, many of the structures, functions and other aspects are relevant to the structure and operation of the end user computing systems 8a-8n, and thus will not be repeated in the interest of brevity and clarity.

The host computing system 10 includes a processor unit 12, a system memory 14 and a system bus 16 that couples various system components including the system memory 14 to the processing unit 12. The processing unit 12 may be any logical processing unit, such as one or more central processing units (CPUs), digital signal processors (DSPs), application-specific integrated circuits (ASIC), etc. Unless described otherwise, the construction and operation of the various blocks shown in FIG. 1A are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the host computing system 10, such as during startup.

The host computing system 10 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the host computing system 10. Although the depicted host computing system 10 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a server 41 for permitting the host computing system 10 to exchange data with sources such as Websites of the Internet, corporate intranets, or other networks, as well as other server applications on server computers. The server 41 is markup language based, such as hypertext markup language ("HTML"), and operate with markup languages that use syntactically delimited characters added to the data of a document to represent the structure of the document.

While shown in FIG. 1A as being stored in the system memory, the operating system 34, application programs 36, other program modules 38, program data 40 and server 41 can be stored on the hard disk 25 of the hard disk drive 24, the optical disk 30 and the optical disk drive 26 and/or the magnetic disk 32 of the magnetic disk drive 28. A user can enter commands and information to the host computing system 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The host computing system 10 can include other output devices such as speakers, printers, etc.

The host computing system 10 can operate in a networked environment using logical connections to one or more repositories and/or end user computing systems 8a-8n. The host computing system 10 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the host computing system 10 is connected to the LAN 52 through an adapter or network interface 56 (communicatively linked to the bus 16). When used in a WAN networking environment, the host computing system 10 often includes a modem 57 or other device for establishing communications over the WAN/Internet 54. The modem 57 is shown in FIG. 1A as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 1A are only some examples of establishing communication links between computers and/or robotic systems 60, and other links may be used, including wireless links.

The host computing system 10 may include one or more interfaces such as slot 58 to allow the addition of devices either internally or externally to the host computing system 10. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory, collectively referenced as 60.

The term "computer-readable medium" as used herein refers to any medium that participates in providing instructions to processor unit 12 for execution. Such a medium may take many forms, including but not limited to, non-volatile media, volatile media, and transmission media. Non-volatile media includes, for example, hard, optical or magnetic disks 25, 30, 32, respectively. Volatile media includes dynamic memory, such as system memory 14. Transmission media includes coaxial cables, copper wire and fiber optics, including the wires that comprise system bus 16. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor unit 12 for execution. For example, the instructions may initially be carried on a magnetic disk of a remote computer. The remote computer can load the instructions into its dynamic memory and send the instructions over a telephone line using a modem. A modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processor unit 12 retrieves and executes the instructions. The instructions received by system memory 14 may optionally be stored on storage device either before or after execution by processor unit 12.

Figure 1B:
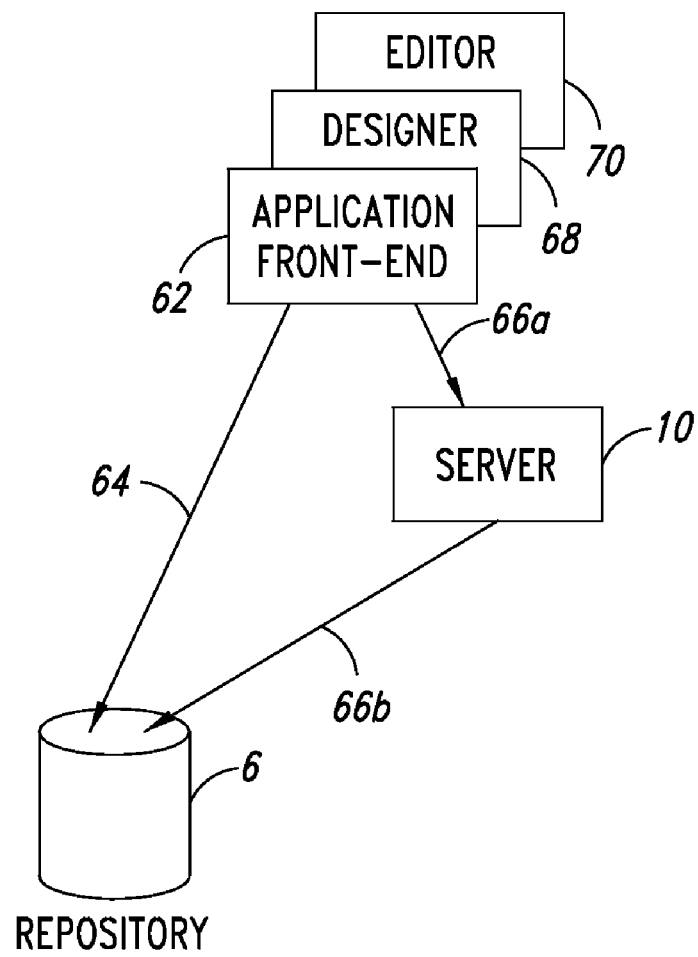
FIG. 1B is a schematic diagram of the networked computing system according to one illustrated embodiment.

FIG. 1B shows the networked computing environment according to one illustrated embodiment. The Entity Model application comprises an application front end 62 and the repository 6. The repository 6 is a permanent storage medium for metadata. The repository 6 may be specific to each end user, or shared between some or all end users. The repository 6 (only one illustrated) may run on the same computing system as the application front end 62, or on another computing system accessible over the network 52, 54 (FIG. 1A). The repository 6 may be accessed directly by the application front end 62, for example as illustrated by arrow 64. Alternatively or additionally, the repository 6 may be accessed via an intermediary such as the host computing system 10 as illustrated by arrows 66a, 66b.

As discussed below, the metadata may be personalized by an end user directly via the front end application, or via a designer tool 68 or any other editing application 70 capable of editing the metadata either directly by interacting with the repository 6 or indirectly via server 10. Metadata may also be personalized by editing as intermediate representation of the metadata.

The Entity Model

Figure 2:
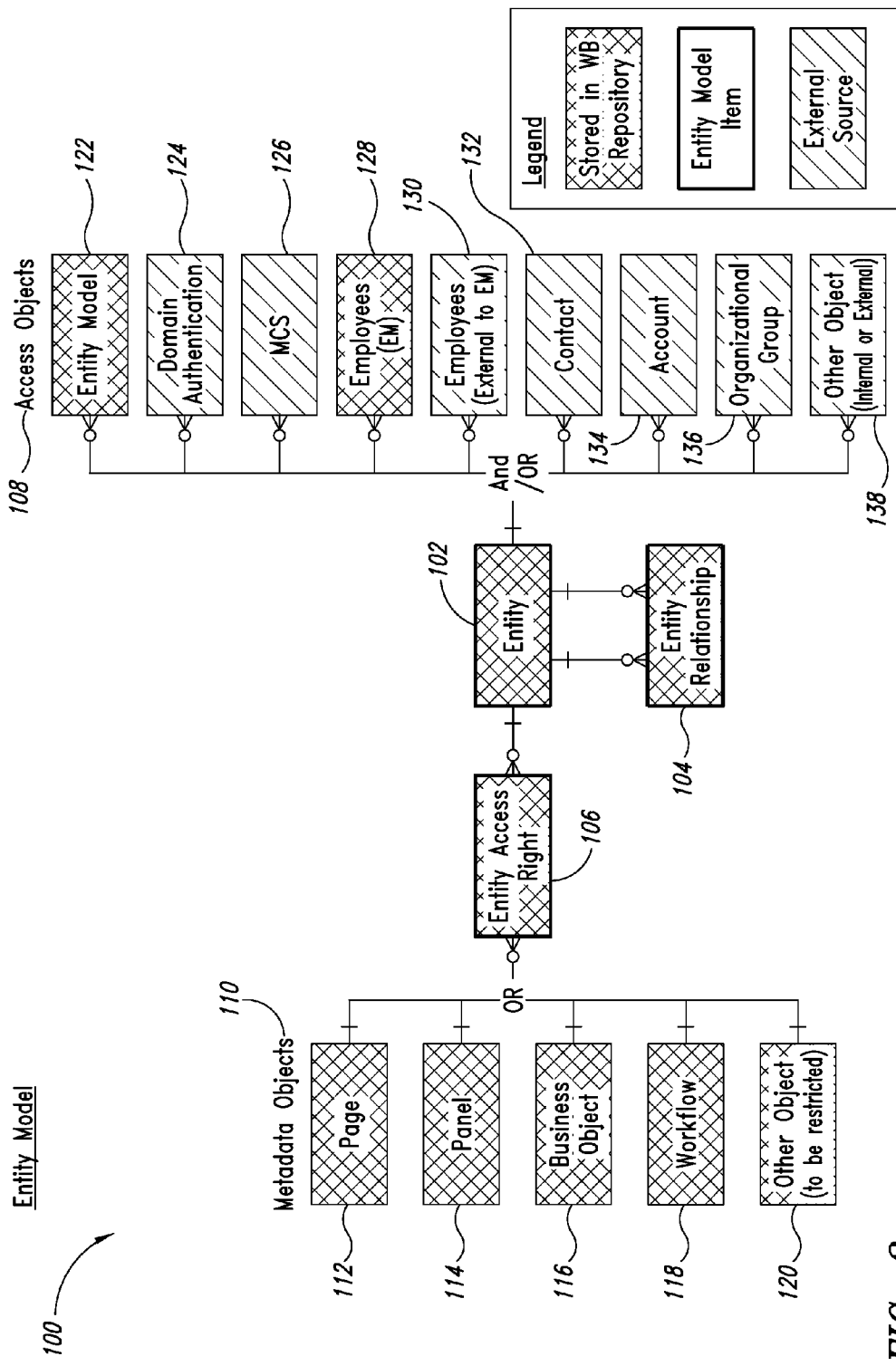
FIG. 2 is a schematic diagram of an Entity Model schema for implementing an Entity Model environment according to at least one illustrated embodiment.

FIG. 2 shows a schema for an Entity Model 100 according to one illustrated embodiment. The Entity Model 100 comprises three types of intersection objects: Entity Object 102, Entity Relationship Object 104, and the Entity Access Rights Object 106. The role of the Entity Model 100 is to coordinate how Access Objects 108 access Metadata Objects 110.

An Entity Object 102 is an intersection object that becomes the core of providing rights to employees, contacts, accounts, organizational groups and other objects. The Entity Object 102 is the central point to control what objects can be viewed, and what data within these objects can be seen. The Entity Object 102 is a hierarchal structure such as an intersection table that controls how, when, and what data and metadata is viewed and updated. An Entity Object 102 can represent essentially anything that needs to either login, use, or be represented to control data and/or object rights in the Entity Model 100. Entity Objects 102 may be dynamically built and administered by end user organizations and/or end users to provide rights to data and/or metadata objects, for example in Production, Development, Deployment, and/or Test phases.

An Entity Object 102 may for example represent an internal employee who is granted rights to use the Entity Model 100. Also for example, an Entity Object 102 may represent a customer or account logging in to self-service from an Entity Model thin-client (not shown). As another example, an Entity Object 102 may represent a Partner (e.g., business-to-business or B2B) logging in to interact with the Entity Model 100. As still another example, an Entity Object 102 may represent a Vendor who needs access to the Entity Model 100. Alternatively, or additionally, an Entity Object 102 may represent an external Contact logging in to self-service from the Entity Model 100. Entity Objects 102 may also represent an organizational group that represents a certain set of data that can be seen, or an organizational group that helps in determining what data is routed and assigned. An Entity Object 102 may further represent the intersection that ties an external authenticated user to the user in the Entity Model environment (e.g., Domain Authentication tied into a specific user's access rights in the Entity Model). As a further example, an Entity Object 102 may represent an Access Right Group that contains a certain set of rights in the Entity Model environment that can be shared across various users. An Entity Object 102 may represent a "guest" entity which requires some level of basic rights. Additionally or alternatively, an Entity Object 102 may represent an unknown entity that needs some level of rights in the Entity Model 100. The Entity Object 102 itself does not represent its use. Rather it is the involvement of Entity Object 102 in the entire Entity Model 100 that demonstrates its full use and purpose.

An Entity Relationship Object 104 is an intersection object that defines how two Entity Objects 102 are related. This relationship establishes a primary Entity Object's 102 inheritance from other Entity Objects 102. For example, a User Entity can inherit the Access Rights defined for a related Access Group Entity, as described in detail below.

An Entity Access Right Object 106 is an intersection object that defines the metadata objects to which the Entity Object 102 has rights. Each Entity Access Right Object 106 only defines one metadata object at a time, including the type of access.

Metadata Objects 110 may include a Page Object 112, Panel Object 114, Business Object 116, Workflow 118, and/or Other Objects 120. These represent the actual metadata to which the Entity Object 102 is provided access rights via the Entity Access Right Object 106. The term metadata is used because these objects define how User Interface (UI) elements handle and/or present data. Metadata syntax is often represented as XML, although a class definition (e.g., WinFormVB or C# class) is also appropriate.)

The method relies on the description of a data model and the association between this data model and User Interface elements that represent records of this data model. A User Interface element designates any group of User Interface controls that is logically related. A User Interface element may be an entire window or parts of the controls in the window. A User Interface element may represent a form. Multiple User Interface elements may exist in the same window, either contiguously or via mechanisms such as tabs. An application flow menu can be logically associated to any User Interface element, even if physically these menus might be aggregated into one or many menus, because logically the same action is possible from more than one User Interface element.

The Access Objects 108 include a variety of types including Entity Model Authentication 122, Domain Authentication 124, MCS 126, Employees Internal to EM 128, Employees External to EM 130, Contact 132, Account 134, Organization Group 136 and Other Object 138.

The Authentication Objects 122, 124 represent how an end user is authenticated in order to use the Entity Model 100. The end user organization can choose whether to use their own external authentication (i.e., Domain Authentication 122) or let the Entity Model application manage username and password (i.e., Entity Model Authentication 124).

The Employees Objects 128, 130 can store employee information/profiles. For example, where the Entity Object 102 represents an employee of the end user organization, the Employees EM Object 128 access object stores employee information or profile. Where the Entity Object 102 represents an employee outside the end user organization, for example, an employee of a Vendor or partner, the Employees External to EM Object 130 access object stores the related employee information or profile. The end user organization can choose whether to store the employee information or profile in the an Entity Model repository or externally in another system.

The Contact object 132 allows an Entity Object 102 that represents an external contact to get access to the Entity Model 100 (e.g., Self-Service), by associating the Entity Object 102 with the contact. The Contact Object 132 could be a federated list of contacts used in the Entity Model 100 and could be authenticated as well.

The Account Object 134 allows the provision of access to the Entity Model 100 by an account (e.g., Partners, Vendors, Customers) by associating the Account Object 134 to the Entity Object 102.

If an external source exists for defining organizational groups, then the Entity Object 102 could be tied into the profile and structure via the Organizational Group Object 136. This allows the Entity of type "Organizational Group" to be defined externally to the Entity Model 100 while still being leveraged fully in the Entity Model 100.

The Entity Object 102 should be able to be tied to any Object that the end user desires to provide access level control to, or want to use to control access to data. Thus, the Entity Model 100 includes an Other Object 138.

A variety of relationships are defined between the objects in the Entity Model 100. The Entity Object 102 is at the core of the Entity model 100. There can be many Entity Objects 102, but only one that represents the accessing entity (e.g., User).

An Entity Object 102 can have none or many Entity Relationships Objects 104 as a Primary Entity. An Entity Object 102 can have none or many Entity Relationships Objects 104 as an Associated Entity. An Entity Object 102 cannot be the Primary and the Associated Entity for any one given Entity Relationship Object 104 at the same time. In other words, an Entity Object 102 cannot have an Entity Relationship Object 104 defined against itself. An Entity Relationship Object 104 is always associated to one Primary Entity and one Associated Entity. The Primary and the Associated Entity cannot be the same.

An Entity Object 102 can have none or many Entity Access Rights Objects 106. An Entity Access Right Object 106 must have one Entity Object 102. An Entity Access Right Object 106 must have one Metadata Object (e.g., Page Object 112, Panel Object 114, Business Object 116, etc). A Metadata Object 110 can be associated to none or many different Entity Access Rights Objects 106. An Entity Object 102 can be associated to none or many different Access Objects 108. The Type of the Entity Object 102 determines with which Access Objects 108 the Entity Object 102 is associated. The Entity Object 102 can be associated to different Access Objects 108 at the same time. For example, an Entity Object 102 can be associated to an Authentication Object 124, Employee Object 128, 130, and a Contact Object 132 all at the same time.

An Entity Object 102 has an Entity Type. The Entity Type can, for example, be one of the following: 1) User; 2) Organizational Group; and 3) Access Group. The User Entity Type defines that an Entity is a user (e.g., Employee, Contact, Accounts, etc) of the Entity Model application 100. User entities would have an associated profile and login credentials provided by a combination of the access objects. The Organizational Group Entity Type help establish organizational groups that helps assign and control data to specific groups. The Access Group Entity Type identify defines what metadata objects that the user entities they are associated with are allowed to see. They allow for customers to set up basic Access Rights groups such as Administrator, Developer, Business Unit Manager, etc. The type of the Entity Object 102 doesn't necessarily change or alter the way the Entity Object 102 functions. It only helps define what the Entity Object 102 is associated to (e.g., a user has an employee profile). This allows an Organizational Group to function as an Access Group etc.

The Entity Object 102 has attributes that defines the Entity Object 102. These attributes can define whether the Entity Object 102 has certain Global Rights (e.g., can see all Pages). If the Entity Object 102 only has certain rights to objects, then these rights will be set on an individual basis in the Entity Access Rights Object 106. Table 1 represents the Entity Attributes.

TABLE 1

| ATT ID | Attribute | Values | Description |
|---|---|---|---|
| | Type | User Access Group Organization Group | Defines what type of Entity. |
| | Administrator | Yes No | If set to yes, then the Entity is allowed to assign Entity Access Rights to other users. This does not indicate access to the Administrator Pages. This access rights should be done separately in order to see the users and assign the rights. |
| | Global Read-Only | Yes No | When set to yes, makes the entire application read-only for this Entity. |
| Page Access Rights | | | |
| | Page Global All | Yes No | When set to yes, makes all Pages available to the Entity. When set to No each Page available to the Entity has to be set explicitly in the Entity Access Rights Object. |
| | Page Global Can Create | Yes No | When set to Yes, the Entity is allowed to create new Pages. When set to No, the Entity does not have the ability to create new Pages. |
| | Page Global Can Customize | Customize Spawn None | When set to Customize, the Entity is allowed to customize/modify all Pages the entity is allowed to see, including being able to create a new Variation. |

TABLE 1-continued

| ATT ID | Attribute | Values | Description |
|---|---|---|---|
| | | | When set to Spawn, the Entity is allowed to create variance objects from base objects only (Doesn't apply to Variances). When set to None, the Customize rights have to be set at an Entity Access Rights level. |
| | Page Global Can Delete | Yes No | When set to Yes, the Entity is allowed to Delete Pages from the Application. When set to No, the Entity is not allowed to Delete any Pages from the Application. |
| Panel Access Rights | | | |
| | Panel Global All | Yes No | When set to Yes, makes all Panels available to the Entity to be seen (note: does not effect whether a Page consumes the Panel but only applies to being able to see the Panels when creating a Page). When set to No, each Panel must be added to the Entity Access Object in order to be seen when adding to a Page. |
| | Panel Global Can Create | Yes No | When set to Yes, allows the Entity to create Panels. When set to No, the Entity is not allowed to create a Panel. |
| | Panel Global Can Customize | Customize Spawn None | When set to Customize, the Entity is allowed to customize/modify all Panels the entity is allowed to see, including being able to create a new variation. When set to Spawn, the Entity is allowed to create variance objects from base objects only (Doesn't apply to Variances). When set to None, the Customize rights have to be set at an Entity Access Rights level. |
| | Panel Global can Delete | Yes No | When set to Yes, the Entity is allowed to Delete Panels from the Application. When set to No the Entity is not allowed to Delete any Panels from the Application. |
| Business Object Access Rights | | | |
| | BO Global All | Yes No | When set to Yes, the Entity is allowed to see and use all Business Objects in the Application. When set to No, the Entity is only allowed to see those Business Objects defined in the Entity Access Rights Objects. |
| | BO Global Can Create | Yes No | When set to Yes, the Entity is allowed to create new Business Objects. When set to No, the Entity is not allowed to create any new Business Objects. |
| | BO Global Can Customize | Yes No | When set to Yes, the Entity is allowed to customize all Business Objects that it has rights to see. When set to No, the Entity is only allowed to customize those Business Objects specified in the Entity Access Rights Object. |
| | BO Global Can Delete | Yes No | When set to Yes, the Entity is allowed to Delete Business Objects from the Application. When set to No, the Entity is not allowed to Delete any Business Objects. |

The Entity Access Rights Object 106 explicitly creates access rights to an Entity Object 102 by adding one object at a time. The purpose of the Entity Access Rights Object 106 is to provide the flexibility of providing access rights at a very granular level if the organization/customer chooses. However, the Entity Access Rights Object 106 need not be used as Entity Objects 102 can receive global access rights on the Entity Object 102 itself. Table 2 represents the Entity Access Rights Attributes:

TABLE 2

| ATT ID | Attribute | Values | Description |
|---|---|---|---|
| | Entity | Entity | A pointer to the Entity being granted this specific access rights. |
| | Object | Object | A pointer to the Object that the Entity Access Rights is referring to (i.e., Page, Panel, Business Object etc). |
| | Read-Only | Yes No | When set to No the Entity has Read-only rights to the object. When set to Yes, the Entity has read-write access to the object. |
| | Can Customize | Customize Spawn None | When set to Customize, the Entity can customize or modify this specific Object or create a variation. When set to None, the Entity cannot. If set to Spawn, the Entity can create variance objects from this specific base object (only applies to base Pages and base Panels). |
| | Can Delete | Yes No | When set to Yes, the Entity can delete this specific Object from the repository. If set to No, the Entity can not delete this Object from the repository. |

The Entity Relationship Object 104 is essentially an intersection table between two Entity Objects 102. However, the type of relationship does define some of the behavior of the Entity Objects 102. Some relationships can be Access Rights based, some may be organization based (either at a User level or an Organization Group level). End user based relationships (i.e., A User Entity related to another User Entity) do not inherit the Access Rights of the other user. This is to ensure that an organizational hierarchy of users can be created but without the users having the same Access Rights. A User Entity related to another Entity of type Access Group or Organization Group should inherit all the permissions of the Group associated to the User. Table 3 represents the Entity Relationship Attributes:

TABLE 3

| ATT ID | Attribute | Values | Description |
|---|---|---|---|
| | Primary Entity | Entity | A pointer to the Primary Entity that defines the relationship. |
| | Associated Entity | Entity | A pointer to the Associated Entity that defines the relationship. |
| | Inherit Access Rights | Yes No | If set to Yes, then the Primary Entity inherits the Access Rights of the Associated Entity. If set to No, then the Primary Entity does not inherit the Access Rights of the Associated Entity. |

Hierarchies

The Entity Model 100 supports several different functions. One of these functions is to build logical hierarchies in organizations that may have an impact on the data to be presented, or the flow of data within the Entity Model 100. These hierarchies are not mandatory but available as an option for customers to manage the security and distribution of the data.

The Organizational Group Object 136 is probably the most common entity type that will be used to create a hierarchy, but it should be perfectly possible to use any type if a customer desires. The Organizational Group Object 136 can be used to create a hierarchy modeling how the organization is structured. This structure can then, for example, be used to escalate data (e.g., escalate an issue, service request, or issue, etc). The structure can also be used to control data visibility.

It is entirely possible to create a hierarchy of user entities as well. By doing so, the entities can be used to create an organizational chart, escalation paths, forecast rollups, or different data movement paths, or data visibility (e.g., a user entity can see their own data as well as their direct reports). It is also possible that the end user may prefer to use the Employee object 128, 130 to accomplish the same.

The following two scenarios demonstrate how the hierarchies can be created using the Entity Model 100. The first one demonstrates how Organizational Groups Objects 136 can be used to create a hierarchy that will be used for data visibility. The second scenario demonstrates how a forecast rollup hierarchy can be created by using the User Entities.

Figure 3:
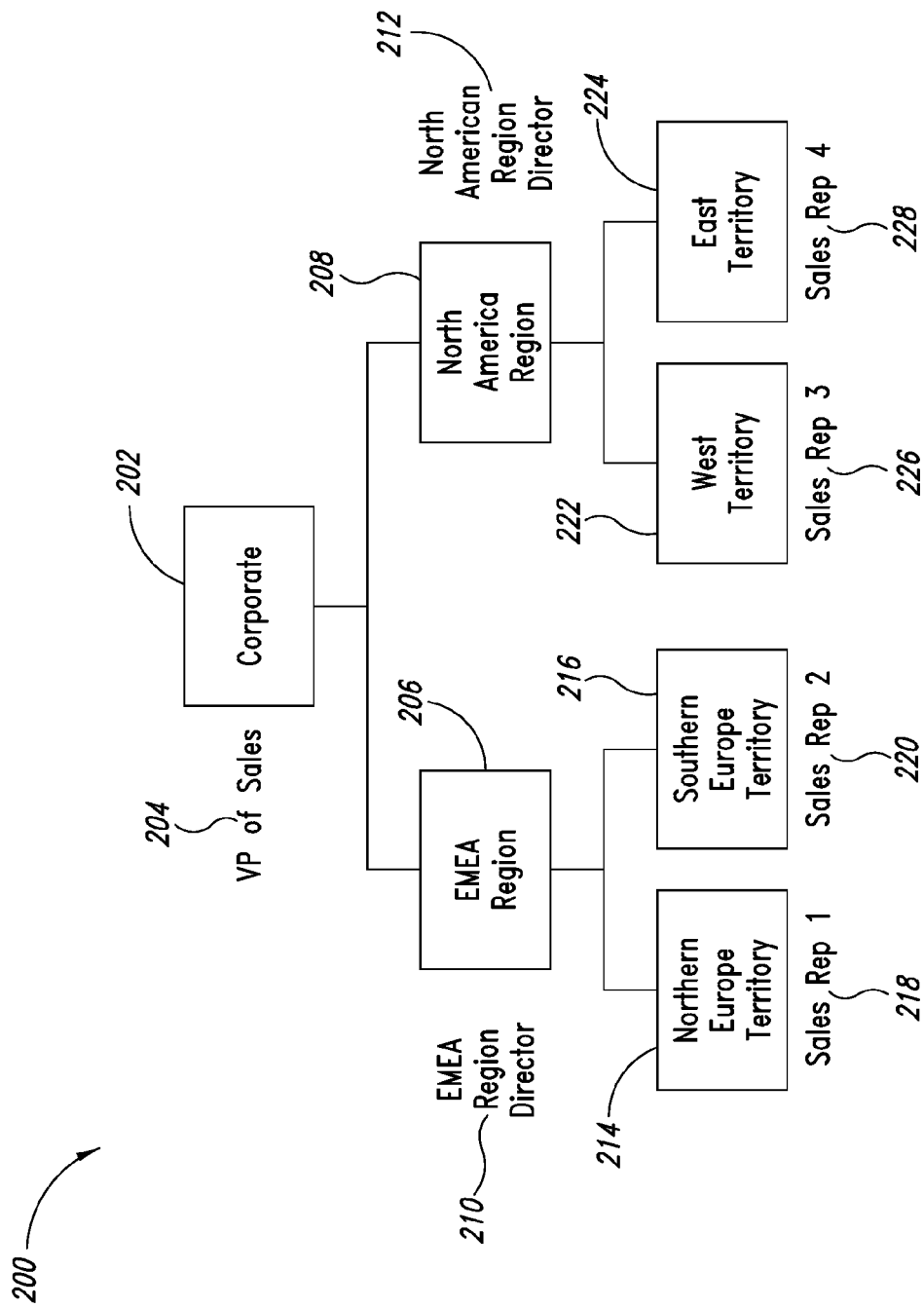
FIG. 3 is a schematic diagram showing a first exemplary organizational structure useful for illustrating operation of the Entity Model according to one illustrated embodiment.

Scenario:

As illustrated in FIG. 3, an end user organization wants to employ an organizational hierarchy 200 to control data visibility between its North American and EMEA sales force. In particular, at a top of the organization hierarchy is Corporate 202, which may, for example, be associated with a Vice President of Sales 204. Corporate 202 is divided into two separate regions, the EMEA Region 206 and the North America Region 208, which may be associated with an EMEA Region Director 210 and a North American Region Director 212, respectively. The EMEA region 206 is divided into a Northern Europe Territory 214 and a Southern Europe Territory 216, which may be associated with a Sales Rep 1 218, and a Sales Rep 2 220, respectively. The North America Region 208 is divided into a West Territory 222 and an East Territory 224, which may be associated with a Sales Rep 3 226, and a Sales Rep 4 228, respectively.

The end user organization wants to ensure that North American sales representatives (i.e., "reps") 222, 224 do not have access to the EMEA account list and vice versa. The end user organization also wants to break each region into sales territories in which sales reps in each territory cannot see the accounts in the other sales territories. The regional sales managers 210, 212 are allowed to see all the accounts in their region 206, 208, respectively, but not outside their region. Finally VP of sales 204 is allowed to see both the North American and EMEA regions 206, 208. To represent this organizational hierarchy, the Entity Objects 102 are set up as illustrated in Table 4, and the Entity Relationships Objects 104 are set up as illustrated in Table 5.

TABLE 4

| Entity Name | Entity Type |
|---|---|
| Corporate | Organizational Group |
| EMEA Region | Organizational Group |
| Northern Europe Territory | Organizational Group |
| Southern Europe Territory | Organizational Group |
| North American Region | Organizational Group |
| West Territory | Organizational Group |
| East Territory | Organizational Group |
| VP of Sales | User Entity |
| EMEA Region Director | User Entity |
| Sales Rep 1 | User Entity |
| Sales Rep 2 | User Entity |
| North American Region Director | User Entity |
| Sales Rep 3 | User Entity |
| Sales Rep 4 | User Entity |

TABLE 5

| Primary Entity | Associated Entity |
|---|---|
| Corporate | EMEA Region |
| Corporate | North American Region |
| EMEA Region | Northern Europe Territory |
| EMEA Region | Southern Europe Territory |
| North American Region | West Territory |
| North American Region | East Territory |

It is possible to accomplish the same rules using a hierarchy of users instead of Organizational Group Objects 136. However, Organizational Group Objects 136 allow for a more generic hierarchy than the user hierarchy of what data can be seen.

Figure 4:
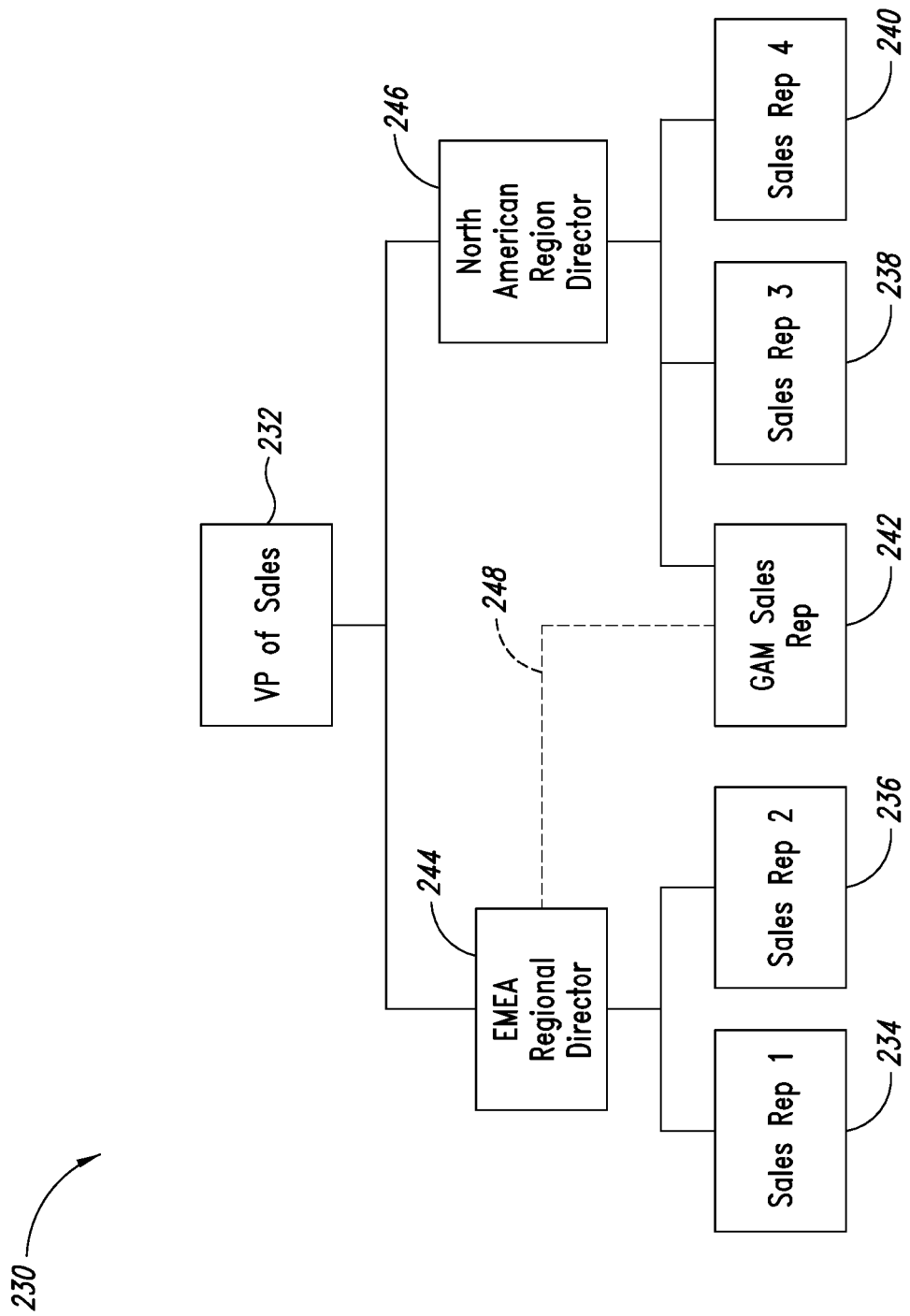
FIG. 4 is a schematic diagram showing a second exemplary organizational structure useful for illustrating operation of the Entity Model according to another illustrated embodiment.

Scenario:

As illustrated in FIG. 4, a sales organization wants to create a forecast rollup represented by organizational hierarchy 230. In this rollup the sales reps 234, 236, 238, 240, 242 fill in their individual forecasts and submit them to their Regional Sales Directors 244, 246. The Regional Sales Directors 244, 246 review all forecasts from their region only. Once complete, the Regional Sales Director 244, 246 rolls up the forecast from their region to the VP of Sales 232. The VP of Sales 232 can then see the forecast for all the regions and individual sales reps if they choose. To represent this forecast rollup hierarchy; the Entity Objects 102 would be set up as illustrated in Table 6, and the Entity Relationship Objects 104 would be set up as illustrated in Table 7.

TABLE 6

| Entity Name | Entity Type |
|---|---|
| VP of Sales | User |
| EMEA Regional Director | User |
| Sales Rep 1 | User |
| Sales Rep 2 | User |
| North American Region Director | User |
| Sales Rep 3 | User |
| Sales Rep 4 | User |
| GAM Sales Rep | User |

TABLE 7

| Primary Entity | Associated Entity |
| --- | --- |
| VP of Sales | EMEA Regional Director |
| VP of Sales | North American Region Director |
| EMEA Regional Director | Sales Rep 1 |
| EMEA Regional Director | Sales Rep 2 |
| EMEA Regional Director | GAM Sales Rep |
| North American Region Director | Sales Rep 3 |
| North American Region Director | Sales Rep 4 |
| North American Region Director | GAM Sales Rep |

In this scenario, the GAM Sales Rep 242 has a relationship with both the EMEA Regional Director 244 and the North American Regional Director 246. This is very common in forecast rollup. The GAM Sales Rep 242 can rollup their forecast to both. This is what is referred to as a dotted line 248 in the hierarchy. The business rules defined in the Panel Objects 114 (FIG. 2) and Workflow Objects 118 will ultimately determine which part of the forecast roll up to which regional director. Where there is a Global Account Manager (i.e., GAM), it may depend upon the regional origin of the deal; for example where the regional director gets a certain portion credit of the sale.

One thing to note is that it is possible to create the same hierarchy using the region and territories instead of the sales reps. However, in a sales environment the territories, regions and individuals within them frequently change. Furthermore, it is very common that certain individuals carry more than one individual sales territory. Typically, the most static attribute in a sales organization is who reports to who (i.e., offers the least amount of administration to maintain the integrity of the sales hierarchy).

It is also possible to create the sales hierarchy using the Employee table rather than the intersection Entities. However, by abstracting the hierarchy into the entities, the employee associated with the Entity can constantly change with no impact as to the sales hierarchy. Sales Reps moving and leaving are very common in sales.

Example:

Sales Rep 1 is an Entity associated to Bill Smith the Employee. The Sales Rep 1 entity belongs in the hierarchy of FIG. 4, meaning Sales Rep 1 report to the EMEA Regional Director. Furthermore, Sales Rep 1 has been assigned to different account teams (i.e., a list of Entities that are part of the team that is managing the specific account).

Bill Smith leaves the company and Jane Smythe takes over all the job functions that Bill Smith performed. The only action that needs to occur to give Jane Smythe all the access rights, organizational hierarchy, and access to the right data is to associate Jane Smythe the Employee to Sales Rep 1 the Entity. Now all data that was previously assigned to Bill Smith is now assigned to Jane.

Authentication

The Entity Model 100 does not provide the login credentials or the authentication for users of the Entity Model 100. Instead the Entity Model 100 is the intersection table that links the login service that does the authentication, with the Entity (or user) that contains the access rights within the Entity Model 100. The authenticated user can only be associated to one Entity Object 102. This ensures that when the authentication is done and passed into the Entity Model 100, only one resolved Entity can be found. This Entity is the starting point for building the full access rights of the associated Employee (or Contact, Account etc).

Figure 5:
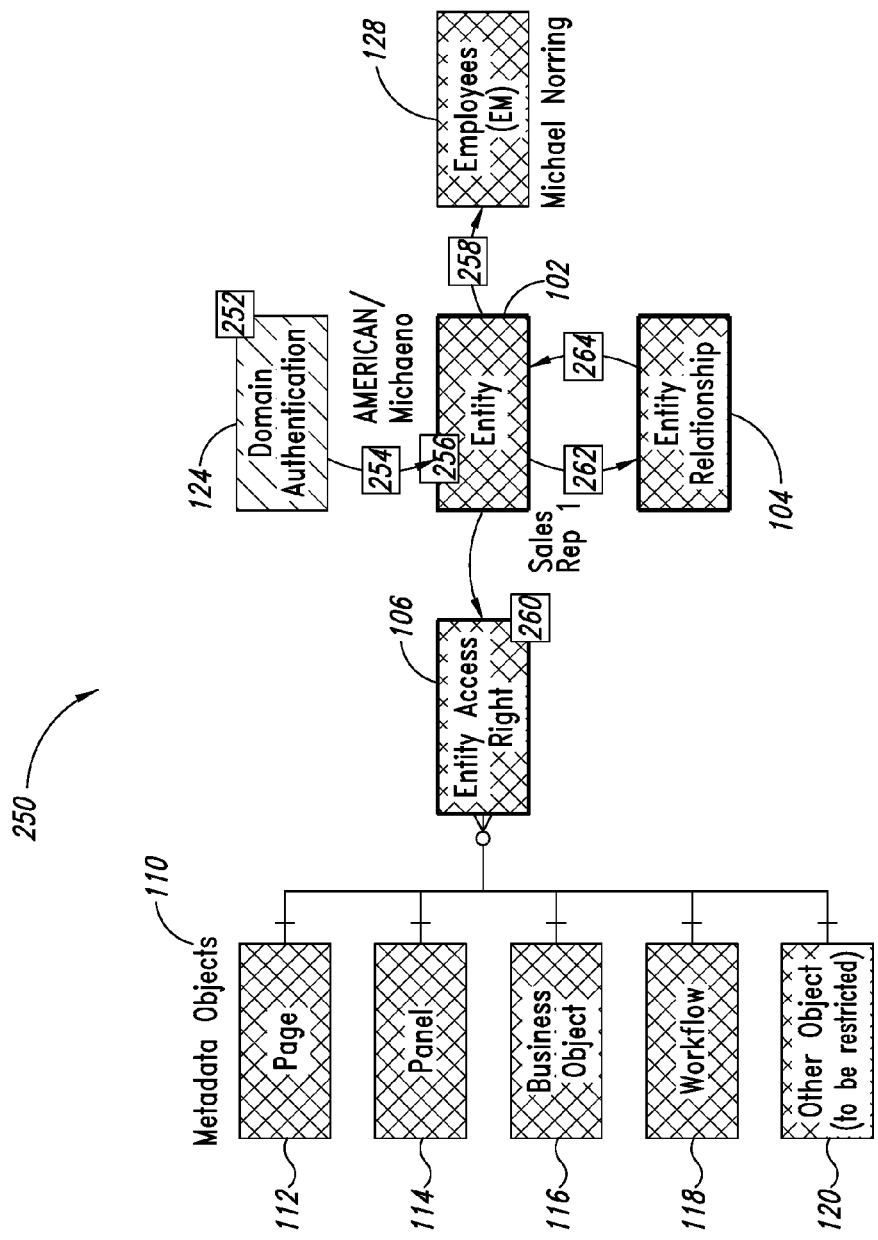
FIG. 5 is a schematic diagram of an Entity Model schema illustrating a method of using the Entity Model to authenticate an end user according to at least one illustrated embodiment.

Scenario:

FIG. 5 illustrates a scenario using an Entity Model 250 that demonstrates how a user can login using an authentication service and receive the access rights accordingly.

In this scenario a user Michael Norring is authenticated using an external Domain authentication service. The Domain Authentication Object 124 passes the authorized user to the Entity Model 250 (e.g., AMERICA/Michaeno) which gets matched up with the Sales Rep 1 user Entity Object. Once the match is made, all the access rights are determined for Michael Norring in the Entity Model 250.

At 252, the Authentication Service Object 124 authenticates Michaeno as a user in the AMERICA domain. At 254, the Authentication Service Object 124 passes the AMERICA/Michaeno domain authentication to the Entity Model 250 upon it being started. At 256, the Entity Model 250 determines that the AMERICA/Michaeno user belongs to the Sales Rep 1 Entity. At 258, the Entity Model 250 determines that the associated Employee to the Sales Rep 1 Entity is Michael Norring. At 260, the Entity Model 250 looks at all the Sales Rep 1 Entity's associated Entity Access Rights Object 106 to determine the access rights given to the user. At 262, the Entity Model 250 looks at all the Entity Relationships Objects 104 in which the Sales Rep 1 Entity is the Primary and where the attribute is set to Inherit Access Rights. At 264, for each found Entity Relationship Object 104 in 262, the Entity Model 250 looks at all the associated Entity Objects 102 and their Entity Access Rights Objects 106 and adds the access rights to the Sales Rep 1 Entity access rights as inherited access rights. The Entity Model 250 has now identified the user and provided the user with all the necessary access rights within the Entity Model application 250.

Access Rights

The primary purpose of the Entity Model 100 is to control access rights to what Objects (e.g., Pages, Panels, Business Objects etc) a user can see, and what the user can do against these Objects (e.g., Read/Write or Read-only; Customize, Delete, Add, etc). The Entity Model 100 is essentially the intersection tables 102, 104, 106 between the Access Objects 108 (which define the user accessing the objects) and the Metadata Objects 110 (which define the objects available in the Entity Model 100 that will help the user navigate, view, and enter data).

In order for a user (i.e., Employee, External Contact, Account, Vendor, Partner etc.) to receive access rights to see and use Metadata Objects in the Entity Model 100, the user must be associated to one Entity Object 102. This Entity Object 102 becomes the basis for building the full access rights granted inside the Entity Model 100.

The Entity Object 102 can receive access rights via three different methods: 1) Global Access Rights defined on the Entity Object itself; 2) Inherited Access Rights from another related Entity Object; and 3) Access rights from the collection of Entity Access Rights associated to the Entity Object 102. The end user is granted access rights to the sum of all the three access methods. The access rights should always be considered additive and never subtractive.

Example:

If one access right grants the user rights to see a Page Object 112 and another access right doesn't, then the user will be granted rights to see the Page Object 112. If two access rights conflict, then the least restrictive access right governs.

Example:

A user receives access rights from two different methods. One states that the user has the access rights to see Page A as read-only. The other states that the user has the access rights to see Page A as read-write. The user receives access rights to the least restrictive (i.e., Page A as read-write).

In another example, a user has received access rights to create new metadata objects, but another states that the user cannot. In this case, the user will be granted the access rights to create a new metadata object.

Global Access Rights

The Entity Model 100 provides the ability to create Global Access Rights to end users. This allows end users to quickly set up key administrative and developer positions so that they can see everything in the Entity Model 100 without manually assigning objects to each end user. To set Global Access Rights, the end user Entity itself is provided with access rights as part of its attributes.

Example:

One of the attributes of the Entity Object 102 is Page Global All. If this attribute is set to "Yes", then the end user associated to the Entity Object 102 has access rights to see all Pages in the Entity Model repository. Furthermore, if the Global Read-only is set to "No", then the end user has read-write access rights to all Pages in the Entity Model repository.

The Global Access Rights provides an easier means of managing administrators and developers who need full access to the Entity Model repository. By setting the Global Access Rights there is no need to add each individual Object to an Entity Object 102 as Entity Access Rights Object 106. Global Access Rights can also be received by inheriting it from another Entity Object 102.

The following scenario describes how the Global Access Rights on the Entity Object 102 could be used to create a developer role that has full access rights to the Entity Model 100, except to manipulate Business Objects.

Scenario:

The Entity Model Administrator (or user with administrative access rights) wants to set up a new user in the Entity Model 100 to perform User Interface (UI) development only. The administrator wants to ensure the developer has access to all UI Objects along with customization capabilities. However, the administrator does not want the new user to be able to create and manipulate Business Objects. The Entity Model Administrator creates a new Entity Object 102 and associates the new Entity Object 102 to the new developer user. The Entity Model Administrator would then set up the Entity Attributes for the new Entity, as illustrated in Table 8.

TABLE 8

| Attribute | Values |
| --- | --- |
| Type | User |
| Administrator | No |
| Global Read-Only | No |
| Page Global All | Yes |
| Page Global Can Create | Yes |
| Page Global Can Customize | Yes |
| Page Global Can Delete | Yes |
| Panel Global All | Yes |
| Panel Global Can Create | Yes |
| Panel Global Can Customize | Yes |
| Panel Global can Delete | Yes |
| BO Global All | Yes |
| BO Global Can Create | No |
| BO Global Can Customize | No |
| BO Global Delete | No |

Note, that the developer has access rights to see all Business Objects (BO Global All), but does not have access rights to manipulate them (BO Global Can Create, BO Global Can Customize, BO Global Delete). Also note, that the Entity Model Administrator could also create an Access Group called "UI Developer" and have the new developer inherit the access right. This way, the access rights can be shared for all UI developers.

Inherited Access Rights

An Entity Object 102 can inherit access rights from another Entity Object 102 if they are related to each other. This allows for an end user to set up generic types of access rights (e.g., Contact Center Agent, Administrator, UI Developer, BO Developer, Sales Manager, etc). These generic buckets of access rights are called Access Groups. The Access Group can then receive one or more access rights to certain Metadata Objects 110 in the Entity Model 100. Multiple users can then be associated to the Access Group to receive the same access rights. Users can then inherit their access rights from one or more Access Groups. This simplifies the administrative process of assigning access rights to users.

An Entity Object 102 inherits access rights from another Entity Object 102 by being associated in the Entity Relationship 104. The Entity Relationship 104 takes a Primary Entity, Associated Entity, and an Inherit Access Rights parameter. If the Inherit Access Rights parameter is set to "Yes", then the Primary Entity Object 102 will always inherit the access rights granted to the Associated Entity Object 102. The only exception to this is that the Primary Entity Object will not inherit the access rights of the Associated Entity Objects' inherited access rights.

Figure 6:
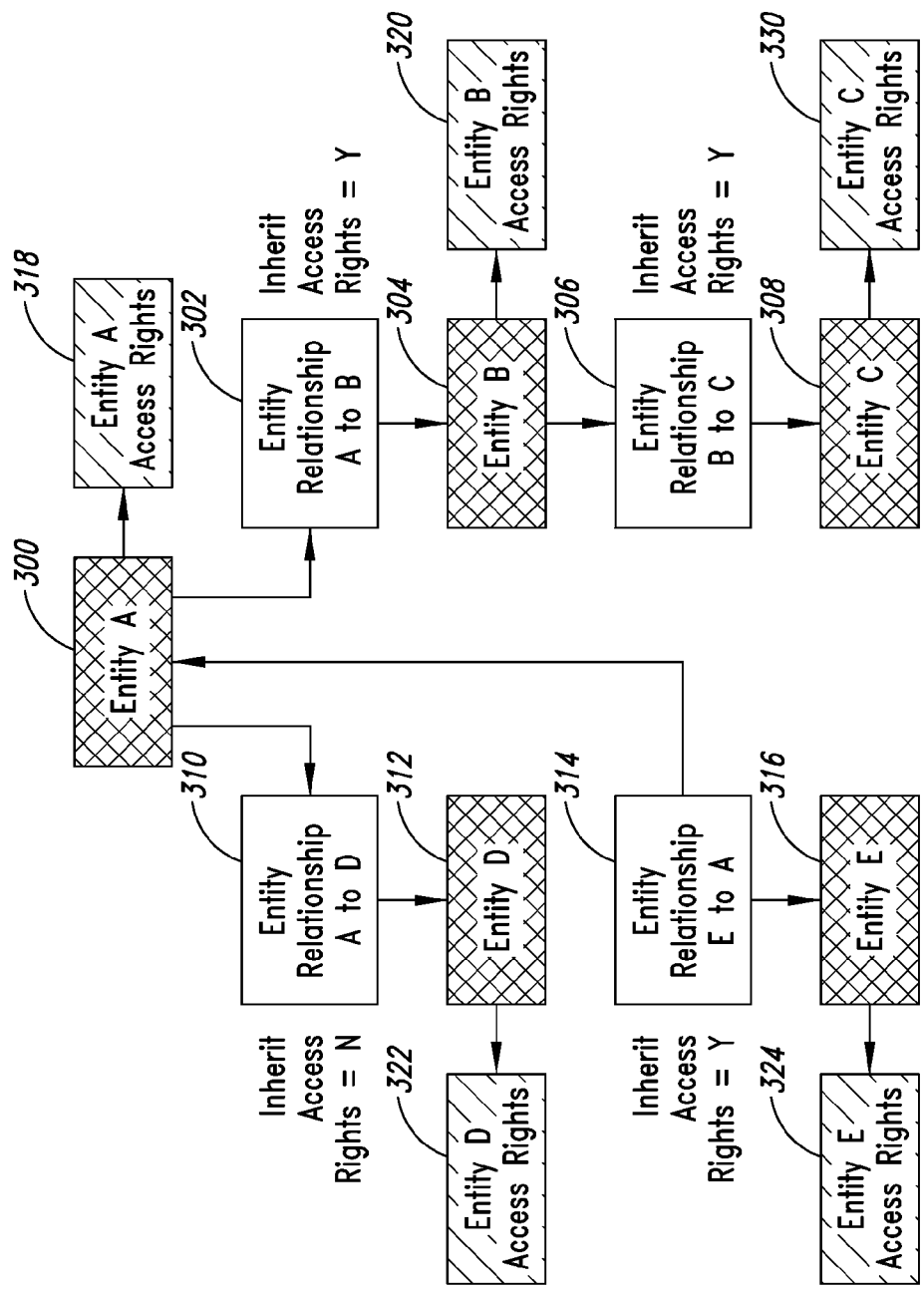
FIG. 6 is a schematic diagram of a portion of an Entity Model schema illustrating inheritance of rights by a primary entity from other entities according to at least one illustrated embodiment.

Example:

As illustrated in FIG. 6, a user is associated to Entity Object A 300. An Entity Relationship Object 302 defines a direct relationship between Entity Object A 300 and Entity Object B 304, with the Entity Relationship Object 302 set such that Entity Object A 300 directly inherits the rights of Entity Object B 304. Another Entity Relationship Object 306 defines a direct relationship between Entity Object B 304 and an Entity Object C 308, with the Entity Relationship Object 306 set such that Entity Object B 304 directly inherits the rights of Entity Object C 308. A further Entity Relationship Object 310 defines a direct relationship between Entity Object A 300 and an Entity Object D 312, however the Entity Relationship Object 310 is set so that Entity Object A 300 does not inherit rights from Entity Object D 312. Yet a further Entity Relationship Object 314 defines a direct relationship between an Entity Object E 316 and the Entity Object A 300, with the Entity Relationship Object 314 set such that Entity Object E 316 directly inherits the rights of Entity Object A 300.

The user associated to Entity Object A 300 receives the following access rights:
  Global Access Rights defined for Entity Object A 300;
  All the access rights defined by Entity A Access Rights Object 318;
  All the Global access rights inherited from Entity Object B 304;
  All access rights defined by the Entity B Access Rights Object 320 inherited through Entity Object B 304.

The user does not receive or inherit access rights from the following Entities:
  Entity Object C 308. Even though Entity Object B 304 inherits all the access rights of Entity Object C 308, this inheritance does not carry over when Entity Object A 300 inherits from Entity Object B 304. Thus, Entity Object A 300 does not inherit either Global Access Rights defined for Entity Object C 308 or all the access rights defined for Entity C Access Rights Object 330.
  Entity Object D 312. This is because the Entity Relationship Object 310 defined between Entity Object A 300 (as Primary Entity) and Entity Object D 312 (as Associated Entity) has the parameter Inherit Access Rights set to "No". Thus, Entity Object A 300 does not inherit either Global Access Rights defined for Entity Object D 312 or all the access rights defined for Entity D Access Rights Object 322.

Entity Object E 316. Even though an Entity Relationship Object 314 exists between Entity Object A 300 and Entity Object E 316 and the Inherit Access Rights parameter is set to "Yes", Entity Object A 300 does not inherit any access rights from Entity Object E 316. This is because the Entity Relationship Object 314 defines Entity Object E 316 as the Primary Entity and Entity Object A 300 as the Associated Entity. This means that Entity Object E 316 inherits the access rights from Entity Object A 300, but Entity Object A 300 does not inherit from Entity Object E 316. In order for Entity Object A 300 to inherit from Entity Object E 316 a new Entity Relationship Object has to be created that defines Entity Object A 300 as the Primary Entity and Entity Object E 316 as the Associated Entity, with the Inherit Access Rights set to "Yes". Thus, Entity Object A 300 does not inherit either Global Access Rights defined for Entity Object E or all the access rights defined for Entity E Access Rights Object 324.

It is noted that even though Access Groups are meant to let Entities inherit a group of access rights, it doesn't mean that an Entity can only inherit from another Entity of type "Access Group". An Entity Object 102 should be able to inherit from any other type of Entity Object 102.

The Entity Access Rights Objects 104 are used to provide access rights to an Entity Object 102 one Metadata Object 110 at a time (e.g., this Entity Object 102 has access rights to this Page Object 112). The Entity Access Rights Object 104 also has attributes that further define some basic actions a user can take against the object including: 1) Read-Only (Y/N): Is the Entity granted read-only access only (note: read-write is the default); 2) Can Customize (Y/N): Is the Entity allowed to customize the object (i.e., customize the base or variation of the object); 3) Can Delete (Y/N): Defines if the Entity allowed to delete the Metadata Object from the repository.

The Entity Object 102 can have many Entity Access Right Objects 104 associated to it. Multiple Entity Objects 102 cannot be associated to the same Entity Access Right Objects 104. They will have to have their own Entity Access Right Objects 104 defined, or can inherit from another Entity Object 102.

Example:

An Entity Model Administrator wants to provide access rights to a user (Entity Object A) to only see three Pages in the Entity Model 100. The Entity Model Administration wants to provide read-write access to two of the Pages (Page Object A and Page Object B), but read-only access to Page Object C. Furthermore, the user (Entity Object A) should not be allowed to customize or delete the actual Page Objects.

The Entity Model Administrator would create the Entity Access Right Objects 104 illustrated in Table 9, and associated to the user's Entity Object A.

TABLE 9

| Entity | Object | Read-Only | Can Customize | Can Delete |
|---|---|---|---|---|
| Entity A | Page A | N | N | N |
| Entity A | Page B | N | N | N |
| Entity A | Page C | Y | N | N |

If the Entity Model Administrator wanted to provide the Entity Object A user access rights to customize Page Object B, then the Can Customize attribute for Page Object B would be set to 'Y'. The Entity Object A user would then be able to modify Page Object B.

Control Over Access To Metadata Objects

The Entity Model 100 is primarily used to explicitly control what Metadata Objects 100 any given user in the Entity Model 100 is allowed to see and interact with. However, the Entity Model 100 can also be used indirectly to manage and control what data the end user actually sees in the Pages and Panels. The Entity Model 100 does not control the data visibility explicitly; rather it is referenced by the Panels and Business Objects that do control it and the data.

Example:

A Panel filter may only allow records to be returned that are in the same region as the end user. This ensures that the end user can never see records outside their region from the particular Panel Object 114.

Realistically the full control of what an end user sees in the Entity Model 100 is determined by combining their Access Rights, Organizational Groups, Employee Profile, Panel filter, Business Object filter, and business rules implemented by the Composite Application itself. There are several different ways that the Entity Model 100 can help in determining the data visibility an end user has. They are Visibility by Access, Visibility by User Characteristics, and Visibility by Entity to Data Association.

In the simplest case, the data available for the end user to see can be controlled by the Panel filter. For example, the Panel filter can show "Only Accounts in North America" and by providing the end user access to see a Page Object 112 that contains that Panel Object 114, that end user can see accounts in North America. This is a simple method for managing data that end users can see. However, it means that a lot of Panel Objects 114 may have to be created to support the different variations of what data can be seen. The following scenario demonstrates the use of visibility by access.

Scenario:

An end user has a Contact Center in both North America and in EMEA. The Contact Center Agents in North America need to have access rights to see all the accounts in North America, but are not allowed to see the EMEA accounts. Likewise, the EMEA Contact Center Agents need to have access rights to all the accounts in EMEA, but are not allowed to see the North American accounts. To accomplish this using visibility by access, the IT developer has decided to create the following two Panel Objects:

North American Accounts Panel Object. This Panel Object 114 has a filter on it that only allow North American account records to be returned (Account Region="North America").

EMEA Accounts Panel Object. This Panel Object 114 has a filter on it that only allow account records in EMEA to be returned (Account Region="EMEA").

The Administrator gives all North American Contact Center Agents access rights to a Page Object 112 that contain the North American Accounts Panel. Next the Administrator gives all EMEA Contact Center Agents access rights to a Page Object 112 that contain the EMEA Accounts Panel. By not giving a Contact Center Agent access rights to the Panel Object in the other region, the Contact Center Agent can never see any accounts outside their region.

TABLE 10

Account Table:

| AcctID | Account Name | Account Region | Account Type |
|---|---|---|---|
| 1A | HP | North America | Customer |
| 1B | Sun | North America | Customer |
| 1C | IBM | North America | Vendor |
| 2A | Siemens | EMEA | Customer |
| 2B | BMW | EMEA | Customer |
| 3A | Telstra | APAC | Customer |
| 3B | Singapore Airlines | APAC | Customer |

The following objects were created: 1) Customer Business Object (filter-Account Type="Customer"); 2) North American Accounts Panel (bound to Customer BO, filter-Account Region="North America"); 3) EMEA Accounts Panel (bound to Customer BO, filter-Account Region="EMEA"); 4) North American Page (contains the North American Accounts Panel); and 5) EMEA Page (contains the EMEA Accounts Panel).

Two users have been created: 1) EMEA Agent who is given access rights to the EMEA Page only; and 2) NA Agent who is given access rights to the North American Page only.

Whether any of the Objects are a base or a variation does not matter since their interaction is exactly the same. As discussed below, how the filters are set up for each will vary for base and variation.

When the EMEA Agent opens up the EMEA Page, they see the accounts in the Panel listed in Table 11.

TABLE 11

| AcctID | Account Name | Account Region | Account Type |
|---|---|---|---|
| 2A | Siemens | EMEA | Customer |
| 2B | BMW | EMEA | Customer |

When the NA Agent opens up the North American Page, they see the accounts in the Panel listed in Table 12.

TABLE 12

| AcctID | Account Name | Account Region | Account Type |
|---|---|---|---|
| 1A | HP | North America | Customer |
| 1B | Sun | North America | Customer |

Note, that the IBM account does not appear as the Customer since the Business Object had a filter for only Account Type="Customer" and IBM was a "Vendor".

Figure 7:
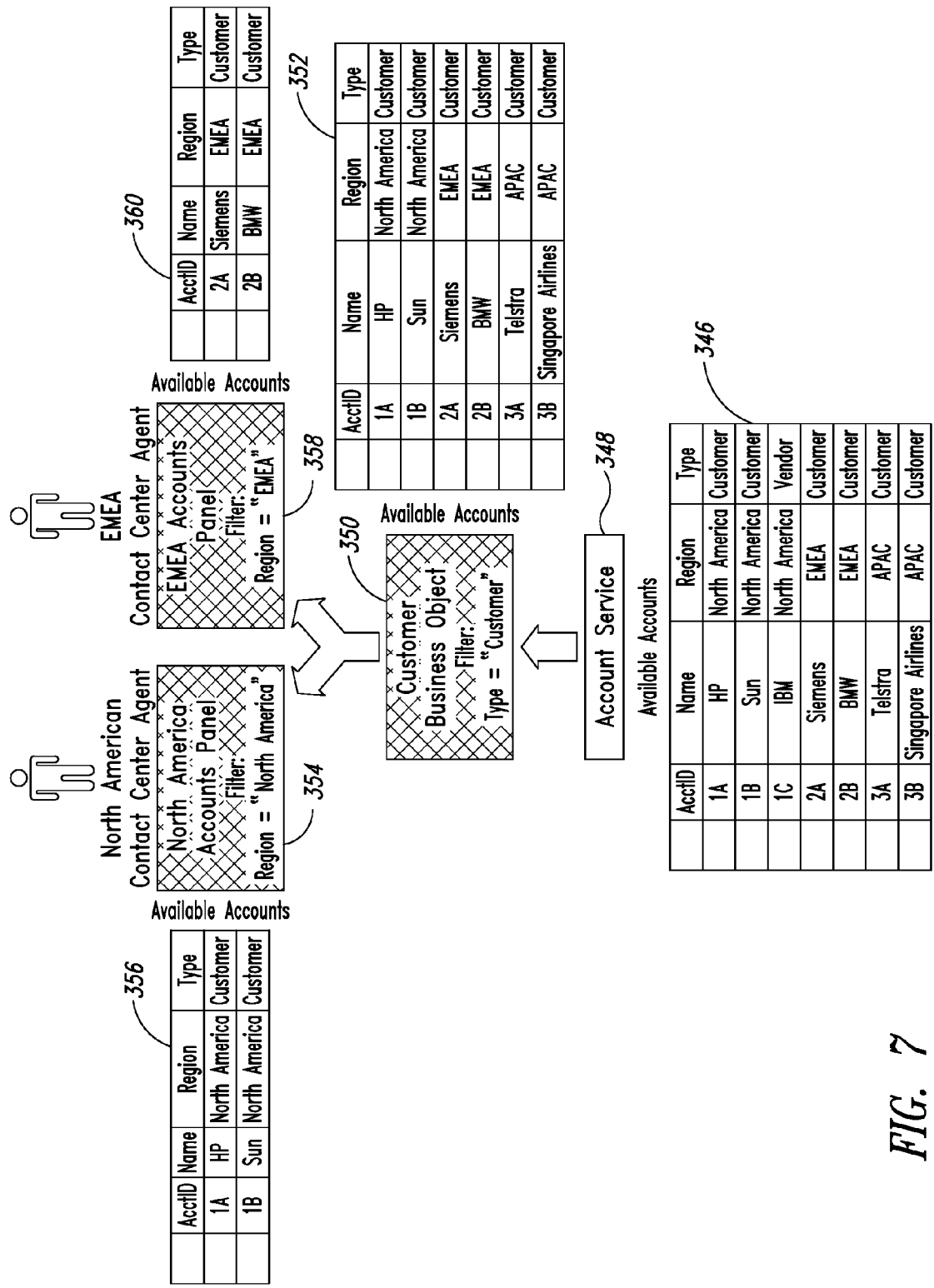
FIG. 7 is a schematic diagram showing an interaction of various Objects in an Entity Model according to at least one illustrated embodiment.

FIG. 7 demonstrates the records as they flow through the Object structure. All available accounts, illustrated in table 346, are provided by Account Service Object 348. As can be seen, the Customer Business Object 350 can only return account records of type "Customer", illustrated in table 352. The North American Panel Object 354 can only return account records from Region="North America" illustrated in table 356, and because it is bound to the Customer Business Object 350 it can really only return Type="Customer" in Region="North America". Likewise the EMEA Accounts Panel Object 358 can only return records from Region="EMEA", illustrate in table 360 and because it is bound to the Customer Business Object it can really only return Type="Customer" and Region="EMEA".

There is a more complex way that the same thing can be implemented. A Panel filter could show "Only Accounts that are in the same region as the User". In this case the filter being applied to the Panel Object 114 contains characteristics of the specific end user (or Entity Object 102) accessing the Panel Object 114. Thus, only one Panel Object 114 needs to be created to support all regions, and the data returned will always be valid towards the users region. The Panel Object 114 could furthermore be used by end users who belong in multiple regions. In this case the Panel Object 114 will show the sum of both regions. In this case the Panel Object's filter takes values from the current end user and adds these values into the filter being passed to the Business Object. The Business Object should be able to take the same type of information from the end user and add the information to its own filter.

The following scenario demonstrates the use of controlling data visibility by user characteristics.

Scenario:

An end user has a Contact Center in both North America and in EMEA. The Contact Center Agents in North America needs to have access rights to see all the accounts in North America, but are not allowed to see the EMEA accounts. Likewise, the EMEA Contact Center Agents needs to have access rights to all the accounts in EMEA, but are not allowed to see the North American accounts. To accomplish this using visibility by user characteristics, the IT developer has decided to create only one Panel Object 114:

Account List Panel. This Panel Object has a filter on it that only allows the Region that the user belongs to (Account Region=User.Region).

Note, that the User.Region could be determined either by looking at the end user's profile, or can be determined by looking at the Entity Model 100 to determine what Organizational Groups the end user belongs to (e.g., Organizational Group="North American" or Organizational Group="EMEA").

The Administrator gives all North American Contact Center Agents and all the EMEA Contact Center Agents access rights to a Page Object 112 that contains the Accounts List Panel Object. Now only one instance of a Panel Object 114 exists, but the filter being applied to the Panel Object 114 ensures that the North American Contact Center Agents can only see North American Accounts in the corresponding Panel, and that the EMEA Contact Center Agents can only see EMEA Accounts in the corresponding Panel.

Table 13 illustrates the Account Table provided by the Service.

TABLE 13

| AcctID | Account Name | Account Region | Account Type |
|---|---|---|---|
| 1A | HP | North America | Customer |
| 1B | Sun | North America | Customer |
| 1C | IBM | North America | Vendor |
| 2A | Siemens | EMEA | Customer |
| 2B | BMW | EMEA | Customer |
| 3A | Telstra | APAC | Customer |
| 3B | Singapore Airlines | APAC | Customer |

The following objects were created: 1) Customer Business Object (filter-Account Type="Customer"); 2) Accounts List Panel (bound to Customer BO, filter-Account Region=User Entities of Type Organizational Group); and 3) Account Page (contains the Account List Panel).

Two users have been created: 1) EMEA Agent who is given access rights to the Accounts Page only; and 2) NA Agent who is given access rights to the Accounts Page only.

The EMEA Agent's Entity Object has been associated (via the Entity Relationship) to another Entity Object of type="Organizational Group" with the name of "EMEA". The NA Agent's Entity Object has been associated (via the Entity Relationship) to another Entity of type="Organizational Group) with the name of "North America".

It does not matter whether any of the objects are a base or a variation since their interaction is exactly the same. How the filters are set up for each will vary for base and variation which is discussed below.

When the EMEA Agent opens up the Accounts Page, they see the accounts listed in Table 14 in the Panel.

TABLE 14

| AcctID | Account Name | Account Region | Account Type |
|---|---|---|---|
| 2A | Siemens | EMEA | Customer |
| 2B | BMW | EMEA | Customer |

When the NA Agent opens up the Accounts Page, they see the accounts listed in Table 15 in the Panel.

TABLE 15

| AcctID | Account Name | Account Region | Account Type |
|---|---|---|---|
| 1A | HP | North America | Customer |
| 1B | Sun | North America | Customer |

The IBM account does not appear since the Customer Business Object had a filter on it for only Account Type="Customer" and IBM was a "Vendor". Even though the Panel Object 114 is exactly the same, the filter controls the visibility to the data based upon the characteristics of the user opening the Page Object 112.

Figure 8:
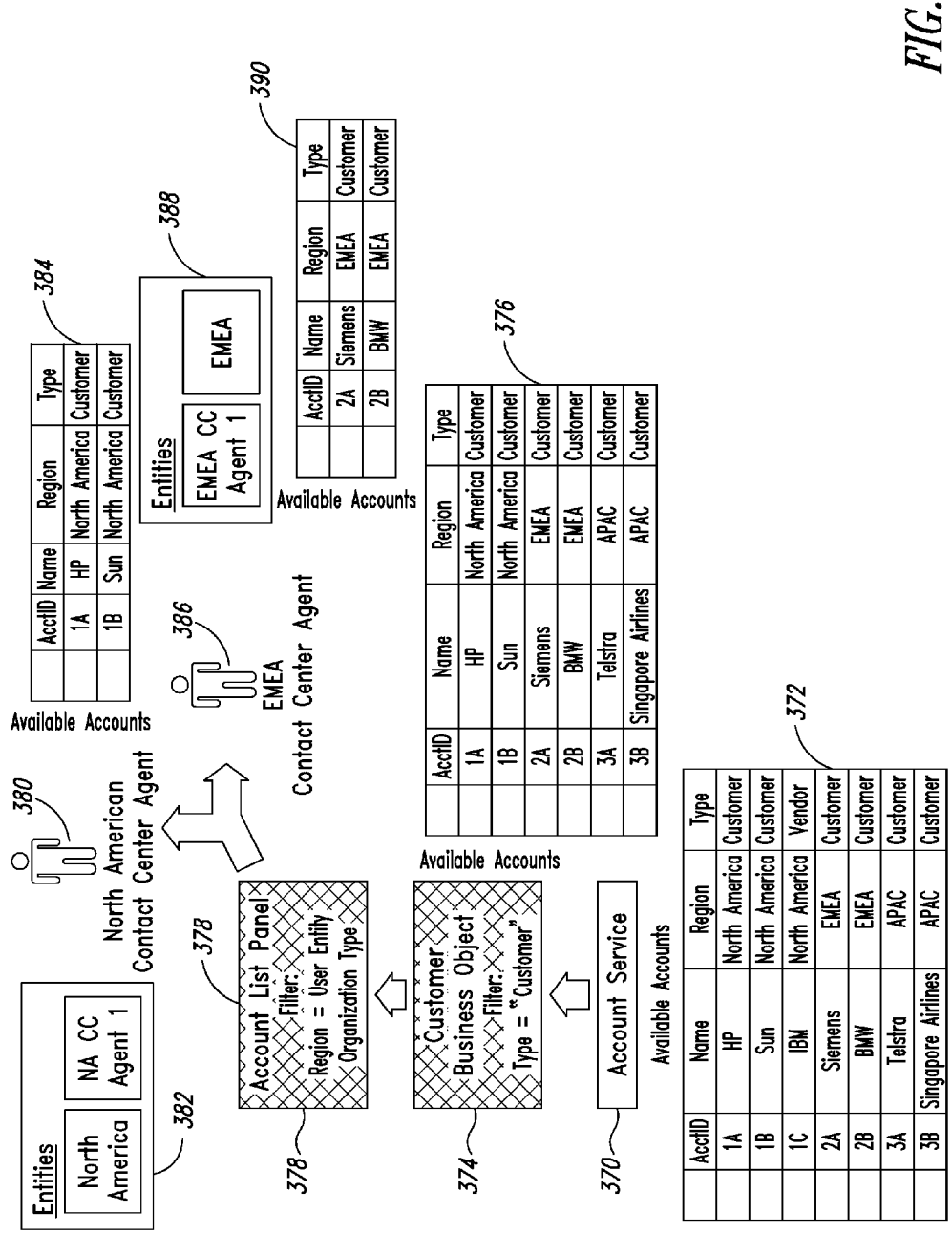
FIG. 8 is a schematic diagram showing an interaction of various Objects in an Entity Model according to at least one illustrated embodiment.

FIG. 8 shows the records as they flow through the Object structure. As can be seen, Account Service 370 provides all available accounts illustrated in table 372. The Customer Business Object 374 can only return account records of type "Customer" illustrated in table 376. The Account List Panel Object 378 can only return account records from Region matching the user's Entities of Type "Organizational Group". Because it is bound to the Customer Business Object 379 it can really only return Type="Customer" in Region matching the user's associated Entities of type "Organizational Groups". Thus, where the end user is a North American Contact Center Agent 380 represented by Entity Object 382, the Account List Panel Object 378 can present the information illustrated in table 384. Where the end user is an EMEA Contact Center Agent 386, represented by Entity Object 388, the Account List Panel Object 378 can present the information illustrated in table 390.

An advantage of this approach is the filtering of data becomes an administrative job rather than a development job. Imagine an end user who needs access rights to both EMEA and North American accounts. In this example, the user's Entity Object 102 (FIG. 2) would be associated to both the "EMEA" Organizational Group Entity and the "North American" Organizational Group Entity. The end user can now see both types of accounts in the same Panel Object rather than two separate Panel Objects.

Visibility by Entity to Data Association

In certain cases the data itself may contain characteristics that link it to the end user or Entity Object. In this case the Entity Object 102 or one of the associated Entities to the end user is referenced by the data itself.

Example:

A Service Request record may have an Owner field on it that refers to the Entity. In this case a Panel Object 114 can be created called "My Service Requests" that filters on the owner field=Entity.

The data record may actually also define an Organization which is allowed to see the information. This Organization match could be matched to a user Entity Object's related Organizational Group Entities. This allows for providing access to data such as "All of Billing Accounts", "All of Support Accounts", etc.

Many applications are built to support the concept of "Teams", "Owner" and "Primary Account Team Owner" etc. The Entity Model application should leverage this and provide the same level of control. It would be difficult for the Entity Model application to match the Organizational Group Entities and even the exact users with the user Entity values.

Example:

An end user exists in Siebel called JSMITH. The same end user exists in Oracle as SMITH. The Panel Object 114 (FIG. 2) needs to filter out a "My Accounts" Panel Object that only shows Jane Smith's accounts. In Oracle, SMITH is associated to all account records where Jane Smith is on the account team. The same is true in Siebel where JSMITH is associated to all the account records. The problem is that in the Entity Model 100 the Entity Object 102 cannot reference both JSMITH and SMITH at the same time in order to retrieve Jane Smith's accounts where she is on the account team. However, as the Entity Object 102 is an abstract record, the Entity Object 102 can be associated to a lookup table in which the system specific user values can be stored. Another option is to do the conversion to the account team prior to the data reaching the Business Object 116 and the Panel Object 114. That way, the account team is consistent across the Entity Model 100. The following scenario demonstrates visibility by Entity to data association.

Scenario:

An end user's Contact Center has Service Requests that can be assigned to either a Group or Individuals. This routing and assignment allows end users to see My Groups Service Requests or My Service Requests so that they can easily work on customer issues. To support this, the developer wants to provide a My Service Request Panel Object and a My Groups Service Requests Panel Object. The developer also wants to provide a read-only Panel Object to the All Service Requests Panel Object. This allows the Contact Center Agents to see all Service Requests, but only work on those Service Requests that have been assigned to them specifically, or one of the Groups (Organizational Group Entities) they belong to.

To accomplish this IT developer has decided to create two Panel Objects: 1) My Service Request Panel which has a filter that only allows records to be returned where the Assigned To=User's Primary Entity; and 2) My Groups Service Request Panel which has a filter on it that only allow records to be returned where the Assigned To=User's Associated Organizational Group Entities. The Administrator gives all the Contact Center Agents access rights to a Pages that contain the My Service Request Panel and the My Groups Service Requests Panel. The service provides a Service Request as illustrated in Table 16.

TABLE 16

| SRID | Name | Assigned To |
| --- | --- | --- |
| 1A | Service is down | JSMITH |
| 1B | Billing Inquiry for late charges to the account | JSMITH |
| 1C | Bandwidth issues for service | Engineering Group |
| 2A | Damaged Router | Hardware Group |
| 2B | Software Error on DLL | PJANSON |

The following objects were created: 1) Service Request Business Object (No Filter); 2) My Service Request Panel (bound to Service Request BO, filter-Assigned To=User Entity); 3) My Groups Service Requests Panel (bound to Service Requests BO, filter-Assigned To=User's Entities where Type="Organizational Group"); 4) My Service Request Page (contains the My Service Request Panel); and 5) My Groups Service Requests Page (contains the My Groups Service Requests Panel).

One user has been created: 1) Jane Smith (JSMITH).

Jane Smith's Entity Object has been associated (via the Entity Relationship Object) to an Organizational Group Entity of "Hardware Group".

It typically does not matter whether any of the objects are a base or a variation since their interaction is exactly the same. How the filters are set up for each will vary for base and variation.

When Jane Smith opens up the My Service Request Page, they see service requests in the My Service Requests Panel as illustrated in Table 17.

TABLE 17

| SRID | Name | Assigned To |
| --- | --- | --- |
| 1A | Service is down | JSMITH |
| 1B | Billing Inquiry for late charges to the account | JSMITH |

When Jane Smith opens up the My Groups Service Requests Page, she will see service requests in the My Groups Service Requests Panel as illustrated in Table 18.

TABLE 18

| SRID | Name | Assigned To |
| --- | --- | --- |
| 2A | Damaged Router | Hardware Group |

The filter on the Panel Objects control what records are returned by looking for specific assignments to that specific end user (or User Entity) or Team (or Organizational Group Entity).

Customization of Metadata Objects

The Entity Model 100 is used to control who can customize what Metadata Objects 110 (FIG. 2). Customizing a Metadata Object 110 refers to creating, modifying or deleting a Metadata Object 110 whether a Base or a Variation object. It does not refer to Personalization. The Entity Model 100 controls the access rights to who can create new Metadata Objects; modify existing Metadata Objects; and who can delete existing Metadata Objects.

Create New Metadata

The Entity Model 100 controls who can create new Metadata Objects 110 from the Entity Object 102 itself (not the Entity Access Rights Object 106). The creation access rights can be controlled down to the creation of Page Objects 112, Panel Objects 114, and Business Object Objects 116. These are the three primary categories of Object creation. Table 19 represents the Entity attributes that provide a user access rights to create Metadata Objects 110.

TABLE 19

| ATT ID | Attribute | Values | Description |
| --- | --- | --- | --- |
| | Page Global Can Create | =Yes | When set to Yes, the Entity is allowed to create new Pages. When set to No, the Entity does not have the ability to create new Pages. |
| | Panel Global Can Create | =Yes | When set to Yes, allows the Entity to create Panels. When set to No, the Entity is not allowed to create a Panel. |
| | BO Global Can Create | =Yes | When set to Yes, the Entity is allowed to create new Business Objects. When set to No, the Entity is not allowed to create any new Business Objects. |

The Entity Object 102 can also inherit the create metadata access rights from another Entity Object 102 via the Entity Relationship Object 104.

The Page, Panel, and Business Object 112, 114, 116 access rights should really be considered categories and not a definitive mapping to one specific Metadata Object 110. These categories exist to allow for specific type of roles such as the UI Developer, BO Designer, etc.

Example:

By providing an Entity access rights to BO Global Can Create="Yes", the Entity Object 102 is ultimately assigned the task to define new Business Objects 116 including the data surrounding it (e.g., Associations, Data Objects, etc). By providing an Entity Object 102 access rights to Panel Global Can Create="Yes", the Entity Object 102 is assigned to define new Panel Objects 114 including all the elements that surround it. Being granted access rights to Create a Metadata Object 110, ultimately means that the same end user will be granted access rights to Modify and Delete the Metadata Object 110 they created (see subsequent section for scenario).

Modify Existing Metadata

The Entity Model 100 controls who can modify existing Metadata Objects 110 from the Entity Object 102 and/or the Entity Access Rights Objects 106. The Entity Object 102 can be provided global access rights to the end user to modify all Objects of the given category that they have rights to see. This means that the Entity Object 102 is allowed to modify all instances of that category of Metadata Object 110 in the Entity Model repository that the end user is allowed to see (e.g., Page Global Can Customize means that the Entity Object 102 can modify all instances of Page Objects 112 in the Entity Model repository that the end user is provided access rights to see). The three primary categories available to be customized are Page Objects 112, Panel Objects 114, and Business Object Objects 116. Table 20 represents the Entity Object 102 attributes that provide an end user global access rights to modify Metadata Objects 110.

TABLE 20

| ATT ID | Attribute | Values | Description |
| --- | --- | --- | --- |
| | Page Global Can Customize | =Customize | When set to Customize, the Entity is allowed to customize/modify all Pages the entity is allowed to see. When set to Spawn or None, the Customize rights have to be set at a Entity Access Rights level. |

TABLE 20-continued

| ATT ID | Attribute | Values | Description |
|---|---|---|---|
| | Panel Global Can Customize | =Customize | When set to Customize, the Entity is allowed to customize or modify all Panels. When set to Spawn or None, the Entity can only modify Panels specified in the Entity Access Rights. |
| | BO Global Can Customize | =Customize | When set to Customize, the Entity is allowed to customize all Business Objects that it has rights to see. When set to Spawn or None, the Entity is only allowed to customize those Business Objects specified in the Entity Access Rights Object. |

It is noted that the Entity Object 102 can also inherit the customize metadata access rights from another Entity Object 102 via the Entity Relationship Object 104. It is further noted that if the Entity Object 102 is provided access rights to Can Customize='Customize', then the Entity Object 102 can also create new Variations. Providing global access rights to modify a category of Metadata Objects 110 (e.g., Page Object 112) doesn't mean that the end user can modify all instances of that category of Metadata Objects 110. It really means that the Entity Object 102 has access rights to modify all instances of the category of Metadata Objects 110 that they have access rights to see. What Metadata Objects 110 they can see is controlled either globally from the Entity Object 102 (e.g., Page Global All) or from the associated Entity Access Rights Object 106.

If an organization wants to control what specific Metadata Objects 110 that an Entity Object 102 is allowed to modify, then the Entity Object 102 can be assigned specific customization access rights to the specific Metadata Objects 110 by using the Entity Access Rights Objects 106. Using the Entity Access Rights Objects 106 means that an organization can say this specific Entity Object 102 can modify this specific Metadata Object 110. Table 21 represents the Entity Access Rights Object 106 attributes that provide an end user access rights to modify a specific Metadata Object 110.

TABLE 21

| ATT ID | Attribute | Values | Description |
|---|---|---|---|
| | Entity | Entity | A pointer to the Entity being granted this specific access rights. |
| | Object | Object | A pointer to the Object that the Entity Access Rights is referring to (i.e., Page, Panel, Business Object etc). |
| | Can Customize | =Customize | When set to Customize, the Entity can customize or modify this specific Object. When set to Spawn or None, the Entity cannot. |

It is noted that the Entity Object 102 can also inherit the customized Metadata Object 110 access rights from another Entity's Entity Access Rights Object 106 via the Entity Relationship Object 104.

Delete Existing Metadata

The Entity Model 100 controls who can delete existing Metadata Object 110 from the Entity Object 102 and/or the Entity Access Rights Object 106.

The Entity Object 102 can provide global access rights to the end user to delete all Metadata Objects 110 of the given category that they have rights to see. This means that the Entity Object 102 is allowed to delete all instances of that category of Metadata Object 110 in the Entity Model repository that the end user is allowed to see (e.g., Page Global Can Delete means that the Entity Object 102 can delete all instances of Page Objects 112 in the Entity Model repository that the end user is provided access rights to see). The three primary categories available to be deleted are Page Objects 112, Panel Objects 114, and Business Objects 116.

Table 22 represents the Entity Object 102 attributes that provide a user global access rights to delete Metadata Objects 110.

TABLE 22

| ATT ID | Attribute | Values | Description |
|---|---|---|---|
| | Page Global Can Delete | =Yes | When set to Yes, the Entity is allowed to Delete Pages from the Application. When set to No, the Entity is not allowed to Delete any Pages from the Application. |
| | Panel Global can Delete | =Yes | When set to Yes, the Entity is allowed to Delete Panels from the Application. When set to No the Entity is not allowed to Delete any Panels from the Application. |
| | BO Global Can Delete | =Yes | When set to Yes, the Entity is allowed to Delete Business Objects from the Application. When set to No, the Entity is not allowed to Delete any Business Objects. |

The Entity Object 102 can also inherit the delete Metadata Object 110 access rights from another Entity Object 102 via the Entity Relationship Object 104. Providing global access rights to delete a category of Objects (e.g., Page Object 112) doesn't mean that the end user can delete all instances of that category of Metadata Objects 110. It really means that the Entity Object 102 has access rights to delete all instances of that category of Metadata Objects 110 that they have access rights to see. What Metadata Objects 110 they can see is controlled either globally from the Entity Object 102 (e.g., Page Global All) or from the associated Entity Access Rights Object 106.

If an organization wants to control what specific Metadata Objects 110 that an Entity Object 102 is allowed to delete, then the Entity Object 102 can be assigned specific delete access rights to the specific Metadata Objects 110 by using the Entity Access Rights Object 106. Using the Entity Access Rights Object 106 means that an organization can say this specific Entity Object 102 can delete this specific Metadata Object 110. Table 23 represents the Entity Access Rights Object 106 attributes that provide a user access rights to delete a specific Metadata Object 110.

TABLE 23

| ATT ID | Attribute | Values | Description |
|---|---|---|---|
| | Entity | Entity | A pointer to the Entity being granted this specific access rights. |
| | Object | Object | A pointer to the Object that the Entity Access Rights is referring to (i.e., Page, Panel, Business Object etc). |
| | Can Delete | =Yes | When set to Yes, the Entity can delete this specific Object from the repository. If set to No, the Entity can not delete this Object from the repository. |

The Entity Object 102 can also inherit the delete Metadata Object 110 access rights from another Entity's Entity Access Rights Object 106 via the Entity Relationship Object 104.

Base vs. Variation Objects

The access rights to Variation Metadata Objects in the Entity Model repository 6 function exactly the same way as the access rights to Base Metadata Objects. A variation is treated as a separate Metadata Object 110 that an Entity Object 102 needs specific access rights to in order to customize the exact same way a Base Metadata Object 110 would need the specific access rights. The only difference between a Base and a Variation Metadata Object is in the access rights for the creation. The Base Metadata Objects are created by setting the Entity's attribute of Global Can Create. However, for the Variance Metadata Objects, the creation is based upon the customization access rights provided for the Base Metadata Object. This is set by either providing global access rights on the Entity Object 102, or for each specific Base Metadata Object 110 in the Entity Access Rights Object 106. Table 24 represents the Entity Object 102 attributes that are set in order to provide the Entity Object 102 (or end user) global access rights to create Variations off all Base Metadata Objects 110 they have access to see.

Figure 20:
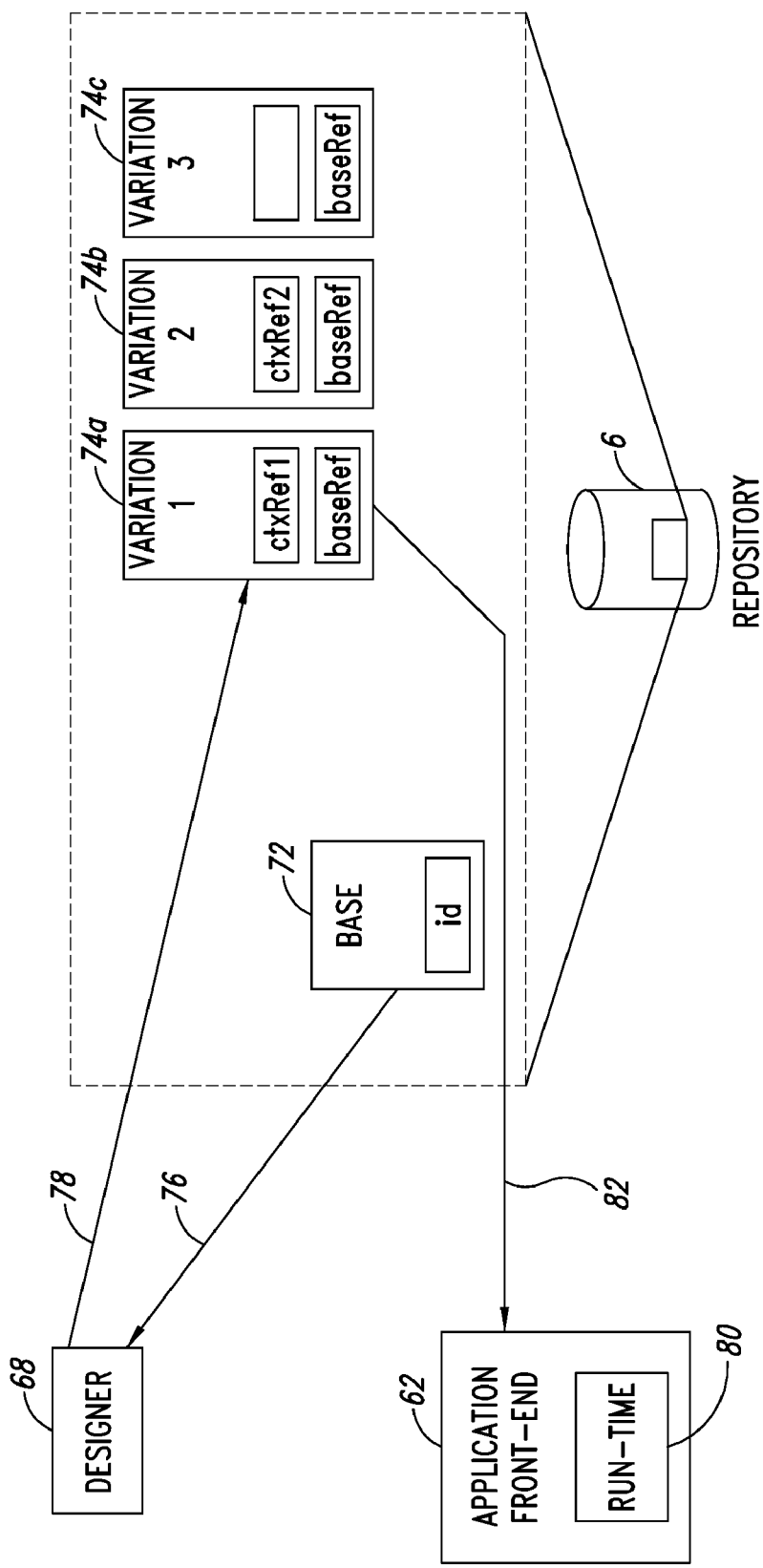
FIG. 20 is a schematic diagram of a method of personalizing Metadata Objects employing Base and Variations according to one illustrated embodiment.

FIG. 20 illustrates a method of personalizing Metadata Objects 110 (FIG. 2) according to one embodiment. The Metadata Objects 110 are structured into Base Sets 72 and corresponding Variations 74a-74c associated to the Base Set 72 by any machine-processable form. Variations 74a-74c reference a Context. Personalization may thereby be defined for specific end users, roles, and/or groups. The Context Value references the end users, roles and/or groups identifiable at run-time.

The metadata Designer tool 68 or application front end 62 is capable of fetching the Base Set either directly from the repository 6 or via an intermediary as illustrated by arrow 76. The Designer tool 68 allows for the changing of the Metadata Object 110, capture of the context of the changes, and reporting of the changes to the repository 6 as illustrated by arrow 78. While FIG. 20 illustrates the Base and Variations 72, 74a-74c separately, this is only a logical distinction. The repository 6 may be structured in any variety of other suitable ways, provided that a run-time engine 80 of the application front end 62 may fetch a set of Metadata Objects 110 that is specific to the Context of operation (i.e., end user, role, group, geography, etc.) as illustrated by arrow 82.

TABLE 24

| ATT ID | Attribute | Values | Description |
|---|---|---|---|
| | Page Global Can Customize | =Spawn | When set to Customize, the Entity is allowed to customize/modify all Pages the entity is allowed to see, including being able to create new variations. When set to Spawn, the Entity is allowed to create variance objects from base objects only (Doesn't apply to Variances). When set to None, the Customize rights have to be set at an Entity Access Rights level. |
| | Panel Global Can Customize | =Spawn | When set to Customize, the Entity is allowed to customize/modify all Panels the entity is allowed to see, including being able to create new variations. When set to Spawn, the Entity is allowed to create variance objects from base objects only (Doesn't apply to Variances). When set to None, the Customize rights have to be set at an Entity Access Rights level. |

It is noted that the Entity Object 102 can also inherit the create Variation Metadata Object from Base Metadata Object access rights from another Entity Object 102 via the Entity Relationship Object 104. Also if an Entity Object 102 has been provided Global Can Customize='Customize', then the Entity Object 102 can also create Variations of the Base Metadata Object. Table 25 represents the Entity Access Rights Object 106 attributes that are set in order to provide specific access rights to specific Base Metadata Objects so that an end user can create Variation Metadata Objects.

TABLE 25

| ATT ID | Attribute | Values | Description |
|---|---|---|---|
| | Entity | Entity | A pointer to the Entity being granted this specific access rights. |
| | Object | Object | A pointer to the Object that the Entity Access Rights is referring to (i.e., Page, Panel, Business Object etc). |
| | Can Customize | =Spawn | When set to Customize, the Entity can customize or modify this specific Object. When set to None, the Entity cannot. If set to Spawn, the Entity can create variance objects from this specific base object (only applies to base Pages and base Panels). |

The Entity Object 102 can also inherit the create Variation access rights from another Entity's Object 102 Entity Access Rights via the Entity Relationship Object 104. If an Entity Object 102 has been provided Can Customize='Customize', then the Entity Object 102 can also create Variations of this specific Base Metadata Object.

Inherent In-Memory Delta Test and Deployment Rights

The Entity Model 100 provides different mechanisms to Test and then Deploy customization changes to Metadata Objects 110. Test and Deployment can either be done from the In-Memory Deltas or the Customization Deltas.

In-Memory Deltas represent the changes to be done to the production Metadata Objects 110 that are currently being viewed in the Entity Model design mode. The In-Memory Deltas can either be deployed immediately to the production Metadata, or saved as a Customization Deltas and applied to a Project for later use. Customization Deltas represent a collection of stored changes to be done to the production Metadata Objects 110 that are grouped under a Project. The Project can have many of these Customization Deltas that span across many different Metadata Objects 110.

The end user who has been provided access rights to customize (Add, Modify, Delete) Metadata Objects 110 inherently is provided access rights to deploy and test the customization change only from the In-Memory Deltas. However, the end user who has been provided access rights to customize Metadata Objects 110 do not receive access rights to test and deploy Customization Deltas based upon Projects. The Test and Deployment process for the collection of Customization Deltas is a much bigger role and should have explicit access rights to undertake these tasks. Even though an end user has been provided access rights to customize a Metadata Object 110 does not mean the end user can distribute the Metadata Object 110 to any other end users or Entity Objects 102. An Entity Object 102 still needs Administrator privileges in order to distribute and assign access rights to Metadata Objects 110.

Creation, Modification, and Deletion Cycle

The Entity Model 100 has to manage the access rights intelligently to ensure that end users who create Metadata Objects 110 are provided access rights to continue customizing, spawning, and deleting the Metadata Object 110. If an Entity Object 102 is provided access rights to create a Metadata Object 110, then once the Metadata Object 110 is created an Entity Access Rights Objects 106 has to be created that give that Entity Object 102 customization, spawning, and deletion access rights as well to that Metadata Object 110.

Example:

An Entity Object 102 has been given access rights to create a new Page Object 112. The end user creates a new Page Object 112 called Page Object A. Upon creating this Page Object, an Entity Access Rights Object 106 is created that references the user's Entity Object 102 and the Page A Metadata Object 112. The Entity Access Rights Object 106 is given the attributes illustrated in Table 26. This ensures that the Entity Object 102 can continue to customize, spawn, and delete the Page Objects 112 they created themselves.

TABLE 26

| Attribute | Values |
| --- | --- |
| Entity Object | Entity Page A |
| Read-Only | No |
| Can Customize | Customize |
| Can Delete | Yes |

It is noted that an Entity Access Rights Object 106 should be created regardless of whether or not the Entity Object 102 has Global Customize rights to that specific Metadata Object 110. This is to ensure that the Entity Object 102 can continue seeing it if the global access rights are removed, and will help track who may be working on what Metadata Objects 110. If an Entity Object 102 is provided access rights to create a Variation from a Base Metadata Object (Spawn), then upon that Entity Object 102 creating a Variation Metadata Object 110 an Entity Access Object 106 needs to be created for this new Variation Metadata Object 110. This ensures that the Entity Object 102 can continue customizing and deleting the newly created Variation Metadata Object 110.

Example:

An Entity Object 102 has been provided access rights to create a Variation from Page Object A, but not to Customize Page Object A. The current Entity Access Rights Object 106 parameters are illustrated in Table 27. As can be seen, the Entity Object 102 can only create a Variation off of Page A (Can Customize='Spawn').

TABLE 27

| Attribute | Values |
| --- | --- |
| Entity Object | Entity Page A |
| Read-Only | No |
| Can Customize | Spawn |
| Can Delete | No |

If the Entity Object 102 creates a Variation Page Object B off of Base Page Object A, then a new Entity Access Rights Object 106 is created for Page Object B. The newly created Entity Access Rights Objects parameters are illustrated in Table 28. The Entity Object 102 has the full access rights to further customize or delete the Variation Page Object B that the Entity Object 102 has created. This is even though the Entity Object 102 cannot customize the Base Page Object A.

TABLE 28

| Attribute | Values |
| --- | --- |
| Entity Object | Entity Page B |

TABLE 28-continued

| Attribute | Values |
| --- | --- |
| Read-Only | No |
| Can Customize | Customize |
| Can Delete | Yes |

Organizational Groups

The concept of organizational groups and teams are common in most business applications today. These concepts are typically used to add a layer on top of a group of end users so that more general rules can be made to filter, assign (or route) and present data. Many business applications that the Entity Model 100 will interact with already do some of the filtering, assignment and presentation of the data. However, the Entity Model 100 cannot assume that this is taken care of and has to provide its own facilities to do so. The Entity Model 100 may support the concept of organizational groups and teams. Both of these are typically implemented differently, but ultimately there is little difference in what they provide. The primary difference is typically that 1) Organizational Groups are typically used to control what sets of data end users are allowed to see within the system; Organizational Groups tend to be hierarchal in nature whereas Teams tend very much to be non-hierarchal; and Teams are typically used to denote assignment or ownership of a particular record. However, these are general statements that don't always hold true and any Entity Model 100 needs to support many different types of requirements.

Organizational groups are typically used to segment data into logical parts of visibility. Examples of Organizational groups may include: 1) Regions such as North America, EMEA, ASIA/PAC; 2) Territories such as Northern Europe, Central Europe, Pacific, Midwest; 3) Functions such as Sales, Support, Finance; and 4) Organizations such as Internal, Partner Account A, Partner Account B, Vendor A, Vendor B. Note, that this is not an all inclusive list, but only represents a sampling of different scenarios. It is normal to control data access for an end user to only see data from their region, territory, function, or organization (e.g., A North American Support person may only be allowed to see the list of Customers from the North American Region). Each end user organization typically has different requirements with respect to implementation of this type of structure, so any structure provided has to be flexible enough to support the different end user organizations' specific requirements.

Figure 9:
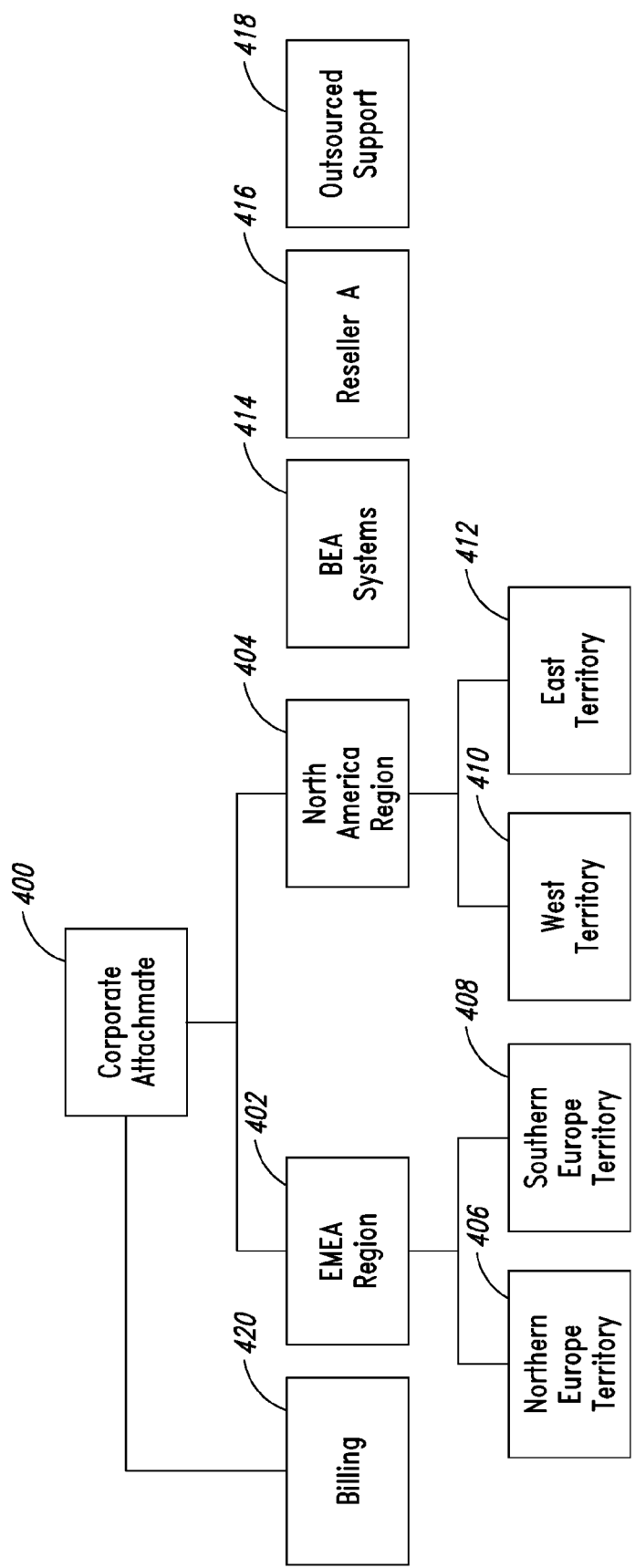
FIG. 9 is a is a schematic diagram showing a first exemplary organizational structure useful for illustrating operation of the Entity Model according to yet another illustrated embodiment.

As illustrated in FIG. 9, in some cases the Organizational Groups are hierarchal. For example, the Corporate Attachmate Organizational Groups 400 includes two regions 402, 404, that in turn include territories 406, 408, 410, 412. Data assigned to Northern Europe Territory 406 (e.g., Customers) can be seen only be that territory, its parent EMEA Region 402, and Corporate Attachmate 400. However, none of the other territories or regions is allowed to see the customer list. It is the hierarchy of Organizational Groups that allow the EMEA Region 402 and Corporate Attachmate 400 to see the data assigned to the Northern Europe Territory 406.

Also, it is becoming increasingly common to have vendors, partners and resellers 414, 416, 418 log into an end user organization's computing systems. These third-parties typically share information at some level.

Example 1

A reseller may have to provide a list of their actual customers. This list should be available to the reseller to edit. However, the reseller should never be able to access the customer list of other resellers or even an internal customer list.

Example 2

A go-to-market partner (e.g., Attachmate and BEA) may very well be sharing a lead/opportunities portal that allows the two companies to work jointly on an opportunity or lead. As such, an Organizational Group could manage the interaction between the internal and third-party sales force, and ensure that proprietary customer lists are not exposed to the third-party.

Example 3

An organization may decide to outsource its Contact Center Support to a third-party (e.g., Convergys, Teletech, etc) for lower tiered customers. The Organizational Groups could be used to segment out those lower tiered customers and make them available to the third-party contact center without exposing higher tiered customers.

Example 4

The customers are split into sales accounts and booked accounts. The Sales organization wants to see the accounts they are currently working opportunities and selling to. However, the Billing department 420 (FIG. 9) may only need to see the actual booked customers and should not be able to see the pipeline of customers. In this case, a Billing Organizational Group could be defined that has view access rights only to those accounts that have an actual booking against them.

The organizational hierarchy can be created using the Entity Model 100 (FIG. 2). An organizational unit could be represented by an Entity Object 102 of type Organizational Group. To create the hierarchy the Entity Object 102 can be associated to another Entity Object 102 via the Entity Relationship 104. This way the entire organizational hierarchy can be created using the Entity Model 100. A user is inserted into this organizational hierarchy through the Entity Model 100. Simply by associating the user Entity with the organizational group Entity via the Entity Relationship ensures that the end users can interact within this structure. The following scenario demonstrates how an organizational hierarchy can be created using the Entity Model 100.

Scenario:

An end user wants to create an organizational hierarchy such as that illustrated in FIG. 9, so that data visibility can be controlled across different internal and external constituencies. The customer Corporate Attachmate 400 consists of two sales regions EMEA 402 and North America 404 and a Billing 420 organization. These organizations need to have different visibility to data (e.g., Accounts, Opportunities, Service Requests, Contacts, etc). Corporate Attachmate 400 also allows a partner BEA Systems 414 to log into the Entity Model 100 in order to share sales opportunities provide collateral etc. But the partner 414 should be restricted to the partner's own data only and not be allowed to see Corporate Attachmate's 400 data. Corporate Attachmate 400 also has resellers, for example Reseller A 416, that are allowed to log into the Entity Model 100 in order to share product, accounts, and collateral information. The resellers 416 are only allowed to see data related to them and not the rest of the Corporate Attachmate 400 or BEA Systems 414 data. Finally, Corporate Attachmate 400 has outsourced its lower tiered customers to an Outsourced Support third-party 418. This Outsourced Support 418 needs to have access to customer information including purchasing history, billing information, and technical information all through the Entity Model 100. The Outsourced Support 418 is not allowed to see any of the customer information beyond the lower tier customers.

To accomplish this Corporate Attachmate 400 could create an organizational hierarchy using the Entity Model 100, defining Entity Objects 102 as illustrated in Table 29 and Entity Relationship Objects 104 as illustrated in Table 30. The structure allows user Entities to be associated to a point in the organizational hierarchy and immediately receive the benefits inherent in the hierarchy (e.g., a user Entity is associated to the EMEA Region and can thus now see all data related to the EMEA Region, Northern Europe Territory, and the Southern Europe Territory).

TABLE 29

| Entity | Type |
| --- | --- |
| Corporate Attachmate | Organizational Group |
| Billing | Organizational Group |
| EMEA Region | Organizational Group |
| North Europe Territory | Organizational Group |
| Southern Europe Territory | Organizational Group |
| North American Region | Organizational Group |
| West Territory | Organizational Group |
| East Territory | Organizational Group |
| BEA Systems | Organizational Group |
| Reseller A | Organizational Group |
| Outsourced Support | Organizational Group |

TABLE 30

| Primary | Associated |
| --- | --- |
| Corporate Attachmate | Billing |
| Corporate Attachmate | EMEA Region |
| Corporate Attachmate | North American Region |
| EMEA Region | Northern Europe Territory |
| EMEA Region | Southern Europe Territory |
| North America Region | West Territory |
| North America Region | East Territory |

Teams

The concept of teams is typically used to let end users collaborate on work items and to assign data (e.g., Assignment of a Service Request to the Unisys Emulation Team, assignment of accounts to a West Territory). Teams are used when several individuals (or users) share the responsibility of certain tasks or processes. By allowing the concept of teams, any task or work item can be routed to the team. This simplifies the management of any routing rules as they do not need constant administration as individuals leave and move between the different teams. Teams are typically more granular than an organizational hierarchy and often are not used for data visibility. Typically end users are assigned to one or more teams at a time and frequently move between teams.

Some examples of teams may include: 1) Hardware Support; 2) Unisys Support; 3) Installation; 4) Billing; 5) Shipping; and 6) Returns. The concept of a team allows work items to be easily routed to the proper individuals who can complete the work item. The Entity Model 100 supports the concept of teams by allowing Organizational Group Entities to be created. User Entities can then be associated to the Organizational Group Entities via the Entity Relationship. They now become part of the team and data can then be filtered or queried in a Panel Object 114 (FIG. 2) in order for end users to access their "Teams" work items or data records.

Access Rights

The Access Rights are set up by using the Entity Model 100. A user in the Entity Model 100 is assigned an Entity Object 102 of type 'User'. This Entity Object 102 is then associated to an Entity Access Rights Object 106 which is the intersection object that defines the Objects to which the user has access rights.

Example:

If a user Bill Smith is assigned to an Entity Object 102. Then in order to get Access Rights to the Account List Page, an Entity Access Rights Object 106 has to be created that is associated to Bill Smith's Entity Object and the Account List Page Object 112.

The Entity Object 102 can also be associated with other Entity Objects via the Entity Relationship Object 104. By being associated to other Entity Objects, an Entity Object 102 can inherit the access rights provided to the associated Entity Objects.

Figure 21:
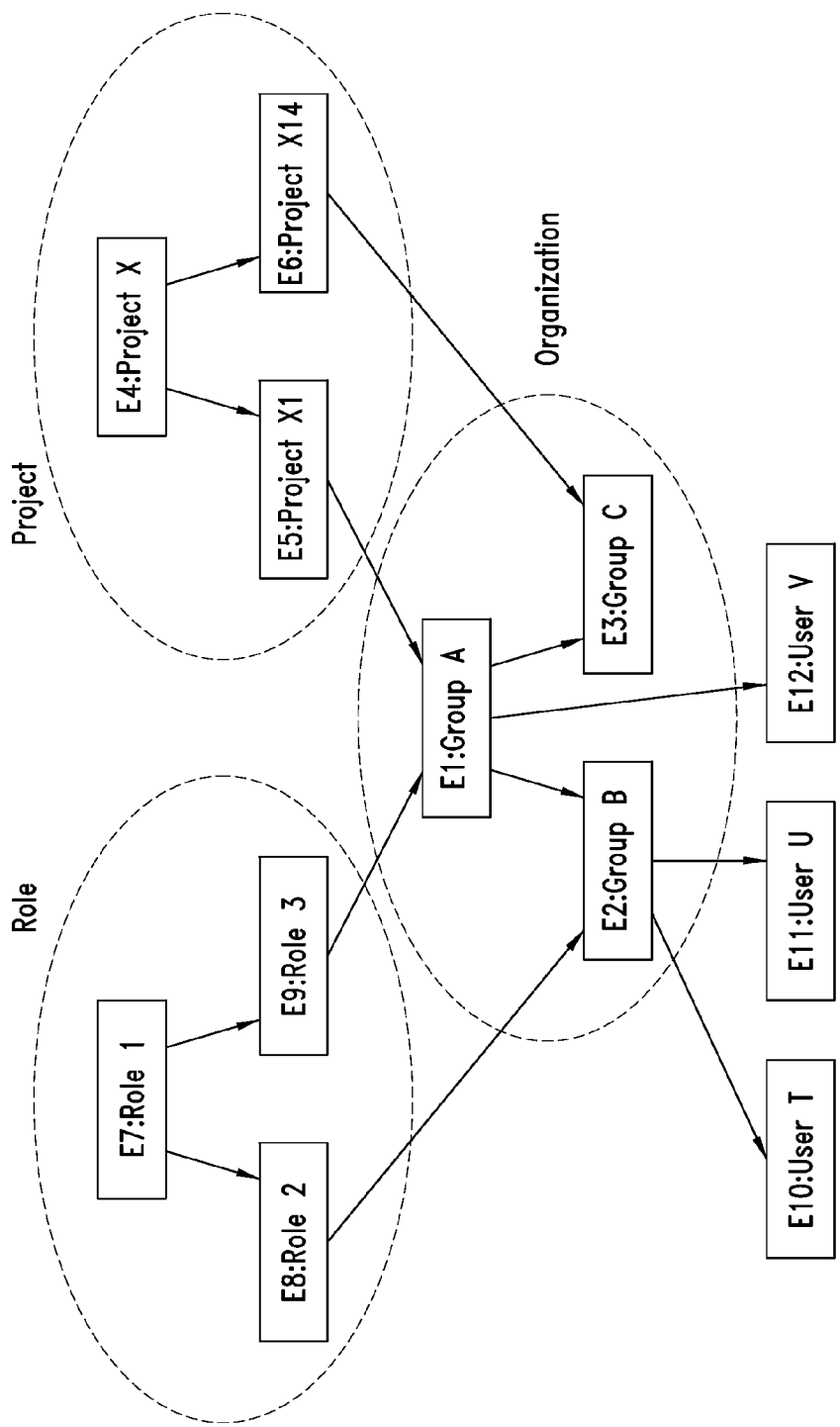
FIG. 21 is a schematic diagram illustrating an exemplary set of Entity relationships between various Entity Objects, according to one illustrated embodiment.

FIG. 21 shows an exemplary set of relationships employing Entity Objects E1-E12, corresponding to various Roles (e.g. Role 1-Role 3), Projects (e.g., Project X, Project X1, Project X14), Groups (e.g., Group A-Group C), and end users (e.g., User T-User V), respectively, illustrating Entity definition and binding. Thus, Access Rights can be controlled along many dimensions, which often vary from one organization to another. Dimensions include, but are not limited to: organization, projects, geography, roles, teams, etc. Thus an Entity Object represents any thing that may have assigned Access Rights assigned, including groups, roles, projects, customer, partners, as well as end users. Entity Objects are typically related to one another, the relationship defining which Entity Object inherits rights of another Entity Object in addition to its own Access Rights. For instance, an Entity Object representing an end user might be related to a project, an organizational group and one or more roles. This enables Access Rights to be inherited from any hierarchy to any other hierarchy. For performance reasons, references to Entity Objects may be resolved ahead of time, either in memory or persistently.

Example:

If there are multiple users that all need access rights to the same three Page Objects: Account List Page, Account—Orders Page, and Account—Contacts Page, then rather than creating Entity Access Rights Objects 106 for each Page Object 112 per user, an Entity Object of type Access Group can be created which has a three Entity Access Right Objects associated with it, one for each Page Object. The user Entity Objects can then be associated to the Access Group Entity Object using the Entity Relationship Object. Now all three user Entity Objects inherit the access rights of the Access Group Entity Object.

In order to set up these access rights for the Entity Objects, there are specific access right attributes that determine what users are allowed to set up and distribute access rights to other users. Table 31 represents the access rights that allow an end user to assign and distribute access rights to other users.

TABLE 31

| Entity (Attributes) | Entity Access Rights (Attributes) |
|---|---|
| Administrator = "Yes" | NA |

The end user must have the Administrator attribute on the Entity Object or inherited Entity Object in order to have permission to assign or distribute access rights to other users. However, there are additional considerations and rules that determine the scope of this right. An Entity Object (or end user) with Administrator privileges can only assign or distribute access rights to other end users to Objects they themselves have rights to access. In other words, an Administrator can only give another end user the same rights or more restrictive rights from what they themselves have been given. This ensures that they cannot create an end user that has more rights than they have. Secondly, an Entity Object (or end user) with Administrative privileges needs to have been given the access rights to an Administrative Entities Page Object. This Page Object determines the scope of the Administrative privileges that are granted to a particular Entity Object.

Example:

An end user Entity Object has been given Administrator privileges, however, the Administrative Entities Page Object they have been given access rights to does not allow new users to be created. The Page Object may furthermore only provide the rights to see the end users associated to the same Organizational Group as the administrative end user. This means the administrator can only assign Objects that relate to their department and not for the full enterprise. The reason for the control at the Administrative Entities Page level, is so that the Entity Model application can support both the System Administrator and Group Administrator concepts. The System Administrator would have virtually unlimited powers, whereas the Group Administrator should only be able to administer the end users in their group. The Administration Entities Page Objects can control the different capabilities by providing Base and Variation Page Objects.

Example:

The System Administrator could receive access to the Base Administrative Entity Page Objects whereas the Group Administrators could receive access to the different Variations to that Page Object that may restrict what they can achieve in those Page Objects.

Group Administrators

The Group Administrator is an end user (or group of end users) that are responsible for performing some level of administration to a subset of end users within the Entity Model 100. To become a Group Administrator the end user must have been given the access right Administrator="Yes" on their Entity Object or inherited Entity Object. They furthermore must have been given access rights to a Base or Variation Administrative Entities Page Object (though typically a Variation). Note, that it is still possible for non-administrators to share in the Entity Model 100. However, these end users are restricted to sharing only their personalizations to end users who have the same object as them.

System Administrator

The System Administrator is an end user (or group of end users) that have access to all administrative functions in the Entity Model 100, including Entity administration, server administration, component administration and all other functions related to managing the overall Entity Model application. In some embodiments, there must always be a System Administration end user in the Entity Model. A generic System Administrator Entity end user should be pre-set up by the software distributor, maker or end user organization which is associated to an Access Group Entity Object which contains all the Administrative Pages in the Entity Model. Both the System Administrator end user Entity and System Administration Access Group Entity is pre-set up and cannot be deleted from the Entity Model 100. The end user organizations should always be able to login as the generic System Administrator Entity and immediately receive all access in the Entity Model. However, it will be strongly encouraged to the end user organizations to create named end users that inherit the System Administration Access Group Entity. The System Administrator will always have access rights to the Base Administrative Page Objects. The System Administrator will have access to everything in the Entity Model 400 via the System Administration Entity Access Group Object. Given that the System Administrator has access to all, they can ultimately give access rights to all other end users for all Objects and have no restrictions associated to them.

Base and Variation Objects

The Entity Model approach may realize a number of distinct benefits. For example, the approach may minimize the number of UI components that have to be created and/or may minimize the amount of management of UI components. The approach may advantageously re-use common components that can be extended for specific businesses. The approach may insulate business users and analyst from Enterprise data rules that reside in the Business Objects, and/or may provide a mechanism in which end users can customize Objects further without intimate knowledge of data architecture and implementation. The approach may provide flexibility in what can be customized and/or propagate changes in Enterprise data and functionality easily and centrally. Further, the approach may safeguard Enterprise data integrity, while giving the business and users choices. The approach may allow the end user organization to make their choices, rather than being dictated their choices and/or allow end users to have a starting point UI Object, rather than creating it from scratch. The Base and Variation Object concept discussed below is only one approach to providing the above benefits, other more simplistic solutions may exist.

The Page and Panel Objects in the Entity Model 100 can be a Base or Variation. A Base is any stand alone UI Object (i.e., Page Object or Panel Object). The Variation on the other hand is based upon the Base Object but with slight modification. The Variation is restricted to what the Base Object provides. That is to say, the Base Object defines the rules to which the Variation Object must adhere. The Base and Variation Objects in the Entity Model 100 is purely a design time experience and need to be treated as separate Objects during runtime.

It would be a fair statement to say that in order to create and manage a Base Object during design time, the developer must know the implementation of the Business Object 116 from which the Base Object is being derived. This is different for the Variation Object, where the Business Object 116 becomes transparent. The Variation Object need only know the rules defined by the Base Object. The best way to think of the Variation Object is that you can only make changes to a UI element (e.g., its Base Object or another Variation Object).

It is noted that a Variation Object cannot exist without its Base Object. It is also noted that a Variation Object and a personalized Object is not the same thing. A Variation Object can be shared across users and groups. A personalized Object is only visible to the individual end user who created it, and must be based upon the assigned Base or Variation Object.

The advantage of the Variation Object is that it gives end users a starting point to make changes, rather than starting from scratch and having to know what to use from the Business Object 116. Table 32 summarizes some of the differences between Base and Variation Objects. With respect to Table 32, it is noted that the Developed by target indication is not a hard and fast rule, but rather an indication of the expected type of end users who may perform the development for the type of Object.

TABLE 32

| | Developed By Target | Comments |
| --- | --- | --- |
| Base Object | IT (possible Business Analyst) | Can change BO Mapping. Business Object Specific. Restricts and sets rules (that have to be adhered to by variations). Provides the superset of what is needed by all Variations. Creation can potentially be automated based upon known attributes of the BO. |
| Variation Object | Business Analyst End Users | Inherits new properties, methods and events from Base Object. Restrained by rules set by Base Object. Limits use as per specific Business usage. Cannot add more than provided (if restricted). Can add BO Extension Columns. Can set further restriction rules. Business Objects are transparent. Cannot change BO mappings. |

Assigning Pages Based Upon Base and Variation Objects

During runtime each individual Base and Variation Object should be treated as a separate Page Object and/or Panel Object. To assign a Page Base and Variation Objects in the Entity Model Administration Access Rights, the end users or groups are assigned Base and Variation Objects as if they are two completely different Page Objects. Even though the relationship exists, the administrator setting up Access Rights need not know about the association or that they are even related. If an end user is assigned a Base Object and one of its Variations, the two will show up as two separate Page Objects, each with its own name. This may be the case even though one is based upon the other.

Example:

A Base Page Object has been created that shows an Account List. A Variation is created that shows the same Account List, but with an additional filter (i.e., Only North American Accounts).

Managing Changes Using Base and Variation Objects

One of the reasons why Base Objects exist is that they provide a mechanism to roll out changes to the organization effectively without changing all instances.

Example:

A Base Panel Object shows Account Detail information. Several Variation Objects have been created to show the Account Detail information as well, but each with variations as to what fields and filters are used. The end user organization determines that a new Enterprise field called Account Type needs to be added. With the Base and Variation Objects, only the Account Type field needs to be added to the Base Panel Object. The new Type field becomes automatically available to all other Variation Panels without the end user organization having to physically add the field to each Object.

It would be the long-term goal to allow the owner of the Base Object to force changes out to all Variation Objects. In the above example, this would mean that when the Account Type field was added to the Base, the developer was asked whether to force the field onto all Variation Panels, or select from a list the Panel Objects to force the change. The field would then automatically be added to the Panel Object without further interruption.

Navigation Based on Context

The code underlying the UI Elements can register Context Elements. Alternatively, this responsibility may be delegated to a third party software component that is notified when new data elements are selected by the end user or even as part of the inner workings of the Entity Model application. For instance, a security component may add to the Context, a Context Element representing values from the end user profile data type (e.g., identifier, region, preferences, etc.). The values of the end user profile may be used to restrict the display of data to only that which is related to, or accessible by, the particular end user. A Context Element is always a pair (i.e., data type identifier: array of values). The UI Element may select when and how a Context Element is captured, or may delegate the selection to another component. For example, upon an end user selecting a piece of data or several pieces of data of the same data type; automatically, when some data is loaded into the UI Element. The data type values(s) may be visible and represented in a control, or invisible. A data type may be a primitive type, a data structured defined by a common mechanism (e.g., class definition, XML schema, etc.), or a virtual type which does not correspond to a physically identifiable data structure (e.g., the code that produces and consumes the Context Element are aligned). A Context Element may contain a single value or a list of values. The value of a Context Element is not empty. The Context Element may be stored temporarily or permanently in one or multiple Contexts. A Context is a shared storage space, which may either be permanent or transient, to which the UI Elements may read or write. Examples of Contexts may include User Context, Group Context, Application Context, etc.

When a UI element can be set to discover one or more Context components and request Context Values of one or more data types each time the UI element is instantiated or refreshed. Alternatively, any software component triggered by an event associated to the instantiated or refresh of a particular UI element may chose to select specific context elements that will be used to populate the data represented by the target US element. The target UI element or any alternative software component may use the context element to: 1) directly display its value(s); or 2) to use the value(s) to fetch more data elements. The target UI element may in turn register any number of context elements. The Context element consumption may occur at any step subsequent to selecting a particular context element. The context elements may even be persistent, if desired.

Figure 22:
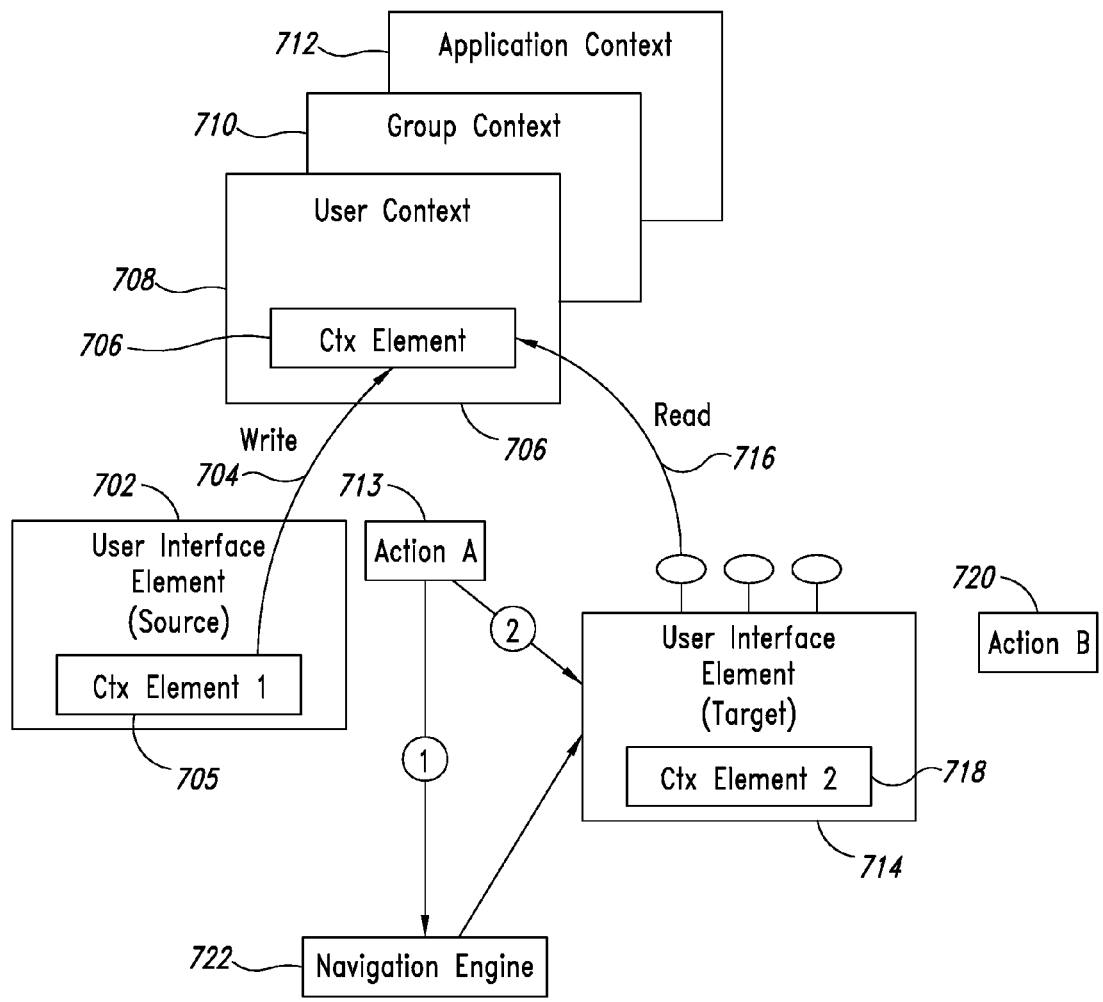
FIG. 22 is a schematic diagram illustrating the interaction between User Interface elements, various Contexts and a Navigation Engine, according to one illustrated embodiment.

As illustrated in FIG. 22, a source UI element 702 may write 704 its own Context Element 705 to a Context Element 706 of a User Context 708, Group Context 710 and/or Application Context 712, for example in response to an "Action A" 713. A target UI element 714 may read 716 the Context Element 706 of the User Context 708, Group Context 710 and/or Application Context 712 to its own Context Element 718, for example in response to an "Action B" 720, employing a Navigation Engine 722.

Figure 10A:
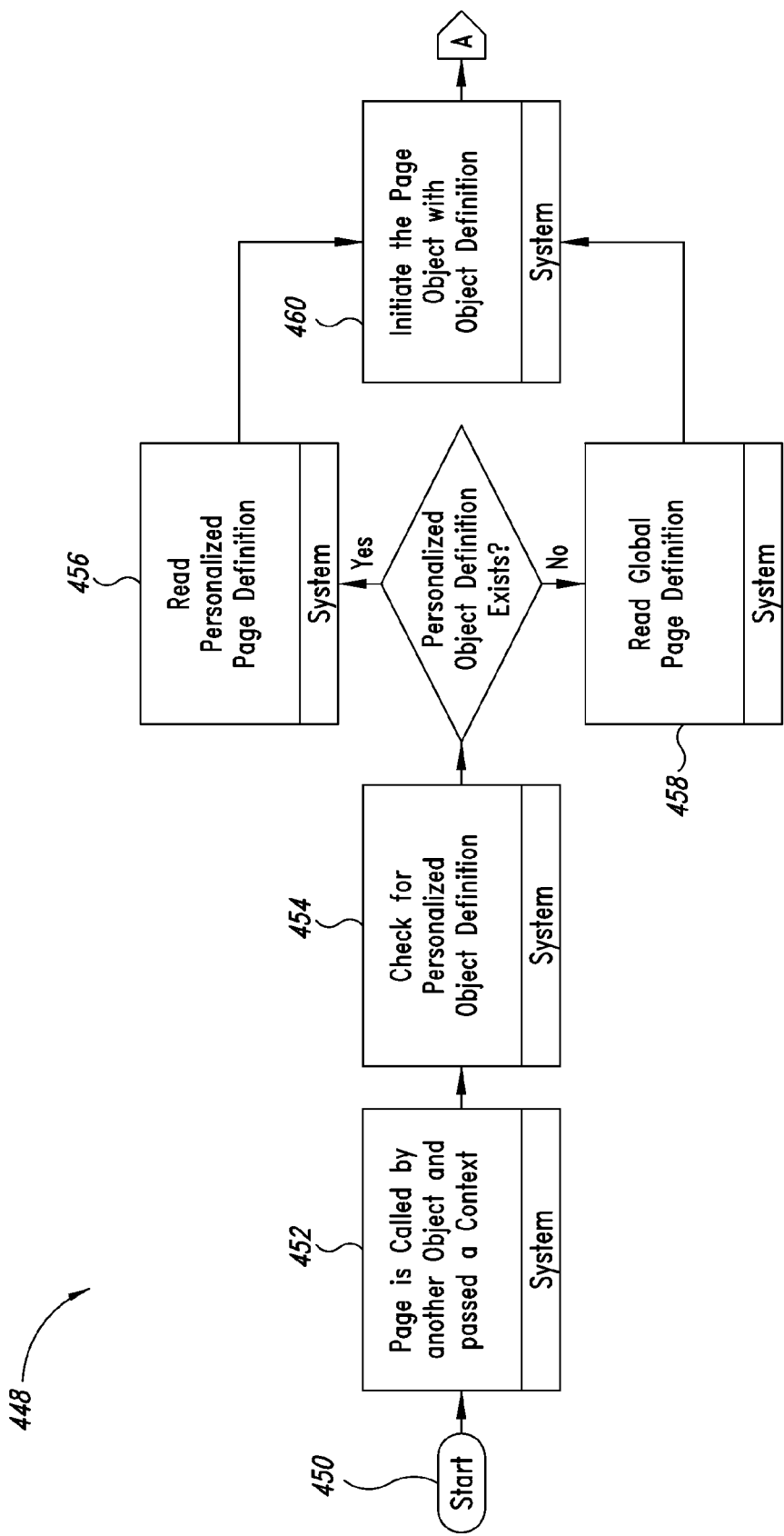
FIGS. 10A-10C are a flow diagram showing a method of calling a Page within a Context in an Entity Model according to one illustrated embodiment.
Figure 10B:
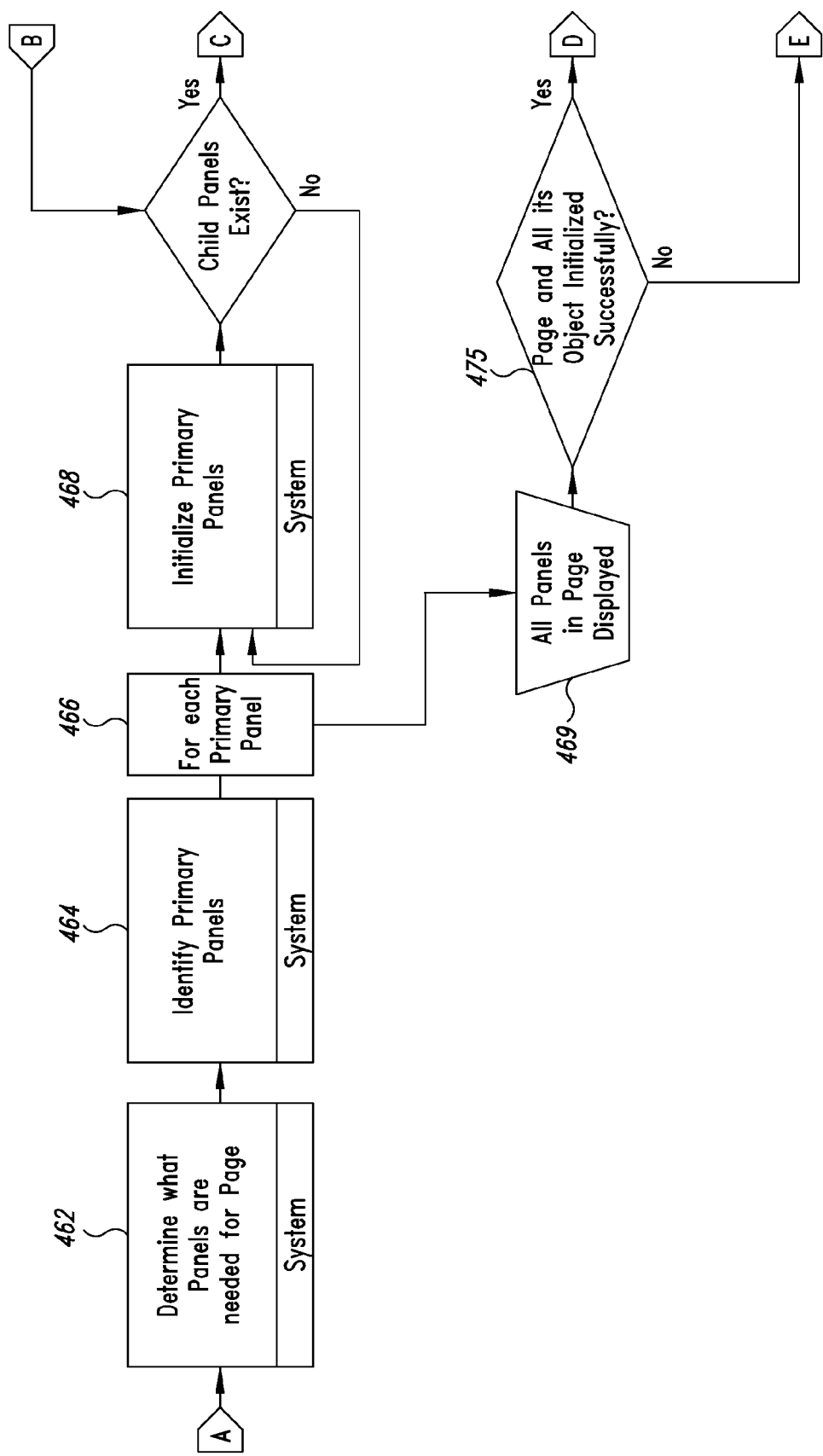
Figure 10C:
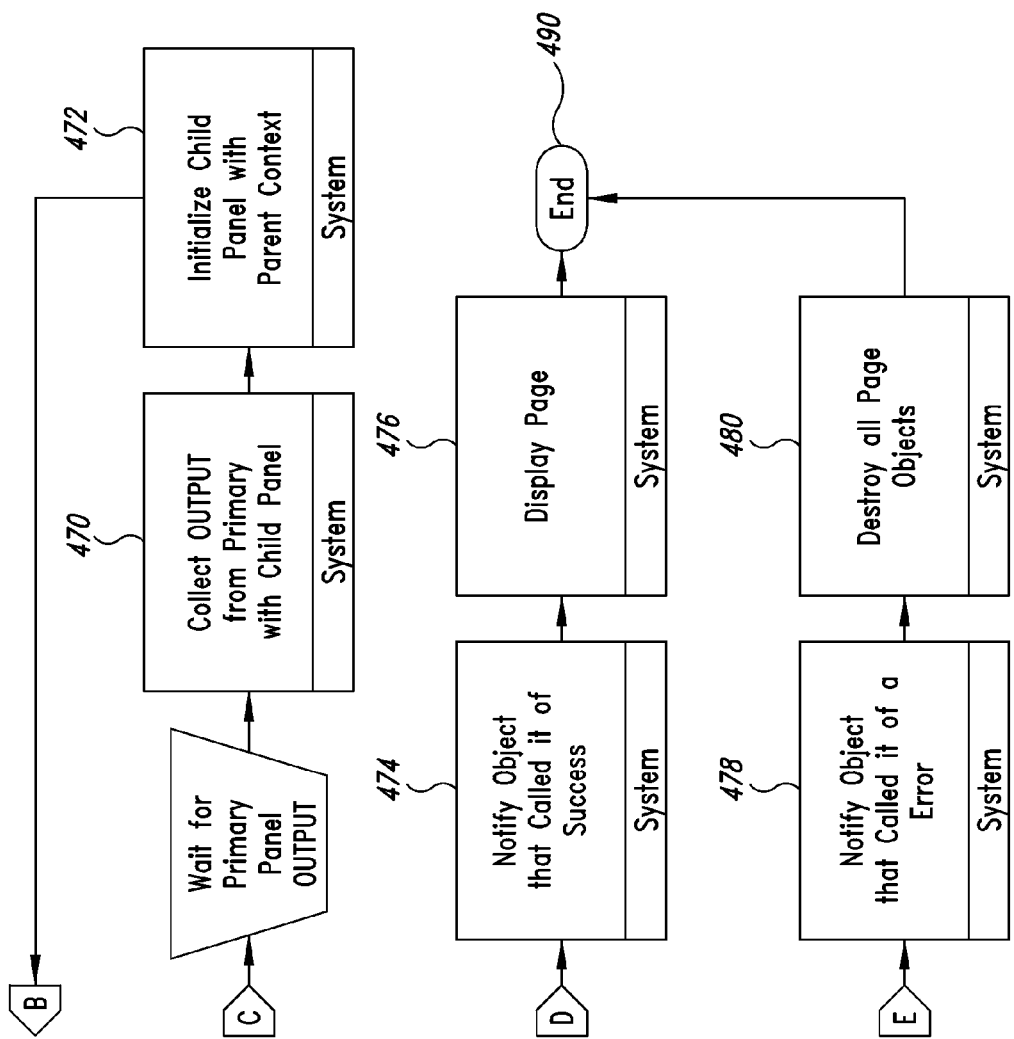

FIGS. 10A-10C illustrate a method 448 for calling a Page Object within a Context according to one illustrated embodiment, starting at 450. A Page Object 112 (FIG. 2) can be called by any Object. As the Page Object 112 is initialized it can be passed a Context. The passed Context is essentially telling the Page Object 112 to display its contents as they related to the passed Context. The Context may relate to the Page Object 112 itself, or it can relate to one of its Primary Panel Objects 114. If the Context applies to one of the Primary Panel Objects 114 on the Page Object 112, the Page Object 112 passes the Context into the appropriate Panel Objects 114 when the Page Object 112 initializes the Panel Objects 114. It is noted that Child Panel Objects 114 can only relate to the Parent Panel Object 114 and can only receive its Context from its Parent Panel Object 114.

At 452, the Page Object 112 is called by another Object to initialize with a Context that is being passed.

At 454, the Page Object 112 checks to see if there is personalized Object Definition of the Page Object 112. If so, control passes to act 456. If not, control passes to act 458.

At 456, the Page Object 112 reads the personalized Object Definition. At 458, the Page Object 112 reads the Global Object Definition. At 460, the Page Object 112 is initialized based upon the Object Definition. At 462, the Page Object 112 determines what Panel Objects 114 are required for the Page Object 112. At 464, the Page Object 112 determines which Panel Objects 114 are the Primary Panel Objects to which it can pass the context. At 466, for each Primary Panel Object, the Page Object 112 initializes the Panel Object 114 at 468 with provides the Context (if it applies to the Primary Panel Object).

If the Primary Panel Object has a Child Panel Object associated with it, control passes to act 470. If not, act 468 repeats until all Primary Panel Objects and Child Panel Objects have been initialized passing control to 469 when all Panels in a Page have been displayed. At 470, the Page Object 112 waits for the Parent Panel Object 114 to provide an OUTPUT of its Context. It collects the OUTPUT from the Parent Panel Object 114. At 472, the Page Object initializes the Child Panel Object with the Parent Panel's OUTPUT Context parameter.

When all Panel Objects 114 have been displayed by the Page Object 112 at 469, it is determined at 475 whether the Page and all its Panels initialized successfully. If so, at 474, the Page Object notifies the Object that called it that it was successful. At 476, the System displays the Page Object 112 to the end user. At 478 the System determines if the Page Object 112 encounters any errors while trying to initiate the Panel Objects 114 and the Page Object 112. If so, the Page Object 112 returns the error to the Object that called it. At 480, the Page Object 112 then destroys itself as it is no longer needed. The method 448 terminates at 490.

Figure 11:
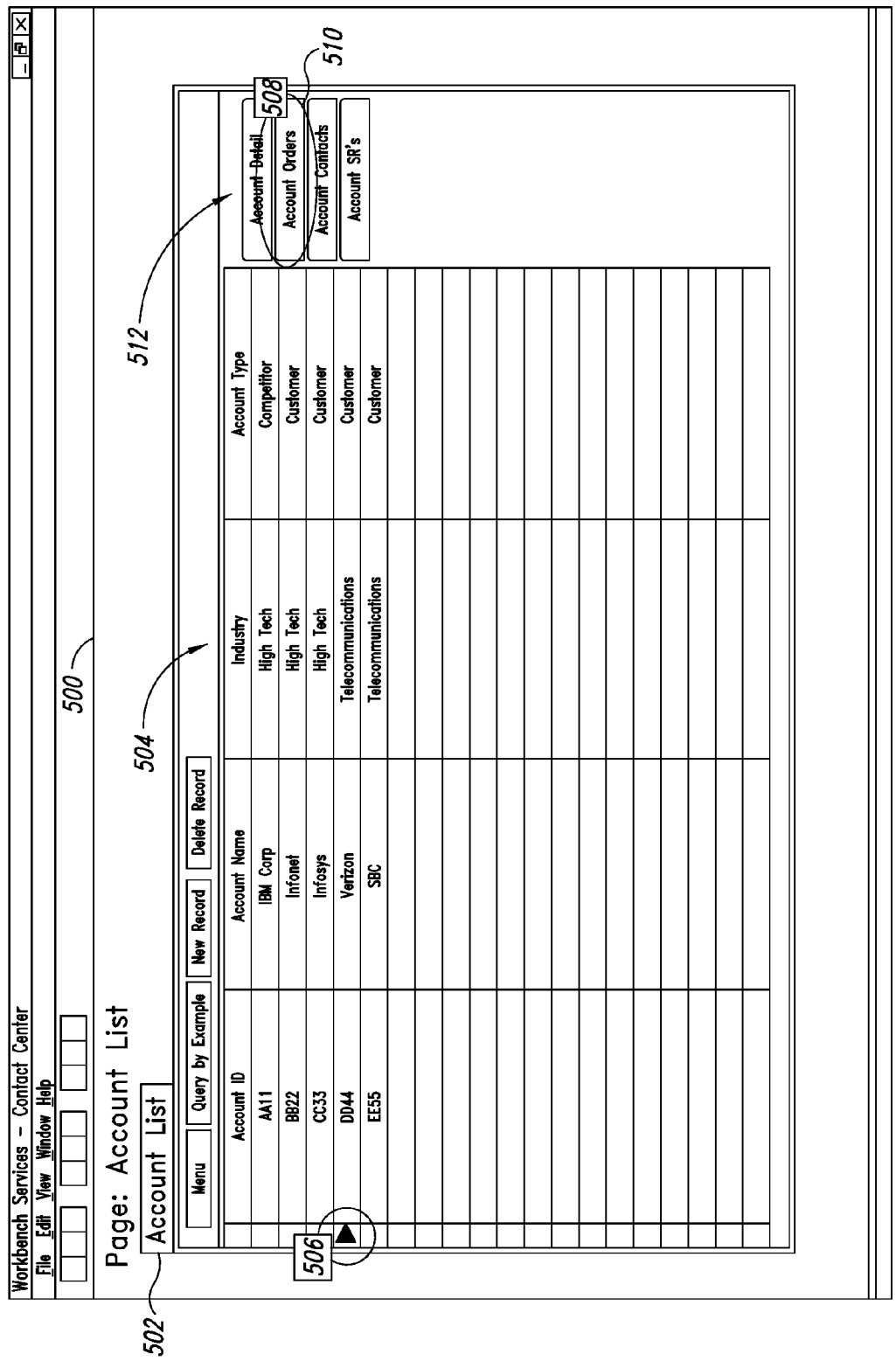
FIG. 11 is a schematic illustration of an Account List Page according to one illustrated embodiment.
Figure 12:
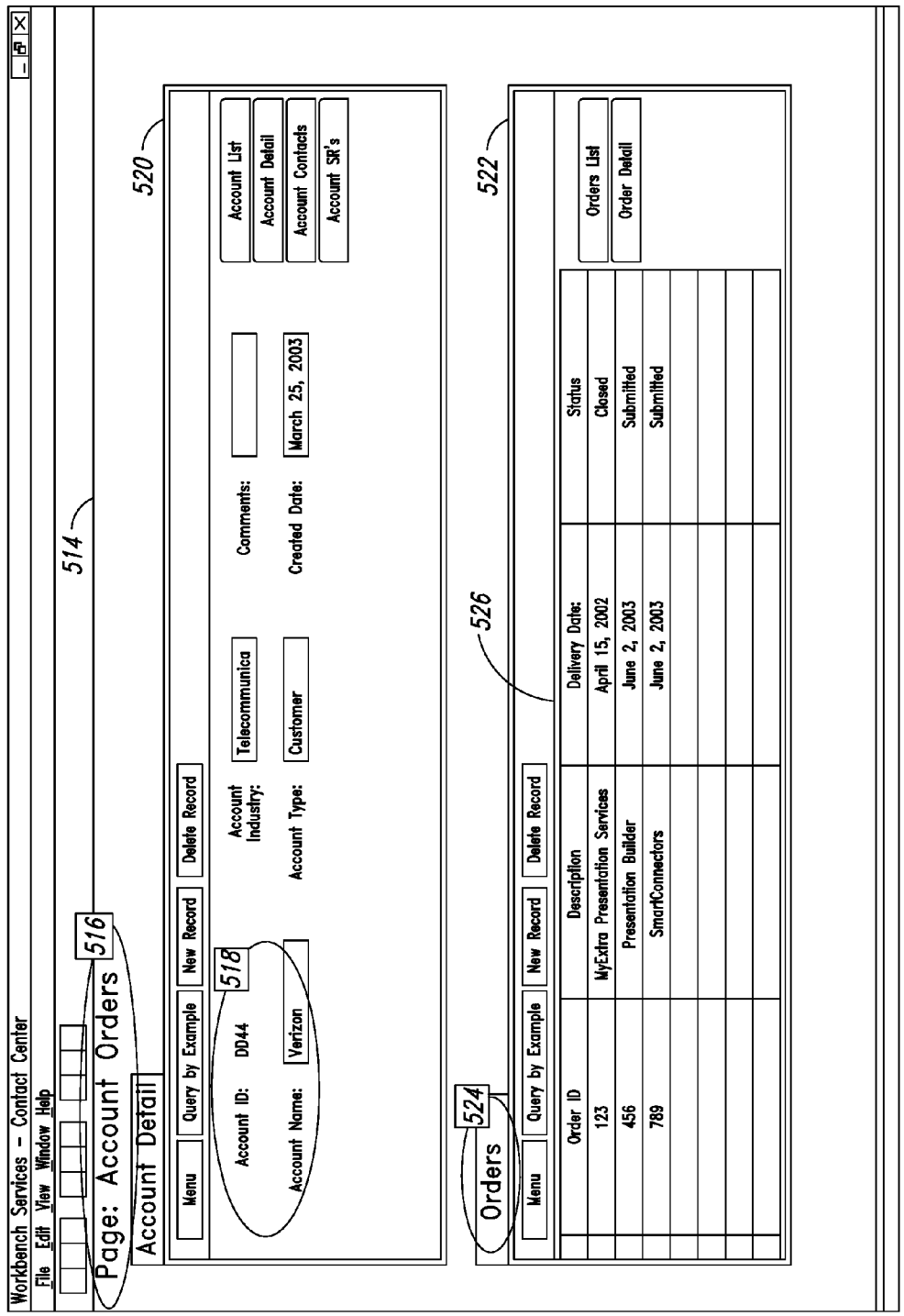
FIG. 12 is a schematic illustration of an Account Orders Page according to one illustrated embodiment.

FIGS. 11 and 12 illustrate how an end user would navigate to another Page generated by a Page Object 112 (FIG. 2) based upon a selected context from a Panel generated by a Panel Object. The end user should be able to select a record in a Panel and navigate to all relevant Pages that have the same context. The Pages that can be navigated to, can either be dynamically provided by comparing the context provided with the Panel Object to the Primary Context provided by the available Page Objects. Or the available Page Objects that may be navigated to from the Panel Object can be built as a Static property of the Panel Object. In both instances only the Page Objects the end user has access rights to will show up as available Pages to which the end user can navigate.

Scenario:

The end user wants to see the Order history for the Verizon Account.

The end user has navigated to the Account List Page 500 (FIG. 11) defined by an Account List Page Object. The Account List Page 500 includes a single panel. The panel is an Accounts List Panel 502, defined by an Accounts List Panel Object. The Accounts List Panel 502 includes an Accounts List 504. At 506, the end user selects the Verizon account in the Account List 504, for example, by moving a pointer or cursor to the line associated with the desired account and clicking, selecting or otherwise providing a user input.

At 508, the end user then selects the Account Orders Page icon 510 on a Page Navigation bar or menu 512 of the Panel 502 to navigate to an Account Orders Page 514 shown in FIG. 12. The Account Orders Page 514 is defined by an Account Orders page Object. At 516, in response to the end user selection, the end user is automatically taken to the Account Orders Page 514.

At 518, a Primary Panel, in this case the Account Detail Panel 520, of the Account Orders Page Object 514 is automatically put into the Context of the Verizon account selected in the previous Page. The Account Detail Panel is defined by an Account Detail Panel Object. The Account Detail Primary Panel 520 has an associated Child Panel, in this case an Orders Panel 522 defined by an Orders Panel Object. At 524, the Child Panel Object is automatically put into the Context of the Verizon account, all the orders associated with the Verizon Account being displayed in the Orders list 526.

Dynamically Built Panel to Page Navigation

The Panel Object 114 is attached to a Business Object 116 that provides it the data. The record selected in the Panel Object 114 and its Business Object 116 combined provides the Context of that Panel Object 114. The Page Objects 112 that can be navigated to within Context (assuming dynamically built) is determined by the Primary Panel Objects that reside on that Page Object 112. These Primary Panel Objects must be based on the same Business Object 116 as the Panel Object 114 that is calling it.

Statically Built Panel to Page Navigation

In the Static built navigation from Panel Object 114 to Page Object 112, these rules can be broken by allowing a single field as a context (e.g., Account ID from the Account List Panel to navigate to the Orders List Panel passing the Account ID as the Context). This will allow the end user to see all Orders as associated with the Account selected in an entirely different Page Object 112.

Figure 13A:
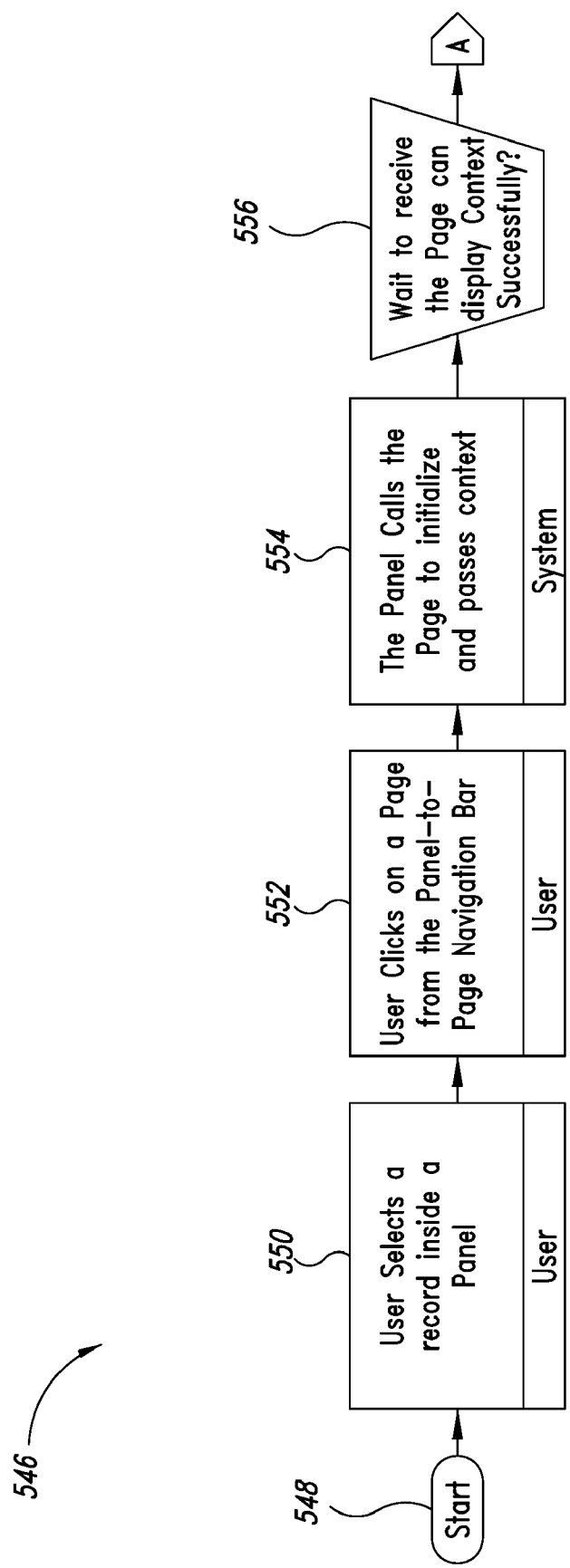
FIGS. 13A-13B are a flow diagram showing a method of navigating from a Panel to a Page within Context in an Entity Model according to one illustrated embodiment.
Figure 13B:
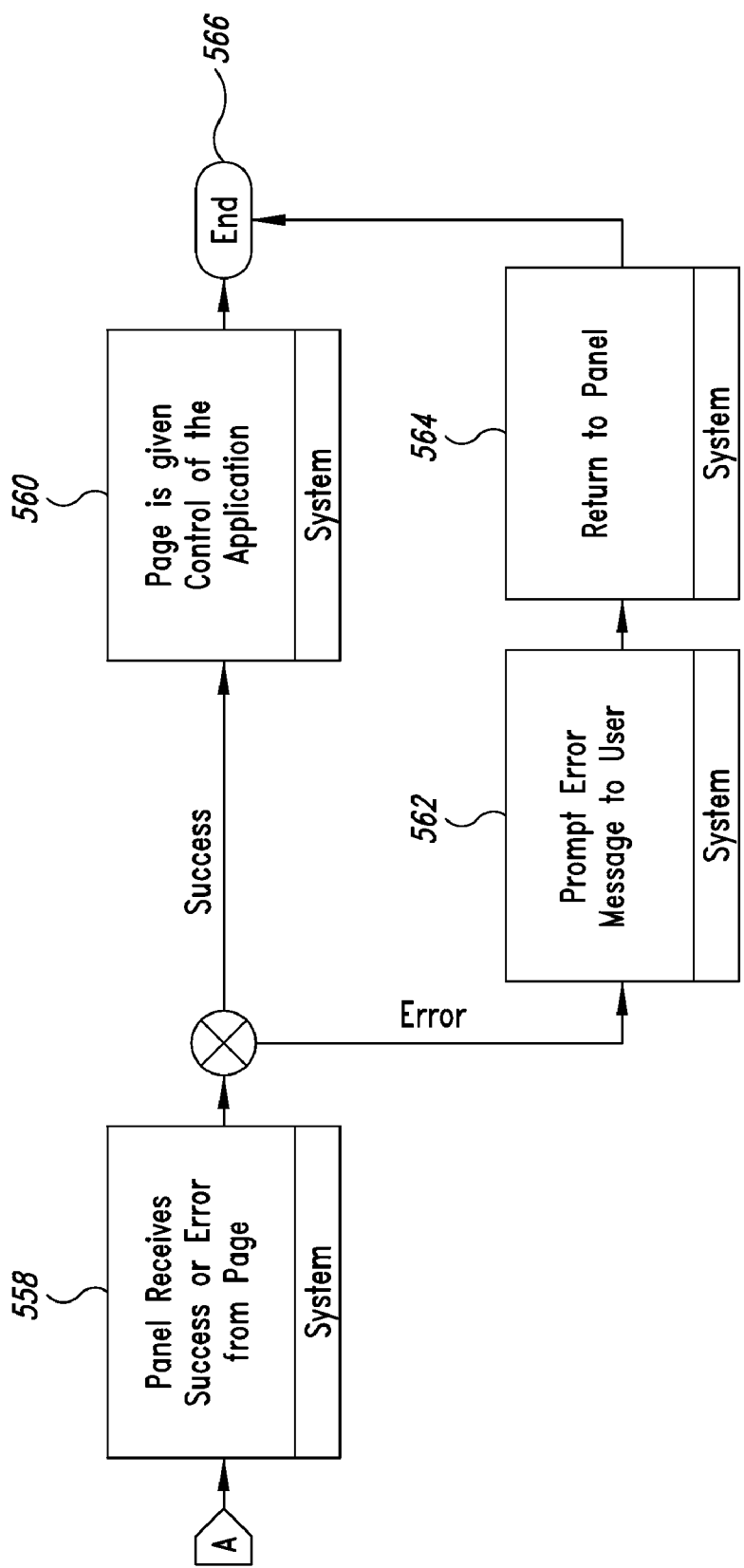

FIGS. 13A-13B illustrates a method 546 for navigating from a Panel to a Page within Context, starting at 548.

At 550, an end user selects a record from a Panel defined by a Panel Object 114. For example, in a List Panel the end user selects the record. In a Form Panel the record should already be shown. At 552 with the record selected, the end user selects the Page to navigate to from a Panel-to-Page Navigation Bar or Menu 512. At 554, the Panel Object 114 calls the target Page Object 112 to initialize it, and then passes the selected record as the context. The Panel Object 114 then waits at 556 for the Page Object 112 to pass back a Success or Error indication.

At 558, the Panel Object 114 receives the Page Success or Error Call Back indication. If a Success, control passes to 560. If an Error, control passes to 562. At 560, the Page Object 112 is handed control so that the Page Object 112 can display its contents. Where the Page Object 112 reported an error, the Panel Object 114 should prompt the end user at 562 with an error message indicating why the Panel Object 114 cannot navigate to the Page Object 112. Once the end user has acknowledged the error, at 564 the end user is returned to the original Panel Object 114. The method 546 terminates at 566.

Creating New Records

Creating a New Record in a Panel Object 114 within Context means that the Panel Object 114 is a Child Panel Object and the record that is being created is associated to a record in the Parent Panel Object.

Example:

With an Account selected in the Parent Panel Object the end user enters a new record in the Order Child Panel Object. When the new record is created with context it follows the same rules as when it was without context. The only difference is that a reference to its parent record is automatically attached to the new record being created and passed to the Business Object New Record Method.

Figure 14:
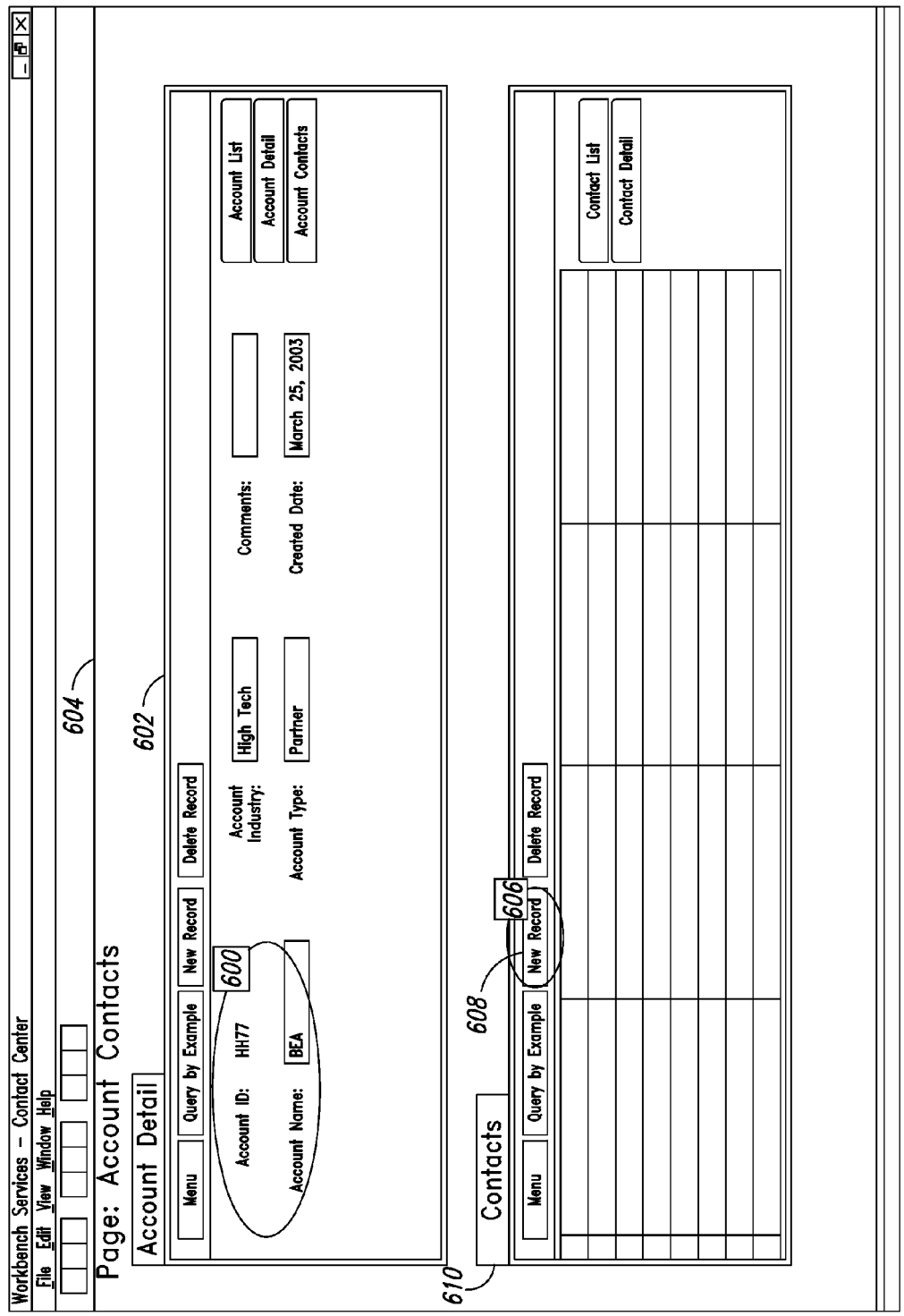
FIG. 14 is a schematic illustration of an Account Contacts Page according to one illustrated embodiment.

FIG. 14 demonstrates how a new contact is created for the BEA account. At 600, the end user has selected the BEA account in the Parent Panel 602 of the Account Contacts Page 604. The Parent Panel 602 is defined by a corresponding Panel Object and the Accounts Contacts Page 604 is defined by a corresponding Page Object. To create a contact for the BEA account, at 606 the end user selects the New Record icon 608 on a Contact Child Panel 610 and enters in the contact information. When the record is saved implicitly the Business Object bound to the Contacts Panel Object is passed the new record via its New Record Method along with the record ID of the Parent Account, which in this case is BEA.

The scenario described below illustrates some different uses of Context and Context Values as they interact with the various Objects and end user behavior. This scenario describes how an end user 1) Finds Context; 2) Navigates within a Context; and 3) Drills into a Context. Thus, the following scenario is used to describe how the Context and Context Values work.

Figure 15:
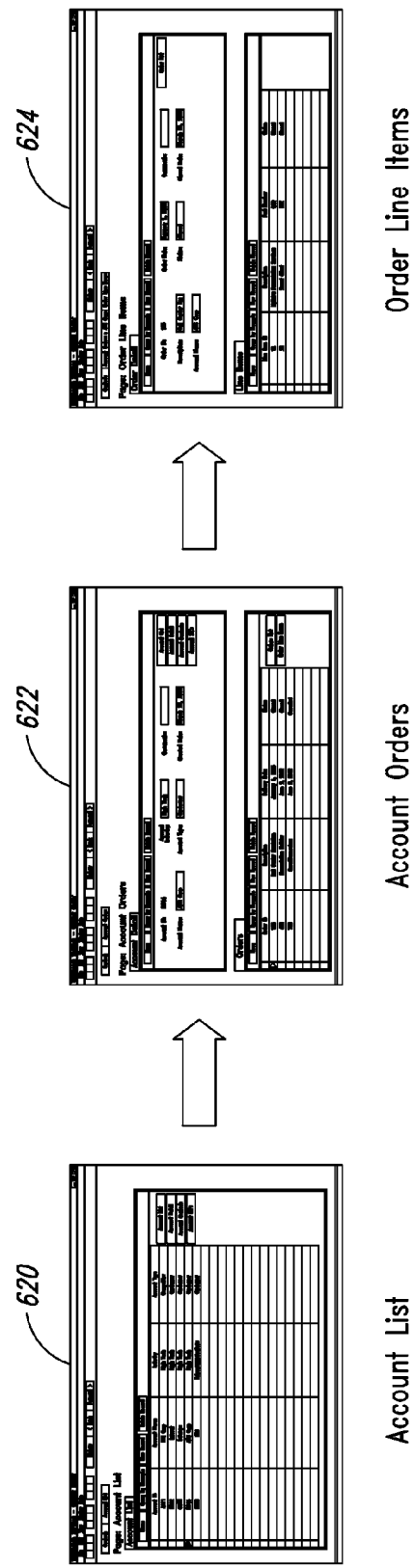
FIG. 15 is a high-level schematic illustration of a sequence of an Account List Page, an Account Orders Page and an Order Line Items Page according to one illustrated embodiment.

An end user wants to see what Order Line Items that ABC Company has ordered on its most recent order. The end user has to find the ABC Company record first. Then view what orders ABC Company has ordered lately. Select the most recent one and drill into that order to see the associated Order Line Items. The overall Page navigation is shown in FIG. 15, where the end user moves from an Accounts List Page 620 to an Accounts Orders Page 622, to an Order Line Items Page 624, each of which are shown in detail in FIGS. 16-19.

Figure 16:
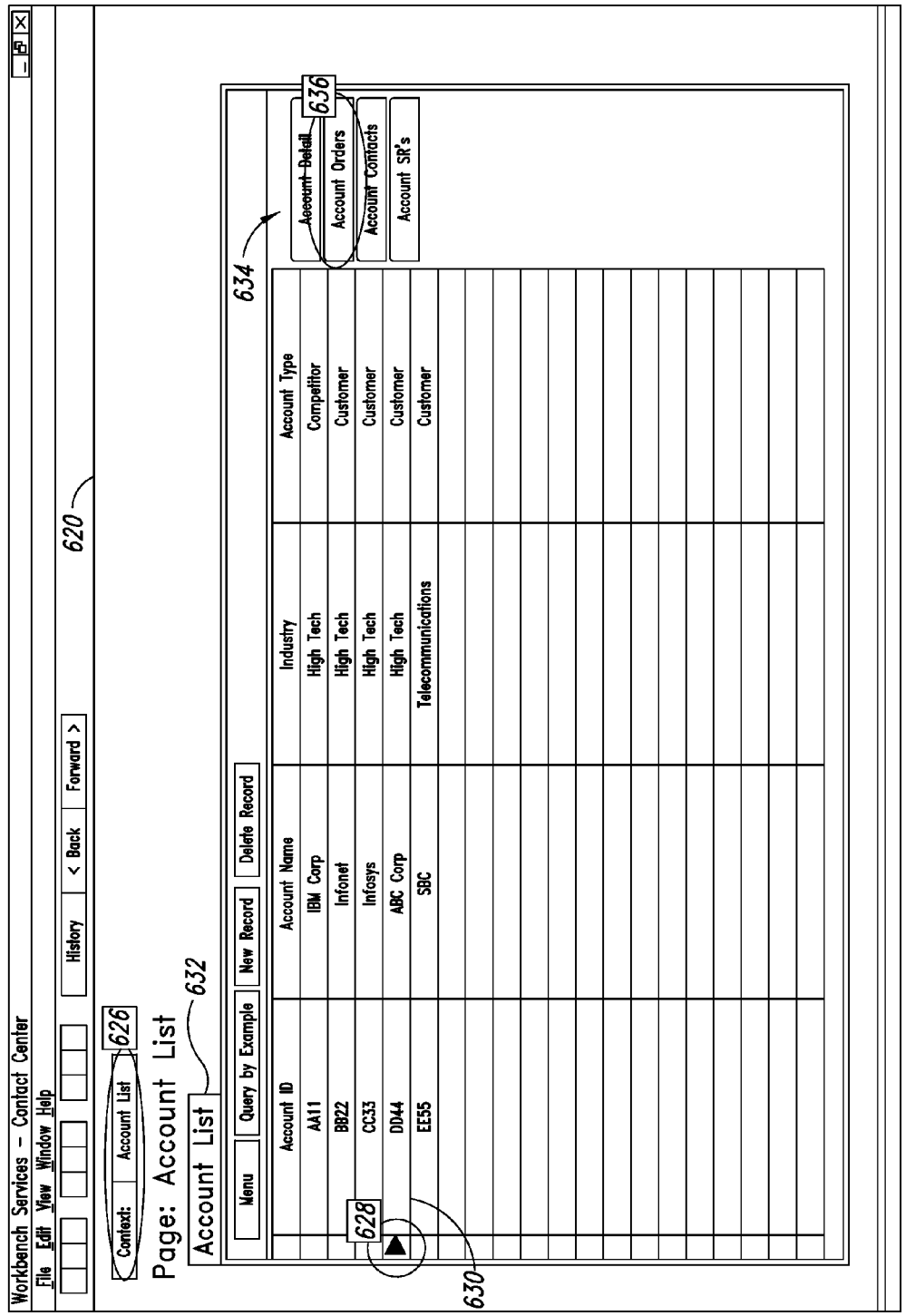
FIG. 16 is a schematic illustration of the Account List Page of FIG. 15.

In particular, FIG. 16 shows the Account List Page 620 to which the end user has navigated. A Context Display icon 626 displays the current Context determined by the end user's selections. The end user may then find or establish a new Context. For example, at 628 the end user performs any necessary queries to locate the ABC Corp record 630 and selects the record 630 from an Account List Panel 632 generated from an Account List Panel Object. This selection 628 by the end user provides a Context (e.g., Accounts) and a Context Value (e.g., ABC Corp).

Figure 17:
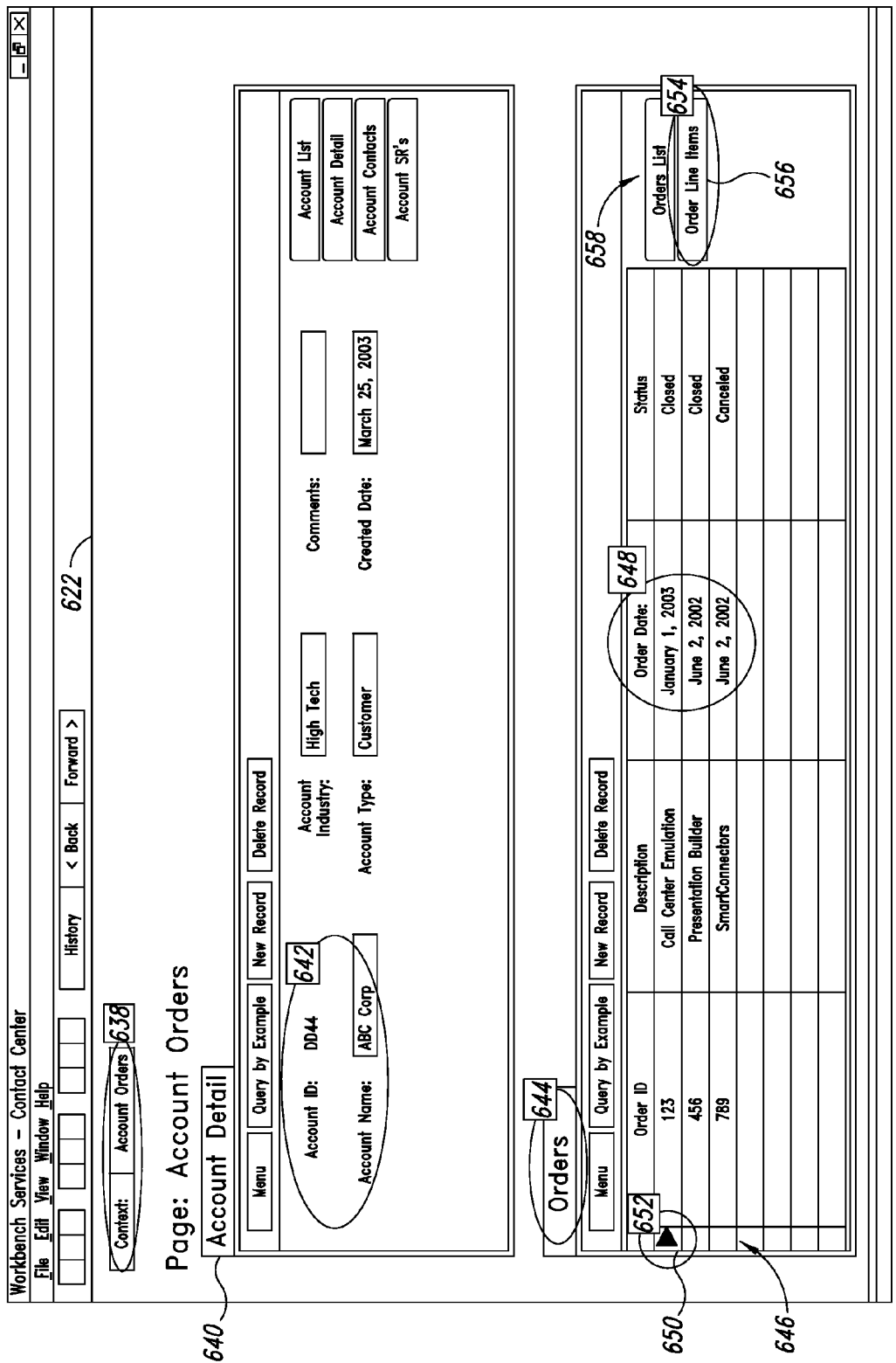
FIG. 17 is a schematic illustration of the Account Orders Page of FIG. 15.

A set of one or more user selectable icons 634 show all the Page Objects that have the same Context as the Account List Panel OUTPUT, if any. The end user may navigate within the Context, for example by selecting one of the user selectable icons 634. For example, one of the icons 634 is the Account Orders Page icon 636. To see what Orders are associated with the ABC Company Account, the end user selects the Account Orders Page icon 636 with the ABC Corp account 630 selected. This selection causes the display of the corresponding Account Orders Page 622 (FIG. 17) defined by an Account Orders Page Object with the Context Value of ABC Corp. In particular, the Accounts List Page Object takes the Context of the Panel Object (e.g., Account List) and Context Value (e.g., ABC Corp) and tells the Entity Model application to initialize the Account Orders Page Object with the passed Context and Context Value. As a result the Account Orders Page 622 is displayed, as illustrated in FIG. 17, showing all the Orders associated with a particular account.

The Application Context Display icon 638 changes its Context to the Account Orders Page, but remains in the Account Business Object Context. The Account Orders Page 622 displays two Panels. A Primary Panel 640 of Account Detail where the Context Value of ABC Corp was passed and thus shows the record 642 in its Panel. The Second Panel is the Orders Panel 644. The Orders Panel 644 is a Child Panel to the Account Detail Panel 640. As such, the Orders Panel 644 shows all the Orders 646 associated with the Account shown in the Account Detail Panel 640, which in this case corresponds to the ABC Corp.

The end user may then drill into the Context. For example, at 648, the end user reviews the orders in the Orders List 646 to find the latest order. Once the correct order has been found, which in this example is the Order ID=123 Call Center Emulation, the end user selects the record 650 at 652. With the Call Center Emulation order selected, at 654 the end user selects the Order Line Items Page icon 656 from the available user selectable icons 658. Note that these user selectable icons 658 are in the Context of the Orders and not the Account. This changes the Context from Account to Orders. This process is referred to as drilling into a context. Thus, the end user selects the latest Order at 652 and drills into the Order Context at 654 to see the Order Items Page 624 (FIG. 18) generated from an Order Items Page Object. In particular, the Account Orders Page Object takes the Context (e.g., Orders) and Context Value (e.g., Order ID=123) and passes it to the Entity Model application and asks for the Order Line Items Page Object. The Entity Model application initializes the Order Line Items Page Object and passes it the Context (e.g., Orders) and Context Value (e.g., Order ID=123).

Figure 18:
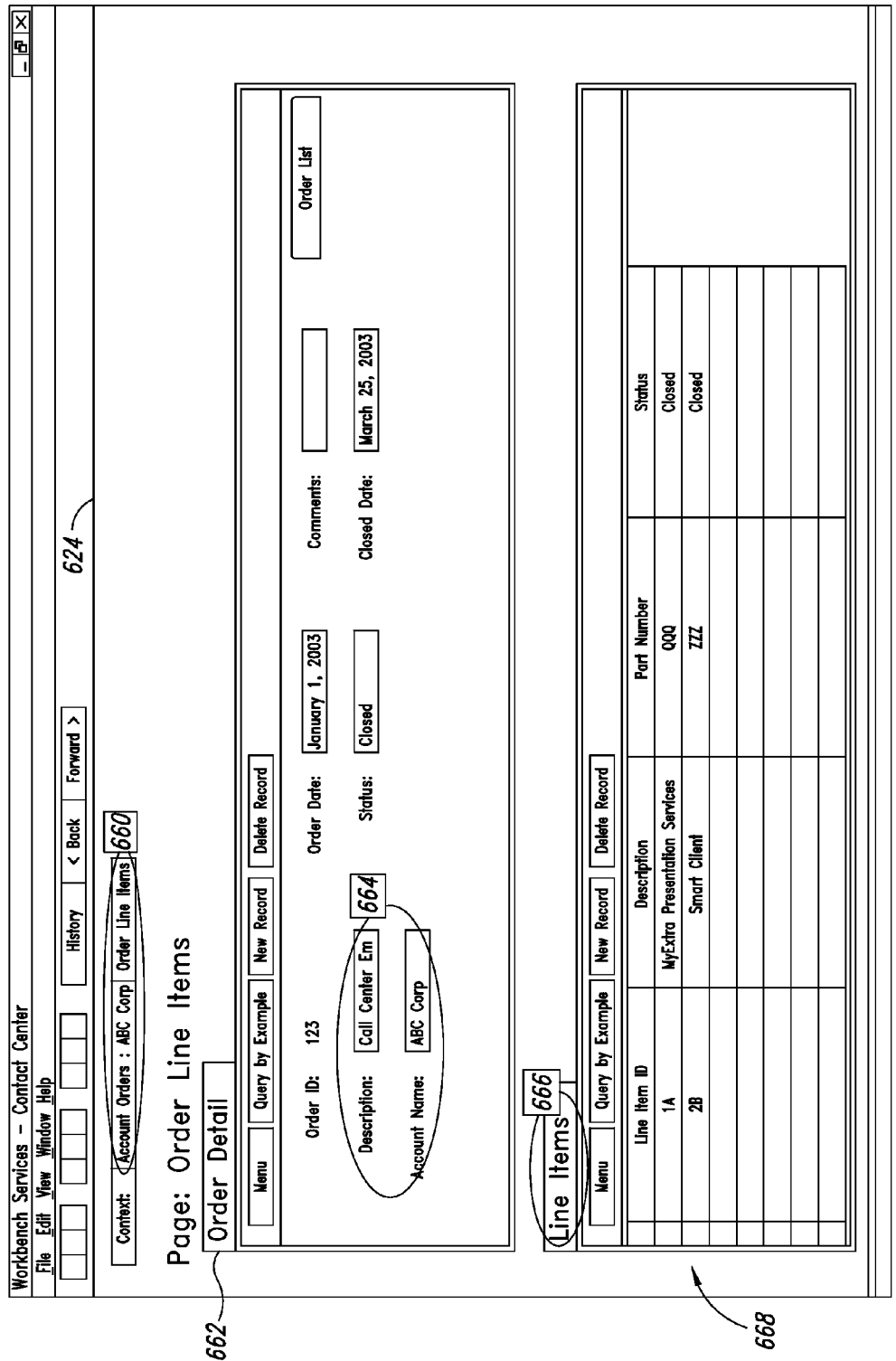
FIG. 18 is a schematic illustration of the Order Line Items Page of FIG. 15.

As illustrated in FIG. 18, the Application Context Display icon 660 shows the Context from where it drilled into a different Context. It does this by indicating the Account Orders Page with the Context of ABC Corp. The Application Context Display icon 660 also shows the new Context (e.g., Order Line Items).

The Order Line Items Page 624 has two Panels. The Primary Panel is an Order Detail Panel 662 that shows the passed Context Value of the Call Center Emulation Order at 664. The Second Panel is a Line Items Panel 666 that shows a list of the line items 668 associated with the Context Value of the Order Detail Panel 662. The end user now can see the line items 668 associated with the latest order that ABC Corp has submitted.

Figure 19:
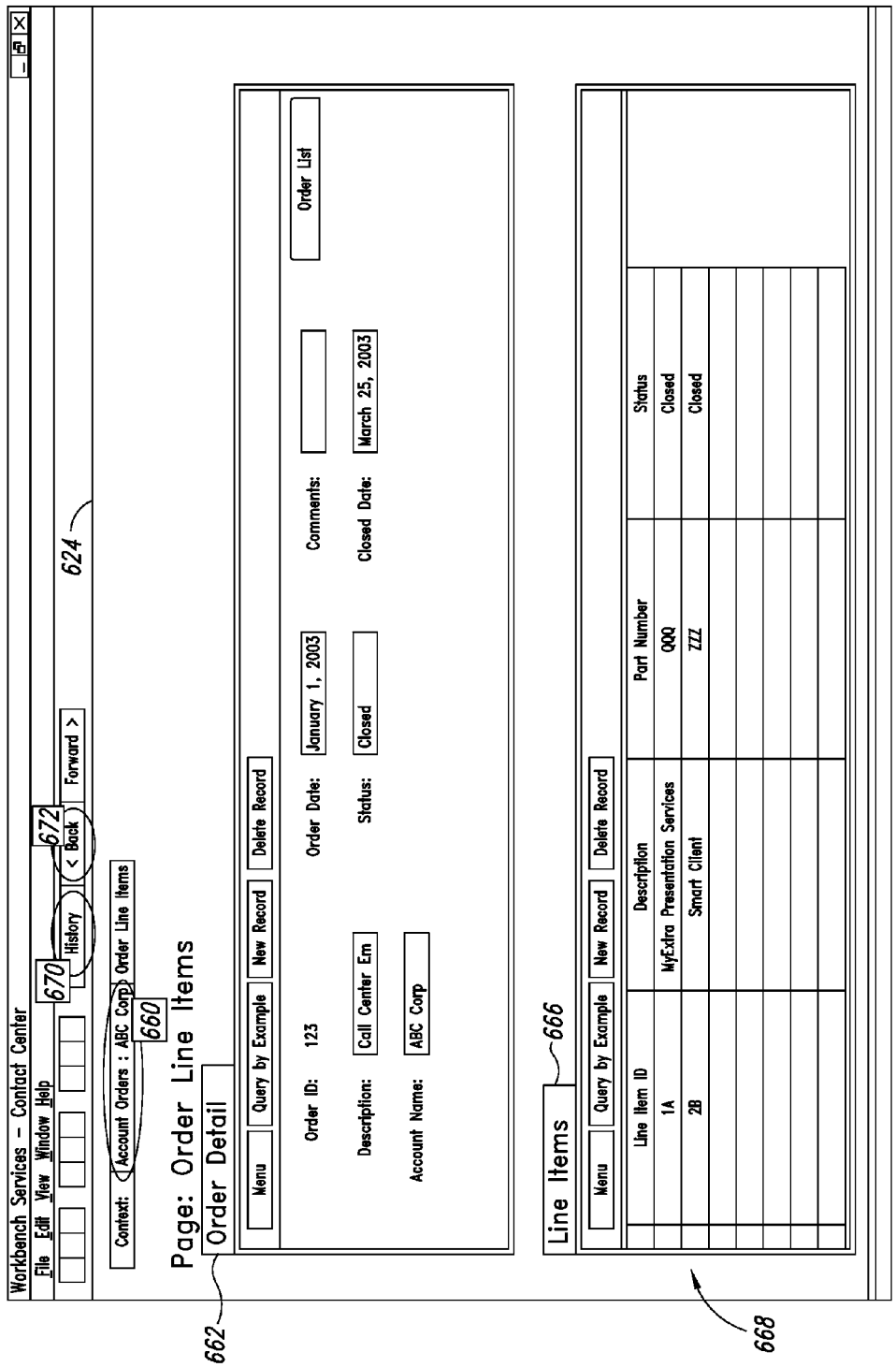
FIG. 19 is a schematic illustration of the Order Line Items Page of FIG. 15.

The end user can navigate back to where they started via different methods, which are discussed with reference to FIG. 19. One method is to use a user selectable History icon 670 which allows the end user to go back to every Page previously navigated to. Another method is to use a <Back user selectable icon 672 to navigate back one at a time. A third method is to use the user selectable Context Display icon 660 to navigate back to a Context from which the end user drilled down. The Context and the Context Values evolve in the Entity Model environment, thus the Application Context Display icon 660 is the one area that end users can always refer to in order to determine from what Context and Context Value they came. Furthermore, the Application Context Display icon 660 allows end users to step back into any points in the Context history. The Context Display icon 660 is used primarily to get back to the Context from where the end user started.

Example:

The end user has selected HP as an Account and looks at the Orders for the HP Account. The context is still HP. However, as the end user drills into the Orders by selecting an Order and navigating to the Order Details Page, the Context has changed. The Application Context Display icon 660 will show the Account Orders Page with HP as the Context to navigate back to. The end user can then click on the HP link in the Context Display to go back to the Account Orders Page with HP as the Context Value.

Operation of the Application Context Display icon 660 relies on a list or log that is dynamically built as a user drills into a Context and Context Value. It is noted that the function of the Context Display icon 660 is different from that of the History icon 670. Selection of the Context Display 660 only shows how an end user drilled into a Context. Operation of the History icon 670 relies on a list or log that captures all Pages where the end user has been. Thus, consecutive selection of the History icon 670 consecutively displays all Pages where the end user has been. Before drilling into a Context, the Application Context Display icon 660 only shows the current Page the user is on. As the user drills into a new context, the old context and Page from which the end user drilled into the new context, will display in the Application Context Display 660.

Administration

The System Administrator is an end user or group of end users that has access to all administrative functions in the Entity Model 100, including Entity administration, server administration, component administration and all other functions related to managing the overall Entity Model application.

In some embodiments there must always be a System Administration user in the Entity Model application. A generic System Administrator Entity (called SysAdmin) is created by the software manufacturer or distributor which is associated to an Access Group Entity that contains all the Administrative Pages in the Entity Model application. Both the System Administrator user and System Administration Access Group Entity ship with any Entity Model application and cannot be deleted from the Entity Model application. The end users should always be able to login as SysAdmin and immediately receive all access in the Entity Model. However, the end users are strongly encouraged to create named end users that inherit the System Administration Access Group Entity. Post-installation, the generic SysAdmin should only be used in the event of a system failure. Typically, the System Administrator will always have access rights to the Base Administrative Pages. The System Administrator will have access to everything in the Entity Model 100 via the System Administration Entity Access Group. Given that the System Administrator has access to all, they can ultimately give access rights to all other end users for all objects and have no restrictions associated to them.

The generic SA username SysAdmin and default password can be stored on physical media shipped to an end user organization (like a CD Key). In the case of the physical media, it is assumed that possession of the media itself is proof that the end user organization has purchased the application and is authorized to install it. The generic username and password (like CD Key) can be stored electronically on a secure web site from which an end user organization can download and install a Entity Model solution. In the case of digital storage, the end user must present some type of authentication in order to access the SA username and password. The secure nature of the SA role must be balanced with the reality that "paperwork" which accompanies software is often separated from the software by the time it reaches the individual installing it. Therefore, there should be several different types of authentication the end user organization can provide in order to get the SA username and password: 1) Purchasing Company Name and Address; 2) Product Serial Number; 3) Purchase Order Number; and/or 4) Support Contact ID.

System Administrator Access Rights

As soon as the SA has successfully installed the Entity Model application, Entity Model application will deliver the end user to the Entity Administration page and suggest that the end user add herself as a user to the System Administration Entity Access Group. The System Administrator Group has, by default, the attributes illustrated in Table 33.

TABLE 33

| Attribute | Values |
| --- | --- |
| Type | Group |
| Administrator | Yes |
| Global Read-Only | No |
| Page Global All | Yes |
| Page Global Can Create | Yes |
| Page Global Can Customize | Yes |
| Page Global Can Delete | Yes |
| Panel Global All | Yes |
| Panel Global Can Create | Yes |
| Panel Global Can Customize | Yes |
| Panel Global can Delete | Yes |
| BO Global All | Yes |
| BO Global Can Create | Yes |
| BO Global Can Customize | Yes |
| BO Global Delete | Yes |

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 11/703,601, filed Feb. 6, 2007; U.S. Provisional Patent Application Nos. 60/765,574; 60/765,537; 60/765,757; and 60/765,573, all filed Feb. 6, 2006; and U.S. patent application Ser. Nos. 11/703,591; 11/703,545; and 11/703,602, all filed Feb. 6, 2007, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of operating a computing system including at least one processor and at least one nontransitory computer-readable medium to dynamically determine application flows at run time, the method comprising:

determining at least one data type to which a first user has access rights that are based at least in part on inherited access rights by the at least one processor, wherein the determining at least one data type to which a first user has access rights comprises accessing a stored set of access rights assigned to a first entity object that represents the user, the access rights defining a right of the entity object to access data by data type;

identifying each of a number of data presentation user interface elements capable of representing the determined at least one data type by the at least one processor; and dynamically building a navigation user interface element by the at least one processor that provides a user selectable representation of each of the identified number of data presentation user interface elements capable of representing the determined at least one data type to which a user may navigate.

2. The method of claim 1, further comprising:

receiving a user selection of one of the representations, the user selection indicative of one of the number of user interface elements capable of representing the determined at least one data type;

dynamically building a data presentation user interface element corresponding to the user selected representation by the at least one processor; and presenting the dynamically built data presentation user interface element to the user.

3. The method of claim 1 wherein determining at least one data type to which a first user has access rights further comprises:

determining by the at least one processor if the first entity object has at least one direct inheritance relationship with at least one other entity object;

for each of the direct inheritance relationships that the first entity object is determined to have with at least one other entity object, accessing a stored set of access rights assigned to the other entity object by the at least one processor, the access rights defining a right of the other entity object to access data by data type; and adding the data types from the stored set of access rights assigned to the other entity object, if any, to the determined data types for the first entity object by the at least one processor.

4. The method of claim 3 wherein determining at least one data type to which a first user has access rights further comprises:

determining by the at least one processor if the first entity object has at least one indirect inheritance relationship with at least one further entity object through the at least one other entity object; and for each of the indirect inheritance relationships that the first entity object is determined to have with at least one further entity object, accessing a stored set of access rights assigned to the further entity object by the at least one processor, the access rights defining a right of the other entity object to access data by data type; and adding the data types from the stored set of access rights assigned to the further entity object, if any, to the determined data types for the first entity object by the at least one processor.

5. The method of claim 1 wherein determining at least one data type to which a first user has access rights comprises:

for each of a number of pieces of data displayed in a data presentation user interface element currently presented to the user, identifying a respective data type in which the respective piece of data is classed by the at least one processor.

6. The method of claim 1 wherein determining at least one data type to which a first user has access rights, further comprises:

for each determined data type, determining if a relationship exists between the determined data type and any additional data types by the at least one processor; and adding by the at least one processor the additional data types, if any, to the determined data types before identifying each of the number of data presentation user interface elements capable of representing the determined at least one data type.

7. A non-transitory computer-readable medium storing instructions for causing a computer to dynamically determine application flows at run time, by:

determining at least one data type to which a first user has access rights, wherein the determining at least one data type to which a first user has access rights comprises accessing a stored set of access rights assigned to a first entity object that represents the user, the access rights defining a right of the entity object to access data by data type;

identifying each of a number of data presentation user interface elements capable of representing the determined at least one data type; and dynamically building a navigation user interface element that provides a user selectable representation of each of the identified number of data presentation user interface elements capable of representing the determined at least one data type to which a user may navigate.

8. The non-transitory computer-readable medium of claim 7 where the instructions cause the computer to dynamically determine application flows at run time further by:
receiving a user selection of one of the representations, the user selection indicative of one of the number of user interface elements capable of representing the determined at least one data type;
dynamically building a data presentation user interface element corresponding to the user selected representation; and
presenting the dynamically built data presentation user interface element to the user.

9. The non-transitory computer-readable medium of claim 7 wherein determining at least one data type to which a first user has access rights further comprises:
determining if the first entity object has at least one direct inheritance relationship with at least one other entity object;
for each of the direct inheritance relationships that the first entity object is determined to have with at least one other entity object, accessing a stored set of access rights assigned to the other entity object, the access rights defining a right of the other entity object to access data by data type; and
adding the data types from the stored set of access rights assigned to the other entity object, if any, to the determined data types for the first entity object.

10. The non-transitory computer-readable medium of claim 9 wherein determining at least one data type to which a first user has access rights further comprises:
determining if the first entity object has at least one indirect inheritance relationship with at least one further entity object through the at least one other entity object; and
for each of the indirect inheritance relationships that the first entity object is determined to have with at least one further entity object, accessing a stored set of access rights assigned to the further entity object, the access rights defining a right of the other entity object to access data by data type; and
adding the data types from the stored set of access rights assigned to the further entity object, if any, to the determined data types for the first entity object.

11. The non-transitory computer-readable medium of claim 7 wherein determining at least one data type to which a first user has access rights comprises:
for each of a number of pieces of data displayed in a data presentation user interface element currently presented to the user, identifying a respective data type in which the respective piece of data is classed.

12. The non-transitory computer-readable medium of claim 7 wherein determining at least one data type to which a first user has access rights, further comprises:
for each determined data type, determining if a relationship exists between the determined data type and any additional data types; and
adding the additional data types, if any, to the determined data types before identifying each of the number of data presentation user interface elements capable of representing the determined at least one data type.

13. A method of dynamically determining application flows at run time by a computing system including at least one processor and at least one nontransitory computer-readable memory, the method comprising:
determining by the at least one processor each of a number of data types to which a first entity object has at least one of assigned access rights or inherited access rights, wherein the determining each of a number of data types to which the first entity object has at least one of assigned access rights or inherited access rights comprises accessing a stored set of access rights assigned to the first entity object, the access rights defining a right of the entity object to access data by data type; and
dynamically building a navigation menu user interface element during run time by the at least one processor that provides a selection list of each of a number of data presentation user interface elements capable of representing data of the determined data types to which the first entity object has at least one of assigned access rights or inherited access rights.

14. The method of claim 13, further comprising:
in response to a user selection of one of the data presentation user interface elements capable of representing the determined at least one data type, dynamically building the selected one of the data presentation user interface elements by the at least one processor.

15. The method of claim 13 wherein determining each of a number of data types to which a first entity object has at least one of assigned access rights or inherited access rights comprise determining whether the first entity object inherits access rights directly from a second entity object.

16. The method of claim 15 wherein determining each of a number of data types to which a first entity object has at least one of assigned access rights or inherited access rights comprise determining whether the first entity object inherits access rights indirectly from a third entity object from who the second entity object directly inherits access rights.

17. The method of claim 13 wherein dynamically building a navigation menu user interface element during run time that provides a selection list of each of a number of data presentation user interface elements capable of representing data of the determined data types to which the first entity object has at least one of assigned access rights or inherited access rights comprises determining a size of a pull-down menu based on the number of data presentation user interface elements capable of representing data of the determined data types to which the first entity object has at least one of assigned access rights or inherited access rights, and populating the pull-down menu with identifiers that uniquely identify each of the number of data presentation user interface elements capable of representing data of the determined data types to which the first entity object has at least one of assigned access rights or inherited access rights.

18. The method of claim 13 wherein dynamically building a navigation menu user interface element during run time that provides a selection list of each of a number of data presentation user interface elements capable of representing data of the determined data types to which the first entity object has at least one of assigned access rights or inherited access rights comprises building a page comprising at least one panel.

* * * * *

UNITED STATES PATENT AND TRADEMARK OFFICE
CERTIFICATE OF CORRECTION

| | | |
|---|---|---|
| PATENT NO. | : 8,219,919 B2 | Page 1 of 1 |
| APPLICATION NO. | : 11/771941 | |
| DATED | : July 10, 2012 | |
| INVENTOR(S) | : Norring et al. | |

It is certified that error appears in the above-identified patent and that said Letters Patent is hereby corrected as shown below:

On the face page, in column 1, in field (73), "Assignee", line 1, delete "Attachmate Group" and insert --Attachmate Corporation--, therefor Signed and Sealed this
Eighteenth Day of December, 2012

David J. Kappos
*Director of the United States Patent and Trademark Office*